(12) United States Patent
Nakamura et al.

(10) Patent No.: US 9,259,806 B2
(45) Date of Patent: Feb. 16, 2016

(54) FLUX-CORED WIRE FOR WELDING ULTRAHIGH TENSILE STRENGTH STEEL

(71) Applicant: NIPPON STEEL & SUMITOMO METAL CORPORATION, Tokyo (JP)

(72) Inventors: Shuichi Nakamura, Tokyo (JP); Kazuhiro Kojima, Tokyo (JP); Yasuhito Totsuka, Tokyo (JP); Ryuichi Shimura, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 14/399,400

(22) PCT Filed: May 2, 2013

(86) PCT No.: PCT/JP2013/062754
§ 371 (c)(1),
(2) Date: Nov. 6, 2014

(87) PCT Pub. No.: WO2013/168670
PCT Pub. Date: Nov. 14, 2013

(65) Prior Publication Data
US 2015/0117937 A1 Apr. 30, 2015

(30) Foreign Application Priority Data

May 8, 2012 (JP) .................................. 2012-106607

(51) Int. Cl.
*B23K 35/02* (2006.01)
*B23K 35/368* (2006.01)
(Continued)

(52) U.S. Cl.
CPC ............. *B23K 35/0266* (2013.01); *B23K 9/173* (2013.01); *B23K 35/0255* (2013.01);
(Continued)

(58) Field of Classification Search
CPC .. B23K 35/0266; B23K 9/173; B23K 35/368; B23K 35/3601; B23K 35/3093
USPC ........... 219/69.1, 73, 145.22, 145.23, 146.22, 219/146.24, 146.3; 148/24, 26
See application file for complete search history.

(56) References Cited

U.S. PATENT DOCUMENTS 4,689,461 A * 8/1987 Gamberg ...................... 219/69.1
5,099,103 A   3/1992 Yamada et al.
(Continued)

FOREIGN PATENT DOCUMENTS

CN 102179640 A 9/2011
CN 102554496 A 7/2012
(Continued)

OTHER PUBLICATIONS

International Search Report, mailed Jul. 23, 2013, issued in PCT/JP2013/062754.
(Continued)

*Primary Examiner* — Thien S Tran
(74) *Attorney, Agent, or Firm* — Birch, Stewart, Kolasch & Birch, LLP

(57) ABSTRACT

In a flux-cored wire for welding an ultrahigh tensile strength steel, one or more of $CaF_2$, $BaF_2$, $SrF_2$, and $MgF_2$ are included in the wire and, when a total amount thereof is defined as $\alpha$, the $\alpha$ is more than 2.0% and equal to or less than 8.0% in terms of mass % with respect to a total mass of the wire, one or more of Ti oxide, Si oxide, Mg oxide, and Al oxide are included in the wire and, when a total amount thereof is defined as $\beta$, the $\beta$ is 0.01% to 1.20% in terms of mass % with respect to the total mass of the wire, a ratio of an amount of the $CaF_2$ with respect to the $\alpha$ is 0.50 or more, a ratio of the $\alpha$ with respect to the $\beta$ is 2.0 to 800.0, and Ceq defined in the following expression is 0.60% to 1.20%, $Ceq=[C]+[Si]/24+[Mn]/6+[Ni]/40+[Cr]/5+[Mo]/4+[V]/14$.

16 Claims, 9 Drawing Sheets

(51) Int. Cl.
  *B23K 35/30* (2006.01)
  *B23K 35/36* (2006.01)
  *B23K 9/173* (2006.01)

(52) U.S. Cl.
  CPC ......... *B23K35/0261* (2013.01); *B23K 35/3093* (2013.01); *B23K 35/3601* (2013.01); *B23K 35/3602* (2013.01); *B23K 35/3603* (2013.01); *B23K 35/3605* (2013.01); *B23K 35/368* (2013.01)

(56) References Cited

U.S. PATENT DOCUMENTS

| | | | | |
|---|---|---|---|---|
| 5,112,802 | A | * | 5/1992 | Takano et al. ............. 505/232 |
| 5,430,269 | A | * | 7/1995 | Natsume et al. ............. 219/73 |
| 6,835,913 | B2 | * | 12/2004 | Duncan et al. ........ 219/137 WM |
| 2004/0020912 | A1 | * | 2/2004 | Hara et al. ............. 219/145.22 |
| 2006/0179974 | A1 | * | 8/2006 | Hatano et al. ............. 75/228 |
| 2011/0171485 | A1 | * | 7/2011 | Kawamoto et al. ........... 428/576 |
| 2012/0241433 | A1 | * | 9/2012 | Kojima et al. ........... 219/145.22 |

FOREIGN PATENT DOCUMENTS

| | | |
|---|---|---|
| EP | 0 447 666 A1 | 9/1991 |
| EP | 2 289 661 A1 | 3/2011 |
| EP | 2 394 771 A1 | 12/2011 |
| JP | 3-180298 A | 8/1991 |
| JP | 06277877 A * | 10/1994 ............ B23K 35/36 |
| JP | 8-257785 A | 10/1996 |
| JP | 9-57488 A | 3/1997 |
| JP | 2001-1181 A | 1/2001 |
| JP | 2001-205484 A | 7/2001 |
| JP | 2006-110581 A | 4/2006 |
| JP | 2006-198630 A | 8/2006 |
| JP | 2008-93715 A | 7/2008 |
| JP | 2008-168312 A | 7/2008 |
| JP | 2011-5531 A | 1/2011 |
| WO | WO 2011/074689 A1 | 6/2011 |

OTHER PUBLICATIONS

Japan Welding Society, Special lecture of welding and joining technology (new edition), published in 2005, Sanpo Publications, Inc. in Tokyo, p. 141.
Office Action, mailed Feb. 4, 2014, in Japanese Patent Application 2013-252557.
Written Opinion of the International Searching Authority, mailed Jul. 23, 2013, issued in PCT/JP2013/062754.
Chinese Office Action dated Jun. 17, 2015, issued in counterpart Chinese Patent Application No. 201380023982.X.
Extended European Search Report dated Nov. 23, 2015, issued in European Patent Application No. 13787993.8.

* cited by examiner

OXIDE 1

OXIDE 2

OXIDE A

OXIDE B

FLUX-CORED WIRE FOR WELDING ULTRAHIGH TENSILE STRENGTH STEEL

TECHNICAL FIELD OF THE INVENTION

The present invention relates to a flux-cored wire that is used for welding ultrahigh tensile strength steel having a tensile strength of 950 MPa to 1500 MPa, and particularly, to a flux-cored wire for welding ultrahigh tensile strength steel by which ductility-dip cracking that occurs in an ultrahigh strength weld metal is prevented and a weld metal having excellent strength, toughness, and elongation is obtained.

Priority is claimed on Japanese Patent Application No. 2012-106607, filed on May 8, 2012, the content of which is incorporated herein by reference.

RELATED ART

Recently, demand has been growing for an increase in size and a reduction in weight of a construction machine and an industrial machine such as a construction crane. According to such demand, with regard to a steel plate, an ultrahigh tensile strength steel plate such as 950 MPa-class steel and 1180 MPa-class steel has been used. The reason why the ultrahigh tensile strength steel plate is used is as follows. That is, a reduction of a manufacturing period and a reduction of construction costs are expected in consideration of a reduction of steel costs or a transportation cost due to a reduction in weight of products and a decrease in the amount of steel used, or in consideration of satisfactory handling and a reduction in a welding amount due to a reduction in thickness and a reduction in individual weight of the steel.

However, even though the demand for a use of the ultrahigh tensile strength steel has significantly increased, a used amount of the ultrahigh tensile strength steel of 950 MPa-class or higher is still small in light of the total consumption.

With regard to this situation, the following reasons may be considered. In welding of ultrahigh tensile strength steel of 950 MPa-class or higher, it is difficult to obtain high-strength and high-toughness weld metal with a performance suitable for a base-metal steel plate, and thus development of a welding material suitable for the welding has not been sufficiently performed.

In the welding of the ultrahigh tensile strength steel, it is necessary to obtain a high-alloy weld metal. As a high-alloy welding wire, a flux-cored wire is advantageous in consideration of manufacturability, and thus it is necessary to develop a flux-cored wire that is applicable to welding of, particularly, ultrahigh tensile strength steel.

In consideration of the above-described situation, the following flux-cored wire has been suggested to secure strength or toughness necessary for welding ultrahigh tensile strength steel.

In Patent Document 1, Ni Mo, W, Nb, V, and the like, which are effective to secure strength and toughness, are added in an appropriate amount, thereby securing tensile strength and toughness of a weld metal. In addition, there is suggested a flux-cored wire which contains Si, Mn, Al, Ti, and Mg in a wire as deoxidizing elements in an appropriate amount to prevent a decrease in toughness and ductility of the weld metal due to oxygen and diffusible hydrogen in the weld metal during welding, and which is capable of lowering a critical preheating temperature during a y-groove weld cracking test to 150° C. or lower.

In addition, Patent Document 2 by the present inventors suggests a flux-cored wire in which in welding of ultrahigh tensile strength steel having a tensile strength of 950 MPa-class or higher, Mg is added to a flux to reduce the amount of diffusible hydrogen of a weld metal, particularly, so as to realize welding at a preheating temperature of 100° C., thereby obtaining a weld metal which has high toughness and in which low-temperature cracking resistance is improved.

Patent Document 3 discloses a flux-cored wire for high tensile strength steel of 490 MPa to 780 MPa-class to which metal fluoride and metal oxide are added. However, no examinations have been made on ductility-dip cracking that is problematic in high tensile strength steel with a strength level more than 780 MPa-class.

Patent Document 4 discloses a flux-cored wire to which metal fluoride capable of forming satisfactory beads without generating pores such as a pit or a gas groove even in welding of primer-coated steel or rusted steel is added. However, the flux-cored wire is a low-strength welding material and contains almost no C, Mn, and other alloy components, and thus metal oxide is a main component in a flux composition. In addition, an examination on ductility-dip cracking and toughness of a weld metal are also not made. In addition, in Patent Document 4, it is described that the metal fluoride reduces an amount of diffusible hydrogen, but the amount of the metal fluoride is also 2.0% or less, and quantitative analysis on the reduction effect is not performed.

PRIOR ART DOCUMENT

Patent Document

[Patent Document 1] Japanese Unexamined Patent Application, First Publication No. 2008-093715
[Patent Document 2] Japanese Unexamined Patent Application, First Publication No. 2011-005531
[Patent Document 3] Japanese Unexamined Patent Application, First Publication No. H08-257785
[Patent Document 4] Japanese Unexamined Patent Application, First Publication No. H03-180298

Non-Patent Document

[Non-Patent Document 1] Journal of the Japan Welding Society, "Advanced course of New Welding and Jointing Technology" published in 2005, SANPO PUBLICATIONS, INC. in Tokyo, page 141

DISCLOSURE OF THE INVENTION

Problems to be Solved by the Invention

In a weld joint of the ultrahigh tensile strength steel having a tensile strength of 950 MPa or higher, there is demand for a weld metal to have ultrahigh tensile strength similar to steel, but in a weld metal having such ultrahigh tensile strength, a problem of ductility-dip cracking has arisen.

Ductility-dip cracking is a phenomenon that occurs when a prior γ-grain boundary is cracked during multilayer welding. Welding of the ultrahigh tensile strength steel is performed as multilayer welding, since it is preferable for the welding of the ultrahigh tensile strength steel to limit a heat input per pass. In the multilayer welding, a weld metal that is formed in advance is reheated by the subsequent welding pass. At this time, C and S segregate at the prior γ-grain boundary, and the prior γ-grain boundary that becomes brittle due to the segregation cracks because of thermal contraction that occurs during cooling, which thereby leads to ductility-dip cracking.

Ductility-dip cracking is not found in a weld metal of typical high tensile strength steel. However, in a weld metal of ultrahigh tensile strength steel exceeding 950 MPa, it is necessary to employ a martensite structure by having a high-alloy weld metal so as to secure strength and toughness. Therefore, in the weld metal, significant ductility-dip cracking occurs.

Ductility-dip cracking is a very minute cracking. Ductility-dip cracking decreases elongation, since stress concentrates on tips of the crack to readily cause fracture during a tensile test. When the elongation is low, the following problem and the like occur. That is, sufficient bending cannot be performed during manufacturing.

Accordingly, there is strong demand for a flux-cored welding wire, from which a weld metal having excellent strength, toughness, and elongation is obtained, in order for the ultrahigh tensile strength steel to be widely used.

However, in Patent Documents 1, 2, 3, and 4, no examination is made on ductility-dip cracking that is problematic in the welding of high tensile strength steel having a tensile strength of 950 MPa or higher. Therefore, there is demand for a solution. In addition, there is further demand for a reduction in a preheating temperature during welding of the steel.

In addition, in Patent Document 1, ductility of a weld metal is also considered. However, when referring, for example, to Table 5 of Patent Document 1, the ductility is evaluated as absorbed energy of a Charpy impact test at −40° C., and the ductility is improved by a reduction in an amount of oxygen. When considering the above-described situation, "ductility" described in Patent Document 1 is used with the same meaning as "toughness".

On the other hand, for example, ductility-dip cracking that is problematic in the invention is cracking due to locally deficiency of ductility in a micro-unit at the prior γ-grain boundary which is defined in Non-Patent Document 1, and definition of ductility-dip cracking is different from that of the ductility used in Patent Document 1. Actually, in the invention, an evaluation index of the ductility is fracture elongation in a tensile test that is performed at room temperature as described in the following Examples.

The invention is made in consideration of the problem in the related art, and an object thereof is to provide a flux-cored wire capable of obtaining a welded joint which has high strength and high toughness and which is excellent in elongation by suppressing ductility-dip cracking during the welding of ultrahigh tensile strength steel having a tensile strength of 950 MPa to 1500 MPa.

Means for Solving the Problem

In the related art, ductility-dip cracking does not occur at a low strength level, and ductility-dip cracking has not been problematic until now. Therefore, no examination has been made on suppression of ductility-dip cracking.

The present inventors performed various examinations with regard to suppressing ductility-dip cracking. As a result, they obtained the following findings. Specifically, with regard to a flux-cored wire in which a flux is filled inside an outer steel sheath, when adding metal fluoride, C, Mn, and V to a wire under specific conditions in a flux blending and alloy composition range necessary to secure strength and toughness for a weld metal of 950 MPa or higher, ductility-dip cracking can be suppressed, and thus excellent fracture elongation is obtained. The present inventors performed an additional examination on the basis of the above finding, thereby accomplishing the invention.

That is, the gist of the invention in combination with preferred embodiments is as follows.

(1) A flux-cored wire for welding an ultrahigh tensile strength steel according to a first aspect of the present invention is a flux-cored wire for gas-shielded arc welding, the flux-cored wire including: an outer steel sheath; and a flux filled into the outer steel sheath, wherein one or more of $CaF_2$, $BaF_2$, $SrF_2$, and $MgF_2$ are included in the wire and, when a total amount thereof is defined as α, the α is more than 2.0% and equal to or less than 8.0% in terms of mass % with respect to a total mass of the wire, one or more of Ti oxide, Si oxide, Mg oxide, and Al oxide are included in the wire and, when a total amount thereof is defined as β, the β is 0.01% to 1.20% in terms of mass % with respect to the total mass of the wire, a total amount of $CaCO_3$, $BaCO_3$, $SrCO_3$, and $MgCO_3$ is less than 0.60% in terms of mass % with respect to the total mass of the wire, an amount of an iron powder in the flux is less than 5.0% in terms of mass % with respect to the total mass of the wire, a ratio of an amount of the $CaF_2$ with respect to the α is 0.50 or more, a ratio of the α with respect to the β is 2.0 to 800.0, a chemical composition includes, in terms of mass % with respect to the total mass of the wire, C: more than 0.080% and equal to or less than 0.200%, Si: 0.05% to 1.50%, Mn: 1.0% to 2.2%, Al: 0.001% to 0.400%, Ni: 1.0% to 9.0%, V: more than 0.050% and equal to or less than 0.300%, P: 0.020% or less, S: 0.020% or less, Cu: 0% to 0.800%, Cr: 0% to 2.5%, Mo: 0% to 2.0%, Ti: 0% to 0.300%, Nb: 0% to 0.05%, B: 0% to 0.0100%, Mg: 0% to 0.8%, Ca: 0% to 0.5%, REM: 0% to 0.0100%, and remainder: iron and impurities, and Ceq defined in following Expression a is 0.60% to 1.20%, $$Ceq=[C]+[Si]/24+[Mn]/6+[Ni]/40+[Cr]/5+[Mo]/4+[V]/14 \quad (a)$$

in which elements noted in brackets represent amounts of the respective elements in terms of mass %.

(2) In the flux-cored wire for welding the ultrahigh tensile strength steel according to (1), an amount of CaO in the wire may be less than 0.15% in terms of mass % with respect to the total mass of the wire.

(3) In the flux-cored wire for welding the ultrahigh tensile strength steel according to (1) or (2), the ratio of the amount of $CaF_2$ to the α may be 0.90 or more.

(4) In the flux-cored wire for welding the ultrahigh tensile strength steel according to any one of (1) to (3), with regard to a tensile test of a deposited metal which is defined in Japanese Industrial Standards JIS Z 3111-2005 with respect to gas-shielded arc welding using the wire, the tensile strength of the deposited metal may be 950 MPa to 1500 MPa.

(5) In the flux-cored wire for welding the ultrahigh tensile strength steel according to any one of (1) to (4), a slit-shaped gap may not exist in the outer steel sheath.

(6) In the flux-cored wire for welding the ultrahigh tensile strength steel according to any one of (1) to (5), a perfluoropolyether oil may be applied onto a surface of the wire.

Effects of the Invention

According to the invention, with regard to a flux-cored wire that is used in welding ultrahigh tensile strength steel having a tensile strength of 950 MPa or higher, it is possible to provide a flux-cored wire capable of obtaining a weld metal which has high strength and high toughness and which is excellent in elongation by suppressing ductility-dip cracking.

EMBODIMENTS OF THE INVENTION

In a steel plate 1 that is a target of the invention, the strength (tensile strength) of a weld metal that is to be formed is as high as 950 MPa to 1500 MPa, and the weld metal of the ultrahigh strength steel plate has a structure in which there is 90% or more of martensite. In the weld metal in a welded state, a prior γ-grain boundary is very coarse. In addition, a martensite transformation is a diffusionless transformation, and thus the γ-grain boundary that is formed during welding remains in a state of including segregates and impurities. Accordingly, toughness of the prior γ-grain boundary of the ultrahigh strength weld metal is originally low.

In addition, C enters a solid-solution state due to the martensite transformation. When such a weld metal is reheated during multilayer welding, C segregates at the coarse prior γ-grain boundary, and causes significant embrittlement. Similarly, S also segregates at the prior γ-grain boundary due to reheating during the multilayer welding, and thus causes embrittlement. In this state, cracking occurs in the prior γ-grain boundary due to thermal contraction that occurs during cooling, whereby ductility-dip cracking occurs.

With regard to the problem, the present inventors examined means for preventing segregation at a grain boundary by effectively trapping C and S in a grain or means for increasing elongation property of a weld metal. As a result, the present inventors obtained the following finding. When adding a metal fluoride, a metal oxide, C, Mn, and V in an appropriate amount, even in an ultrahigh strength weld metal, it is possible to suppress ductility-dip cracking, and thus it is possible to secure excellent fracture elongation.

An example of an experiment from which the finding is obtained will be described.

The present inventors adjusted composition of the wire similar to an example described in the following Examples to prepare seamless flux-cored wires having an finishing wire diameter φ of 1.2 mm. In the prepared wires, particularly, the amount of C, Mn, and V, and the amount of the metal fluoride and the metal oxide were changed.

Butt welding of a 950 MPa-class steel plate 1 was performed using the flux-cored wires, and No. A1 cylindrical tensile test specimens according to JIS Z 3111 (1986) were collected from weld metals that were obtained. Then, a tensile test was performed at room temperature to evaluate tensile strength and fracture elongation of the weld metals.

Figure 1:
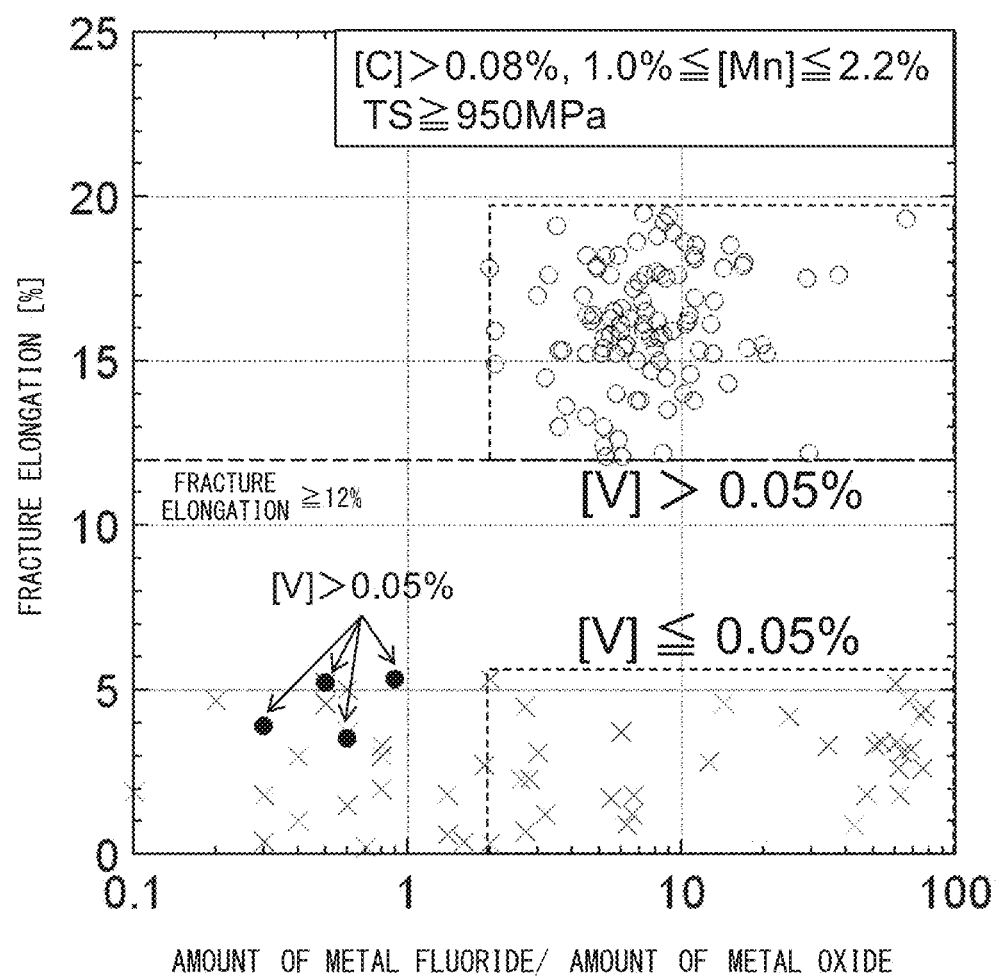
FIG. 1 is a view illustrating a relationship between fracture elongation (gauge length: 50 mm) that is obtained in a tensile test of a No. A1 round bar tensile test specimen in accordance with JIS Z 3111 (1986) and an amount of metal fluoride/an amount of metal oxide.

FIG. 1 illustrates a relationship between the fracture elongation (gauge length: 50 mm) that was obtained from the tensile test, and an amount of a metal fluoride/an amount of a metal oxide in a welding wire. Here, a symbol ○ and a symbol • represent that V is more than 0.05%, and a symbol x represents that V is 0.05% or less. In addition, FIG. 2 illustrates a relationship between the fracture elongation (gauge length: 50 mm) that was obtained from the tensile test, and an amount of C in the wire.

From FIG. 1, in the wire in which the metal fluoride is added in order for a value of the amount of the metal fluoride/the amount of the metal oxide to be 2.0 or more, and C is added in an amount of more than 0.080% in terms of mass %, Mn is added in an amount of 1.0% or more in terms of mass %, and V is added in an amount of more than 0.05% in terms of mass %, it can be seen that fracture elongation of 12% or more was obtained in the tensile test.

Figure 2:
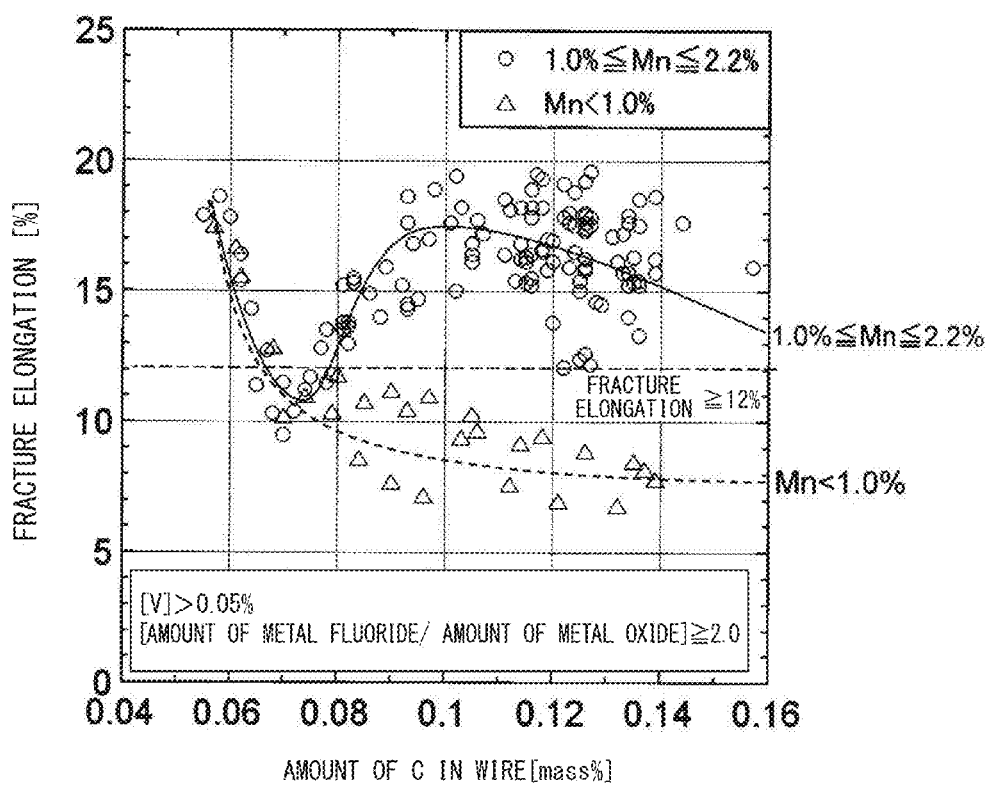
FIG. 2 is a view illustrating a relationship between fracture elongation (gauge length: 50 mm) that is obtained in a tensile test of a No. A1 round bar tensile test specimen in accordance with JIS Z 3111 (1986) and an amount of C in a wire.

In addition, from FIG. 2, in a range in which the amount of Mn in the wire was less than 1%, the fracture elongation decreases along with an increase in the amount of C in the wire. On the other hand, in a range in which the amount of Mn in the wire is 1% or more, the fracture elongation shows the same tendency as a case in which the amount of Mn is small when the amount of C in the wire is up to the vicinity of 0.07%. However, in contrast, when the amount of C exceeds 0.07%, the fracture elongation rapidly increases along with an increase in the amount of C in the wire. When the amount of C in the wire is 0.080% or more, it can be seen that excellent fracture elongation of 12% or more is exhibited.

The reason why the above-described results are obtained is considered as follows.

(i) When the metal fluoride is added to a flux in a specific range so as to establish a specific relationship with the metal oxide, S is trapped in an oxide during solidification, whereby a solid-solution amount of S is reduced and segregation of S during reheating at a prior γ-grain boundary is suppressed. As a result, it is considered that an effect of suppressing ductility-dip cracking is obtained.

The assumption is based on experiment results as shown in FIGS. 4A to 6D.

Figure 4A:
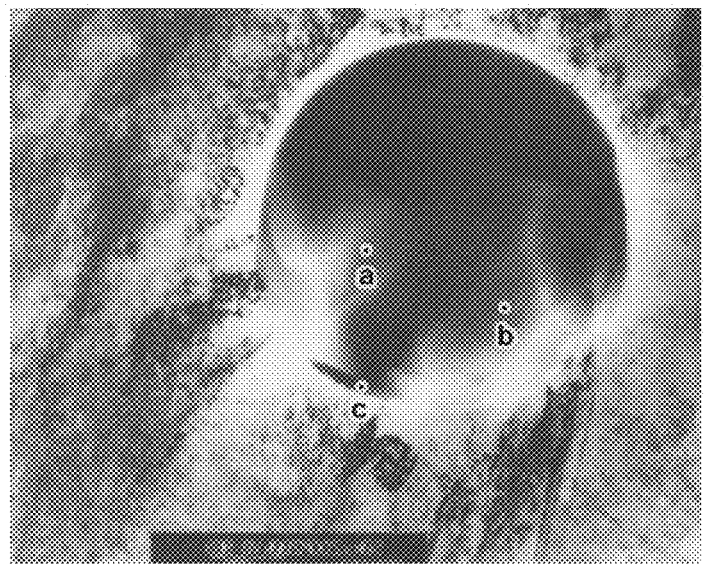
FIG. 4A is a view illustrating a shape of an oxide in a weld metal after welding using a wire of the related art, and shows transmission electron microscopy photographs of two oxides.
Figure 4A:
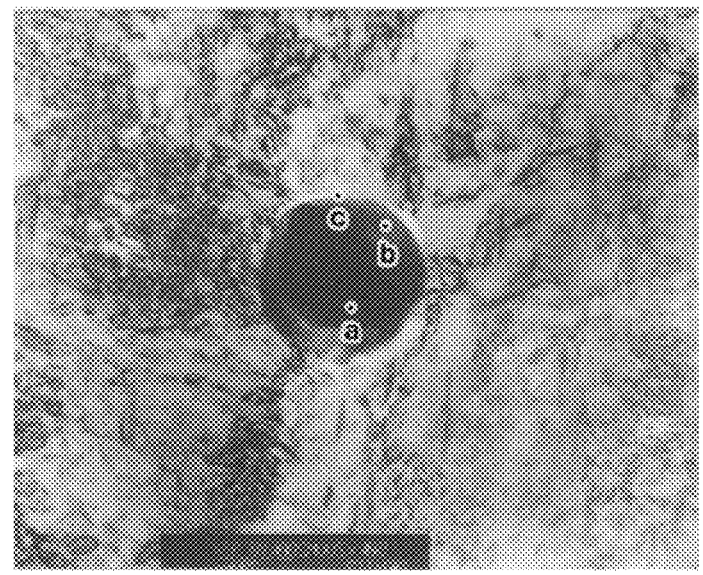
Figure 4B:
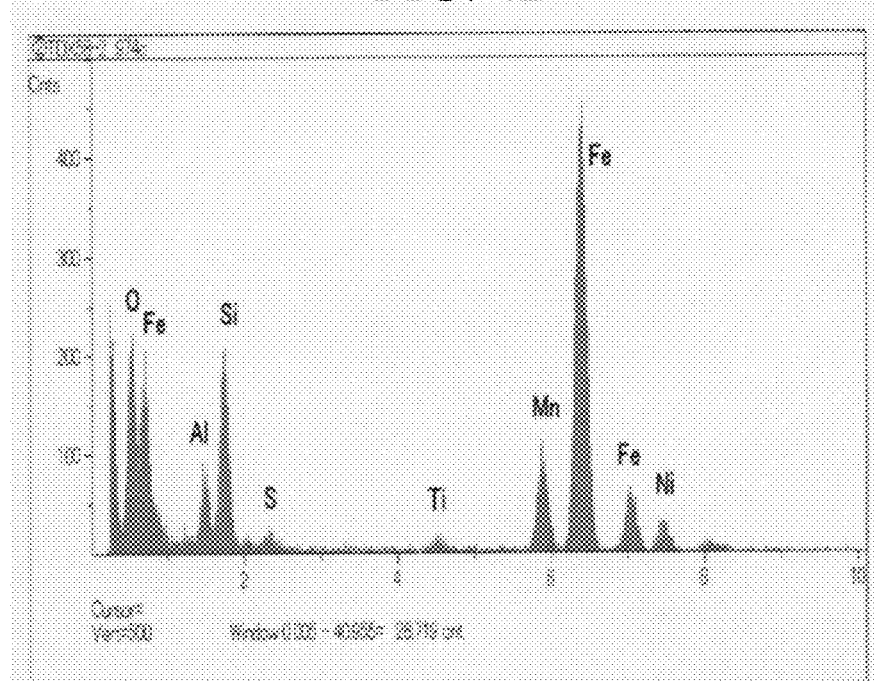
FIG. 4B is a view illustrating the shape of the oxide in the weld metal after welding using the wire of the related art, and shows results obtained by EDS analysis with respect to a surface-layer C point of the oxides in the photographs of FIG. 4A.
Figure 4B:
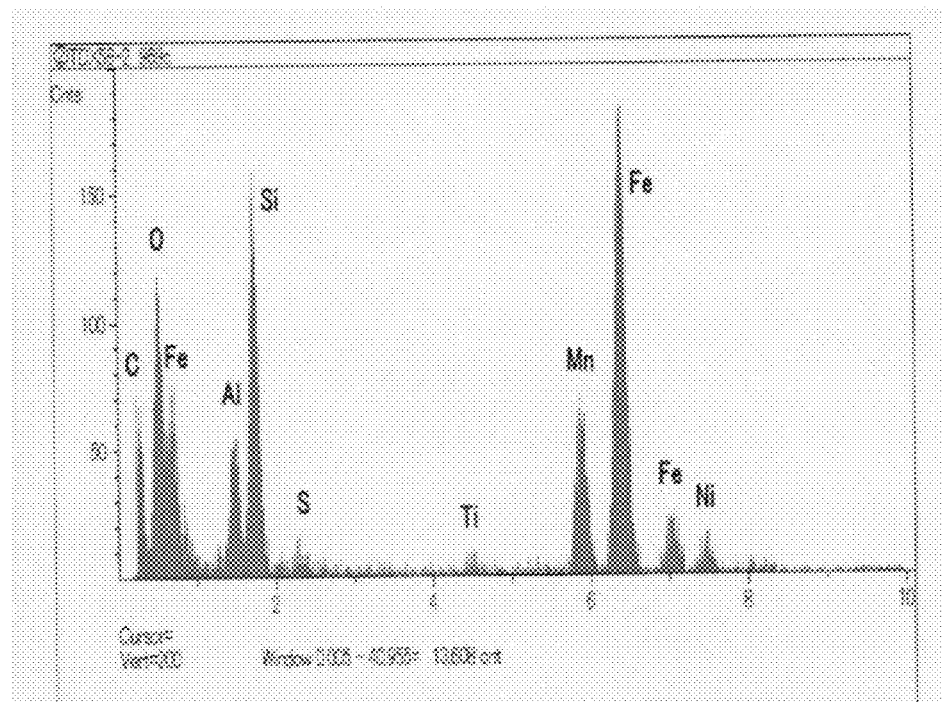

FIGS. 4A and 4B illustrate an example of results obtained by observation with a transmission electron microscope on a plurality of oxides in a weld metal after welding using a wire of the related art with respect to two oxides 1 and 2. FIG. 4A shows transmission electron microscopy photographs of the oxides, and FIG. 4B shows results obtained by EDS analysis with respect to a surface-layer C point of the oxides in the photographs of FIG. 4A. From the EDS analysis results, it can be seen that S is hardly detected in this example.

Figure 5A:
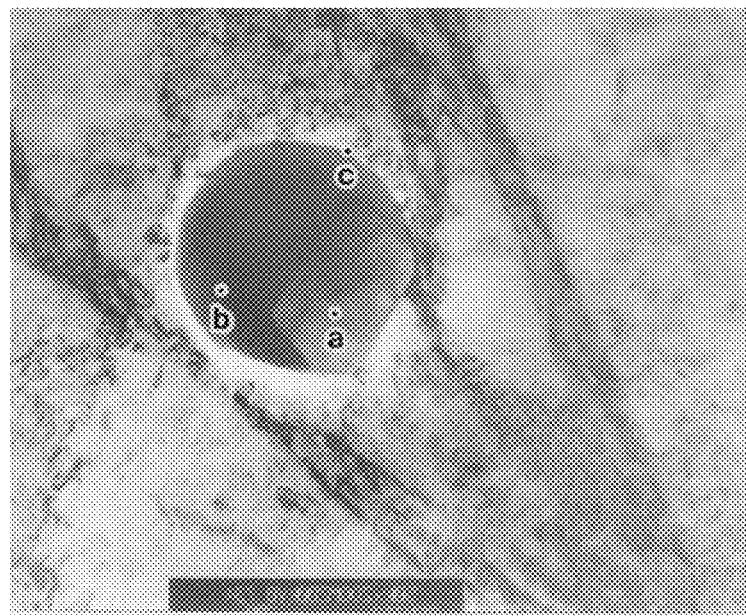
FIG. 5A is a view illustrating a shape of an oxide in a weld metal after welding using a wire of the invention, and shows transmission electron microscopy photographs of two oxides.
Figure 5A:
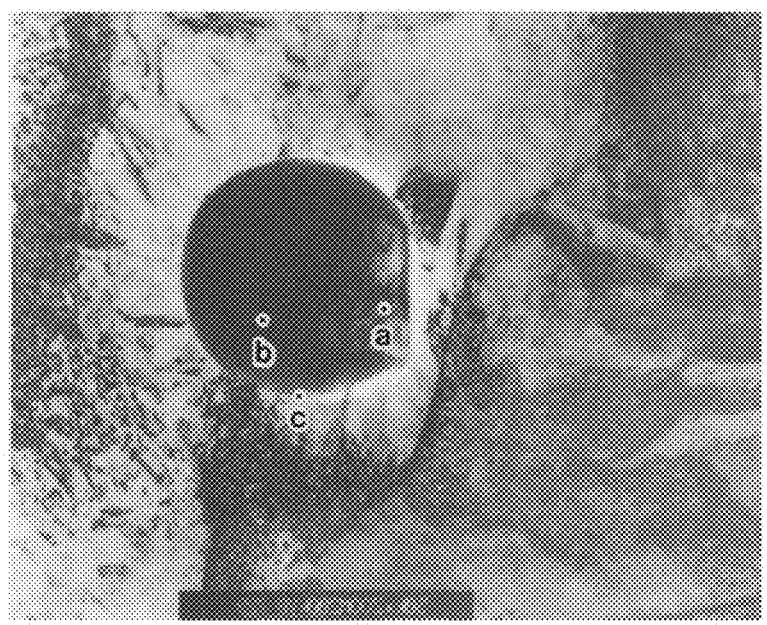
Figure 5B:
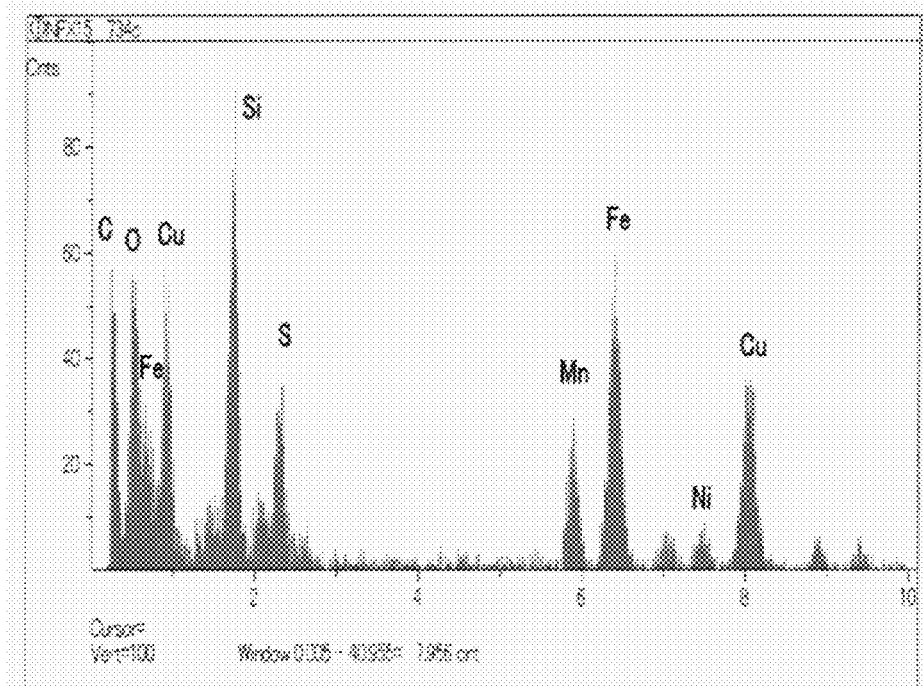
FIG. 5B is a view illustrating the shape of the oxide in the weld metal after welding using the wire of the invention, and shows results obtained by EDS analysis with respect to a surface-layer C point of the oxide in the photographs of FIG. 5A.
Figure 5B:
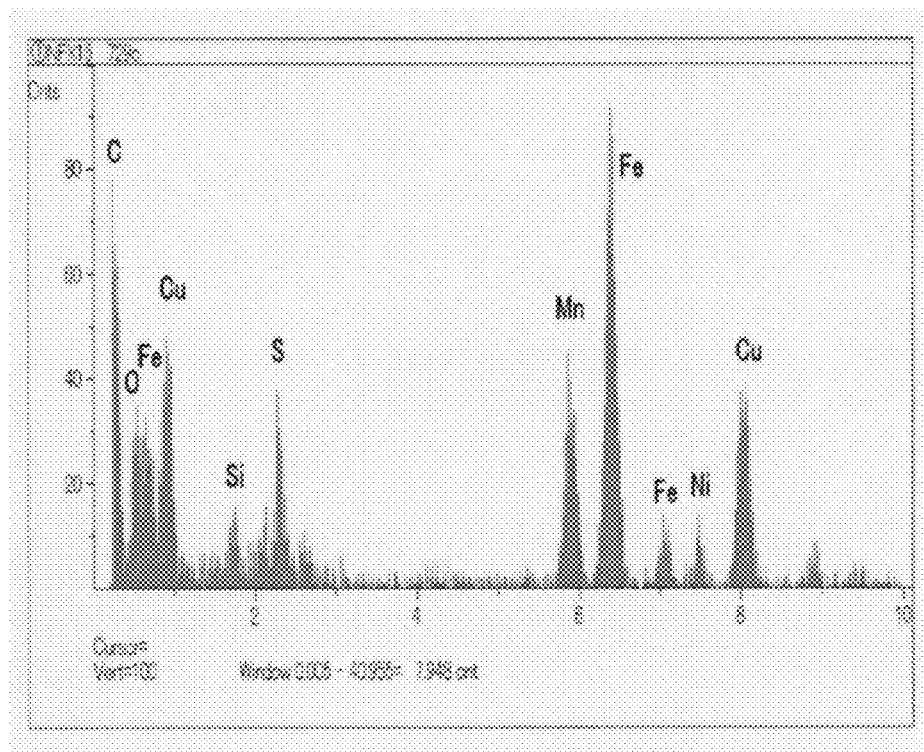

On the other hand, FIGS. 5A and 5B illustrate an example of results obtained after welding by using the wire of the invention (that is, a wire to which a metal fluoride is added in a specific range to establish a specific relationship with a metal oxide) with respect to two oxides A and B in the same manner as shown in FIGS. 4A and 4B. From the EDS analysis results, it can be seen that S is detected and apparently exists on an oxide surface layer in this example.

Figure 6A:
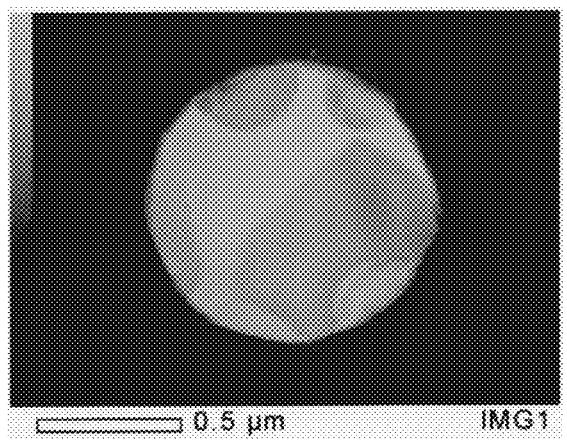
FIG. 6A is a view illustrating an example of results obtained by observation with a transmission electron microscope with respect to the inside of an oxide in the weld metal after welding using the wire of the invention, and shows an image of the oxide.
Figure 6B:
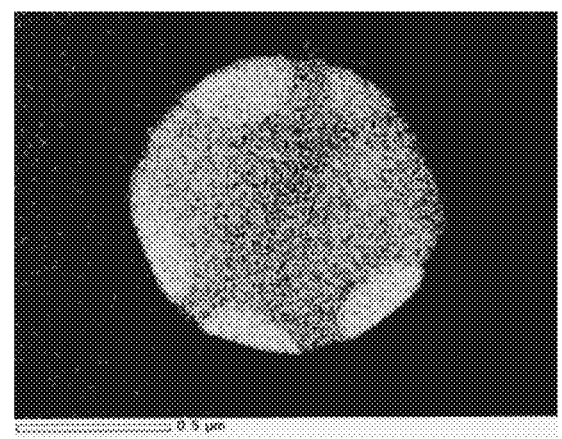
FIG. 6B is a view illustrating an example of results obtained by observation with the transmission electron microscope with respect to the inside of an oxide in the weld metal after welding using the wire of the invention, and shows EDS analysis map results of the oxide.
Figure 6C:
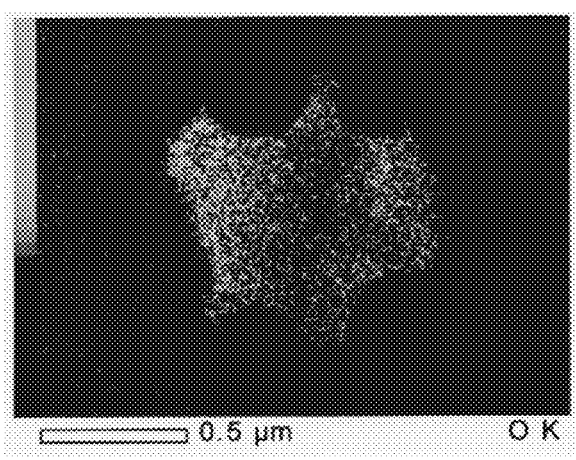
FIG. 6C is a view illustrating an example of results obtained by observation with the transmission electron microscope with respect to the inside of an oxide in the weld metal after welding using the wire of the invention, and shows a distribution of oxygen.
Figure 6D:
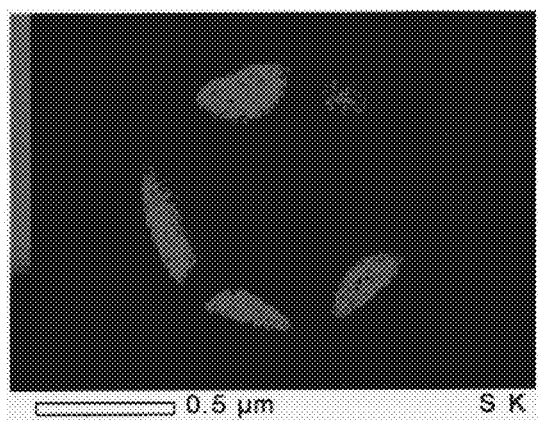
FIG. 6D is a view illustrating an example of results obtained by observation with the transmission electron microscope with respect to the inside of an oxide in the weld metal after welding using the wire of the invention, and shows a distribution of S.

FIGS. 6A to 6D illustrate an example of results obtained by observation with a transmission electron microscope with respect to the inside of an oxide in the weld metal after welding using the wire of the invention and performing an ion milling treatment to obtain a thin film, and from EDS element maps of the inside of the oxide which are shown in FIGS. 6B, 6C, and 6D, it can be apparently seen that S exists on the oxide surface.

From these results, it is considered that the following effect is obtained in the weld metal after welding using the wire of the invention. That is, a large amount of S is trapped in the oxide surface layer during solidification, and thus an amount of solid-solution S greatly decreases. Accordingly, segregation of S at the prior γ-grain boundary is suppressed, and this suppression is effective for suppression of ductility-dip cracking.

(ii) In addition, it is considered that an effect of delaying the segregation of the solid-solution C at the prior γ-grain boundary is obtained, since Mn in the weld metal has an attractive interaction with C. In addition to this, V tends to form a carbide with C, segregation of V during solidification is less, and V exists in a state of being distributed in the weld metal in a relatively uniform manner. If Mn and V are added together to the weld metal, when the weld metal is reheated, a migration speed of C toward the prior γ-grain boundary decreases due to the attractive interaction with Mn, and V forms a carbide with the solid-solution C in a γ-grain in the meanwhile, and thus it is considered that the segregation of C with respect to the prior γ-grain boundary is suppressed.

(iii) In addition, the carbide that precipitates in the prior γ-grain is minutely distributed and thus contributes to strength improvement, thereby decreasing a difference in strength in the weld metal. In addition, as an amount of C increases, an amount of precipitate increases, thereby decreasing the difference in strength in the weld metal. Accordingly, when an amount of C is raised and Mn and V are added together, the carbide precipitates with being minutely dispersed in the prior γ-grain, and uniform plastic deformation occurs in the entirety of the weld metal during working, and thus it is considered that an effect of improving fracture elongation is obtained.

Next, the reason for limiting characteristic technical requirements with respect to the flux-cored wire of Examples, to which the results of the above-described examination are applied, will be sequentially described.

First, a description will be given with respect to the reason for limiting the amount of alloy composition, metal deoxidizing composition, and other composition which are contained in an outer steel sheath and a flux which constitute the flux-cored wire of Examples.

In the following description, "%" represents "mass %" unless otherwise stated, and an amount of each composition represents a total amount of the composition in the outer steel sheath and the flux in terms of mass % with respect to the total mass of the wire.

(C: More than 0.080 and Equal to or Less than 0.200%)

When the tensile strength of the weld metal is 950 MPa or more, a structure is mainly composed of martensite. An effect of C on the strength of the martensite structure is large. In addition, the larger an amount of C in a welding wire is, the further the amount of C in the weld metal increases, thereby increasing the strength of the weld metal.

In addition, in a case where Mn and V are added together in the range of the invention, a carbide precipitates with being minutely dispersed in the prior γ-grain, thereby decreasing a difference in strength in the weld metal. According to this, uniform plastic deformation occurs in the weld metal during working, and thus the fracture elongation can be improved.

To obtain the effects, it is necessary that C be contained in an amount that is more than 0.080%. However, when C is contained in an amount that is more than 0.200%, deterioration in toughness becomes significant, and thus this range is not preferable. In addition, to stably secure the strength and the fracture elongation, the lower limit of C may be set to be more than 0.090%, more than 0.100%, or more than 0.110%, and the upper limit of C may be set to 0.180%, 0.160%, or 0.140%.

(Si: 0.05% to 1.50%)

Si is a deoxidizing element, and it is necessary for Si to be contained in an amount that is more than 0.05% to reduce an amount of O in the weld metal and to increase a degree of cleanliness of the weld metal. However, when Si is contained in an amount that is more than 1.50%, the toughness of the weld metal deteriorates, and thus the amount of Si is set to 0.05% to 1.50%. In addition, to stably secure the toughness of the weld metal, the lower limit of Si may be set to 0.20%, 0.30%, or 0.40%, and the upper limit of Si may be set to 1.20%, 1.00%, or 0.80%.

(Mn: 1.0% to 2.2%)

Mn has an attractive interaction with C, and suppresses segregation of C at the prior γ-grain boundary. Accordingly, Mn is effective for suppression of ductility-dip cracking. In addition, in the composition range of the invention, Mn promotes generation of a minute carbide in the prior γ-grain, and decreases the difference in strength in the weld metal. Accordingly, Mn has an effect of improving the fracture elongation.

To reliably exhibit the effect, it is necessary that Mn be contained in an amount of 1.0% or more. On the other hand, when Mn is contained in an amount that is more than 2.2%, residual austenite is excessively generated in the weld metal. C is concentrated in the residual austenite. When being reheated by welding in this state, a carbide is excessively generated at a residual austenite site, and thus significant embrittlement is caused.

Accordingly, the amount of Mn is set to 1.0% to 2.2%. In addition, to stably secure the effect of improving the fracture elongation, the lower limit of Mn may be set to 1.2%, 1.3%, or 1.4%, and the upper limit of Mn may be set to 2.0% or 1.8%.

(P: 0.020% or Less)

P is an impurity element, and P deteriorates the toughness and ductility of the weld metal. Accordingly, it is necessary to reduce P as much as possible. As a range capable of permitting an adverse effect against the toughness and the ductility, an amount of P is set to 0.020% or less. To further improve the toughness and the ductility, the upper limit of P may be limited to 0.015% or 0.010%. It is not necessary to limit the lower limit of P and the lower limit may be set to 0%.

(S: 0.020% or Less)

S is also an impurity element, and promotes generation of ductility-dip cracking. In addition, when S excessively exists, the toughness and the ductility deteriorate, and thus it is necessary to reduce S as much as possible. As a range capable of permitting an adverse effect against the toughness and the ductility, an amount of S is set to 0.020% or less. To further improve the toughness, the upper limit of S may be limited to 0.015%, 0.010%, or 0.008%. It is not necessary to limit the lower limit of S, and the lower limit may be set to 0%.

(Al: 0.001% to 0.400%)

Al is a deoxidizing element and is effective for reduction of O in the weld metal and effective for improvement in the degree of cleanliness, similar to Si. To exhibit the effect, Al is contained in an amount of 0.001% or more. On the other hand, when Al is contained in an amount that is more than 0.400%, Al forms a nitride or an oxide to deteriorate the toughness of the weld metal. Accordingly, the amount of Al is set to 0.001% to 0.400%. In addition, to sufficiently obtain the effect of improving the toughness of the weld metal, the lower limit of Al may be set to 0.0012% or 0.0015%. In addition, the upper limit of Al may be set to 0.200%, 0.100%, or 0.080% to suppress generation of a coarse oxide.

(Ni: 1.0% to 9.0%)

Ni is a unique element capable of improving the toughness regardless of a structure and composition due to solid-solution toughening (effect of increasing the toughness due to solid-solution), and is an element effective to increase the toughness in a high-strength weld metal having a tensile strength of 950 MPa or more.

To obtain the solid-solution toughening effect, it is preferable that 1.0% or more of Ni be contained. The more the amount of Ni is, the more advantageous for improvement in the toughness. However, when the amount of Ni is more than 9.0%, the effect is saturated, and in addition to this saturation, the manufacturing costs of the welding wire becomes excessive, and thus this range is not preferable. Therefore, when Ni is contained, the amount of Ni is set to 1.0% to 9.0%. In addition, the lower limit of Ni may be set to 1.4%, 1.6%, or 2.1% in order for the effect of Ni to reliably contribute to the improvement in the toughness. In addition, Ni is an expensive element, and the upper limit may be limited to 7.0%, 6.0%, or 4.8%.

(V: More than 0.005% and Equal to or Less than 0.300%)

V is less likely to segregate during welding solidification, and exists in the weld metal in a state of being distributed in a relatively uniform manner. When the weld metal is reheated, V traps the solid-solution C to form a carbide, thereby suppressing segregation of C at the prior γ-grain boundary. According to this, V is effective for suppression of ductility-dip cracking that occurs in an ultrahigh strength weld metal. In addition, in the composition range of the invention, V forms a minute carbide in the prior γ-grain and precipitates therein, and decreases the difference in strength in the weld metal. As a result, V has an effect of improving the fracture elongation.

To obtain the effect, it is necessary for V to be contained in an amount that is more than 0.050%. The more the amount of V is, the further the effect of suppressing ductility-dip cracking increases. However, when the amount of V is more than 0.300%, the effect is saturated, and in addition to this saturation, the toughness deteriorates, and thus, this range is not preferable. In addition, the lower limit of V may be set to 0.060%, 0.080%, 0.100%, or 0.120% to further increase the effect of suppressing ductility-dip cracking, and the upper limit of V may be limited to 0.280%, 0.250%, or 0.230% to suppress deterioration in the toughness due to V.

In addition to the above-described basic composition as the alloy composition or the metal deoxidizing composition, the flux-cored wire of the invention may contain one or more of Cu, Cr, Mo, Ti, Nb, B, Mg, Ca, and REM in accordance with a strength level of the steel plate 1 to be welded or a degree of toughness that is demanded. Regardless of whether or not the composition are intentionally added, the amount of the composition in the wire is in the range described in the claims, and the wire is regarded to be in the range of the invention. Accordingly, in the invention, the upper limit of the alloy composition is only defined, and thus a description in the claims may be any one of "set to (0 to the upper limit)", "set to (be equal to or less than the upper limit)", or "limited to (be equal to or less than the upper limit)".

(Cu: 0% to 0.800%)

Cu is added as an elementary substance or an alloy into plating on an outer sheath surface or the flux of the wire, and suppresses the segregation of C in the prior γ-grain. As a result, Cu has an effect of suppressing ductility-dip cracking. 0.800% or less of Cu may be contained to obtain the effect. On the other hand, when the amount of Cu is more than 0.800%, the toughness decreases. Accordingly, when Cu is contained, the amount of Cu is set to 0.800% or less.

Additionally, the amount of Cu includes a portion contained in the outer sheath itself and/or the flux, and further includes a portion contained in a copper plating when the copper plating is performed on a surface of the wire. The upper limit of Cu may be set to 0.600%, 0.500%, or 0.400% to obtain the effect of Cu in a more stable manner. It is not necessary to determine the lower limit of Cu, and the lower limit is 0%. The lower limit may be set to 0.050% or 0.100% as necessary.

(Cr: 0% to 2.5%)

Cr is an element that is effective for high-strengthening by increasing hardenability. 0.1% or more of Cr may be contained to obtain the effect. On the other hand, if Cr is excessively contained in an amount that is more than 2.5%, non-uniform curing of bainite and/or martensite is caused to occur, and thus the toughness deteriorates. Therefore, when Cr is contained, the amount of Cr is set to 2.5% or less. The upper limit of Cr may be set to 2.0%, 1.8%, 1.6%, or 1.4% to stably obtain the effect of Cr. It is not necessary to determine the lower limit of Cr, and the lower limit is 0%.

(Mo: 0% to 2.0%)

Mo is an element improving the hardenability. In addition, Mo forms a minute carbide, and is effective to secure the tensile strength due to precipitation strengthening. 0.1% of Mo may be contained to exhibit the effect. On the other hand, when Mo is contained in the welding wire in an amount that is more than 2.0%, a coarse precipitate is generated to deteriorate the toughness of the weld metal. Therefore, when Mo is contained in the welding wire, the amount of Mo is set to 2.0% or less. The upper limit of Mo may be set to 1.8%, 1.6%, 1.4%, or 1.2% to obtain the effect of Mo in a more stable manner. It is not necessary to determine the lower limit of Mo, and the lower limit is 0%.

(Ti: 0% to 0.300%)

Similar to Al, Ti is effective as a deoxidizing element, and has an effect of reducing an amount of O in the weld metal. In addition, Ti is effective to fix solid-solution N to mitigate an adverse effect of the solid-solution N on the toughness. 0.005% or more of Ti may be contained to exhibit the effect. However, when the amount of Ti in the welding wire is more than 0.300% and becomes excessive, possibilities of occurrence of deterioration in the toughness due to formation of a coarse oxide and occurrence of deterioration in the toughness due to excessive precipitation strengthening increase.

Therefore, when Ti is contained in the welding wire, the amount of Ti is set to 0.300% or less. It is not necessary to determine the lower limit of Ti, and the lower limit is 0%. In addition, the upper limit of Ti may be set to 0.200%, 0.100%, or 0.050% to sufficiently obtain the toughness improvement effect of the weld metal due to Ti.

(Nb: 0% to 0.05%)

Nb forms a minute carbide, and is effective to secure the tensile strength due to precipitation strengthening. To obtain the effect, even when considering a composite effect with an element having the same effect, 0.01% or more of Nb may be contained. On the other hand, when Nb is contained in an amount that is more than 0.05%, Nb is excessively contained in the weld metal, and forms a coarse precipitate, thereby deteriorating the toughness. Therefore, this range is not preferable.

Accordingly, in the invention, when Nb is contained in the welding wire, the amount of Nb is set to 0.05% or less. It is not necessary to determine the lower limit of Nb, and the lower limit is 0%. To obtain the effect of Nb in a more stable manner, the upper limit of Nb may be set to 0.04% or 0.035% as necessary, and the lower limit of Nb may be set to 0.02% to 0.03%.

(B: 0% to 0.0100%)

When B is contained in the weld metal in an appropriate amount, B is coupled to solid-solution N to form BN. Accordingly, B has an effect of reducing an adverse effect on the toughness of the solid-solution N. In addition, B increases hardenability, and has an effect of contributing to improvement in strength. 0.0003% or more of B may be contained in the welding wire to obtain these effects. On the other hand, when the amount of B is more than 0.0100%, B in the weld metal becomes excessive, and coarse B compounds such as BN and $Fe_{23}(C,B)_6$ are formed, and conversely the toughness deteriorates. Therefore, this range is not preferable.

Accordingly, when B is contained, the amount of B is set to 0.0100% or less. It is not necessary to determine the lower limit of B, and the lower limit is 0%. For improvement in the toughness, the upper limit of B may be set to 0.0080%, 0.0060%, 0.0040%, or 0.0030%, and the lower limit of B may set to 0.0004% or 0.0005%.

(Mg: 0% to 0.8%)

Mg is a strongly deoxidizing element, and reduces an amount of O in the weld metal to improve the toughness and the ductility of the weld metal. 0.1% or more of Mg may be contained to obtain this effect. However, when the amount of Mg in the welding wire is more than 0.8%, a decrease in the toughness due to generation of a coarse oxide in the weld metal is considerable, and stability of arc during welding deteriorates, and thus deterioration in an appearance of a bead may be caused in some cases.

Therefore, when Mg is contained, the amount of Mg is set to 0.8% or less. It is not necessary to determine the lower limit of Mg, and the lower limit is 0%. For securement of stability in welding work, the upper limit of Mg may be set to 0.7% or 0.6%, and the lower limit of Mg may be set to 0.2% or 0.3%.

(Ca: 0% to 0.5%)

(REM: 0% to 0.0100%)

Both of Ca and REM change a structure of sulfides and make the size of sulfides and oxides in the weld metal fine, and thus Ca and REM are effective for improvement in the ductility and the toughness. Ca or REM may be contained to obtain this effect. On the other hand, when Ca and REM are excessively contained, coarsening of the sulfides or the oxides is caused to occur, and thus deterioration in the ductility and the toughness is caused to occur. In addition, when Ca and REM are excessively contained, deterioration in the appearance of the weld bead 3 and deterioration in welding properties may occur. Therefore, the upper limit of Ca is set to 0.5%, and the upper limit of REM is set to 0.0100%. It is not necessary to determine the lower limit of Ca and REM, and the lower limit is 0%.

(Carbon Equivalent Ceq: 0.60% to 1.20%)

The flux-cored wire of the invention contains the respective elements as the alloy composition and the metal deoxidizing composition as described above. To secure the tensile strength of the weld metal, the amounts of C, Si, Mn, Ni, Cr, Mo, and V are further adjusted in such a manner that a carbon equivalent Ceq determined by Japan Welding Engineering Soc. (WES) which is expressed by the following Expression a becomes 0.60% to 1.20%.

$$Ceq=[C]+[Si]/24+[Mn]/6+[Ni]/40+[Cr]/5+[Mo]/4+[V]/14 \qquad (a)$$

Provided that, the elements in square brackets represent amounts of the respective elements in terms of mass %.

As a value of Ceq is high, the weld metal is hardened, and thus the tensile strength is improved. On the other hand, as a value of Ceq is high, the toughness decreases, and welding crack sensitivity increases, and thus it is necessary to provide a countermeasure of suppressing low-temperature cracking. When the Ceq value is less than 0.60%, the target strength (tensile strength) of the weld metal, i.e. 950 MPa or more, is not satisfied. When the Ceq value is more than 1.20%, the tensile strength of the weld metal becomes excessive, and thus the toughness of the weld metal decreases. Accordingly, a range of Ceq is set to 0.60 to 1.20%. The lower limit of Ceq may be set to 0.63%, 0.66%, or 0.70% to increase the tensile strength of the weld metal. The upper limit of Ceq may be set to 1.10%, 1.00%, or 0.90% to decrease deterioration in the toughness of the weld metal.

In addition, the amount of the elements which are contained as the alloy composition or the metal deoxidizing composition as described above does not include the amount of these elements contained in a state of a fluoride, a metal oxide, and a metal carbonate. In addition, it is not necessary for these elements to be a pure substance, and even when the elements are contained in form of an alloy such as Cu—Ni or in form of unavoidable impurities, there is no problem. In addition, even when the elements are contained in the outer steel sheath or the elements are contained as a flux, the effect is the same in each case, and thus the elements may be contained in either the outer steel sheath or the flux.

Next, chemical composition of a flux that is provided inside the outer sheath of the wire will be described.

In the flux-cored wire of Examples, one or more kinds of metal fluorides of $CaF_2$, $BaF_2$, $SrF_2$, and $MgF_2$ are contained, and the total amount (a) thereof in the wire is set to be more than 2.0% and equal to or less than 8.0%.

The metal fluorides change basicity of a molten pool. When the basicity of the molten pool is changed, trapping of S in the oxide during solidification is promoted. When S trapped in the oxide increases, solid-solution S after solidification decreases. According to this, when the weld metal is reheated, segregation of the solid-solution S at the prior γ-grain boundary is suppressed, and thus it is possible to suppress ductility-dip cracking that occurs in the ultrahigh strength weld metal. In addition, the change in the basicity due to the metal fluorides is effective for reduction of oxygen in the weld metal, and thus improvement in the toughness of the weld metal may be expected.

To obtain these effects, it is necessary for the metal fluorides to be contained with the total amount α being more than 2.0%. When the total amount α of the metal fluorides is 2.0% or less, the effects may not be sufficiently obtained. In addition, when the total amount α is more than 8.0%, welding fume and slag are excessively generated, and thus welding workability significantly deteriorates. Therefore, this range is not preferable. The lower limit of the total amount α may be set to 2.1% or more, 2.2% or more, 2.5% or more, 2.8% or more, or 3.0% or more to further obtain the effect of reducing the amount of oxygen, and the upper limit of the total amount α may be set to 7.0% or less, 6.5% or less, or 6.0% or less to suppress the deterioration in the welding workability.

In addition, as the metal fluorides, any one of $CaF_2$, $BaF_2$, $SrF_2$, and $MgF_2$ may be used in consideration of the effect of suppressing ductility-dip cracking, but $CaF_2$ is set to be contained as a main composition in consideration of the welding workability. In addition, when priority is given to the welding workability such as securement of arc stability and suppression of sputter, among the metal fluorides that are added, a ratio of $CaF_2$ to the total amount α is set to 0.50% or more. That is, the ratio of the amount of $CaF_2$ to α is set to 0.50 or more. This ratio may be set to 80% or more, 90% or more, or 100% or more as necessary.

In the flux-cored wire of Examples, one or more of Ti oxide (for example, $TiO_2$), Si oxide (for example, $SiO_2$), Mg oxide (for example, MgO), and Al oxide (for example, $Al_2O_3$) are added as a slug forming agent. These oxides are added as necessary to maintain a satisfactory appearance of the weld bead 3, and it is necessary for the metal oxides to be added in an amount of 0.01% or more with respect to the total mass of the wire to obtain the effect in an appropriate manner. However, when the metal oxides are added with a total amount β thereof being more than 1.20%, an amount of oxygen in the weld metal increases, and the toughness deteriorates, and thus this range is not preferable.

Accordingly, the total amount β of the metal oxides is set to 0.01% to 1.20%. The amount of the metal oxides is set as a total amount including an amount of the metal oxides contained in a binder and the like that are used for granulation of the flux in addition to the total amount of $TiO_2$, $SiO_2$, MgO, and $Al_2O_3$. In addition, the upper limit of the total amount β may be set to 1.00%, 0.90%, or 0.80% to suppress deterioration in the toughness due to addition of the metal oxides as much as possible. The lower limit of total amount β may be set to 0.05%, 0.10%, 0.15% or 0.20% as necessary.

To suppress ductility-dip cracking of the ultrahigh strength weld metal, in addition to the amount of each of the metal fluorides and the metal oxides, it is necessary for a ratio of the amount of the metal fluorides in terms of mass % to the amount of metal oxides in terms of mass % (that is, the amount of the metal fluorides/the amount of metal oxides, that is, the total amount α/the total amount β) to be 2.0 to 800.0. When the ratio (α/β) of the amount of the metal fluorides to the amount of metal oxides is less than 2.0, the effect of trapping S by oxides which is necessary to suppress ductility-dip cracking disappears. When the ratio (α/β) of the amount of the metal fluorides to the amount of metal oxides is more than 800.0, an arc state becomes unstable, and thus the appearance of the bead becomes poor. Therefore, this ratio is not preferable. As necessary, the lower limit of the ratio (α/β) may be 3.0, 4.0, or 5.0, and the upper limit thereof may be set to 500, 300, or 200.

An iron powder may be added for adjustment of a filling rate of the flux-cored wire or improvement of deposition efficiency as necessary. The iron powder may not be added, and the lower limit thereof is 0%. However, a surface layer of the iron powder oxidizes, and thus when the iron powder is added, an amount of oxygen in the weld metal increases, thereby decreasing the toughness. When the tensile strength is 950 MPa or more, strength is very high, and thus it is difficult to secure the toughness. Accordingly, an increase in oxygen due to the addition of iron powder is not permitted.

Accordingly, the iron powder may not be added. However, in a case of adding the iron powder to adjust the filling rate, an amount of the iron powder is limited to be less than 5.0% so as to secure the toughness. The upper limit thereof may be limited to 3.0%, 2.0%, or 1.0% to improve the toughness.

In the flux-cored wire of the invention, one or more kinds of metal carbonates of $CaCO_3$, $BaCO_3$, $SrCO_3$, and $MgCO_3$ may be further added to increase an arc stability effect and arc convergence, but when they are added in an amount of 0.60% or more, the arc concentricity becomes too strong, and thus an amount of sputter generation increases. Accordingly, in a case of metal carbonates being contained, a total amount thereof is set to be less than 0.60%. The lower limit of the total amount of metal carbonates is 0%.

Figure 8:
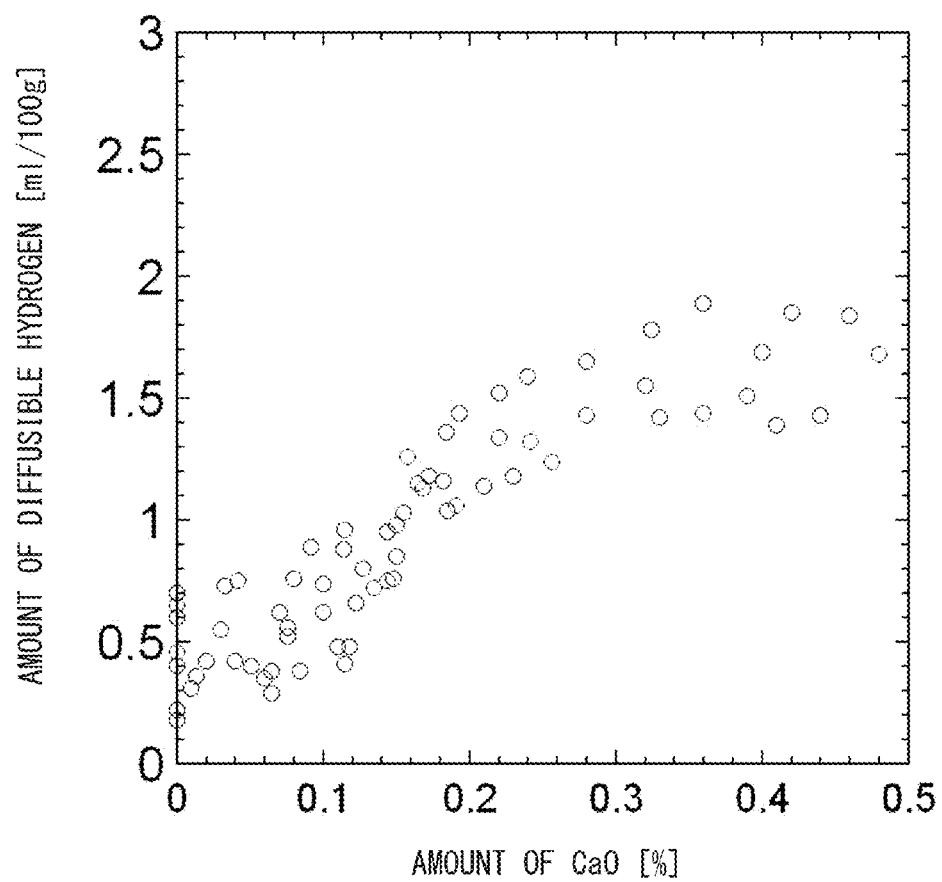
FIG. 8 is a view illustrating a relationship between an amount of CaO and an amount of diffusible hydrogen.

In the invention, it is preferable not to intentionally add CaO to the flux. However, CaO may be contained in a raw material of the flux in some cases. When Cao comes into contact with the air, CaO changes to CaOH to increase diffusible hydrogen in the weld metal. In welding of the ultrahigh tensile strength steel, when the diffusible hydrogen increases, load in a preheating process performed to suppress low-temperature cracking increases, and thus this increase is not preferable. Even in a case of being mixed in as an impurity or a case of being intentionally added, it is preferable that an amount of CaO be set to be less than 0.20% in terms of mass % with respect to the total mass of the wire. An experiment from which this finding is obtained is illustrated in FIG. 8. From FIG. 8, it can be seen that as CaO increases, the diffusible hydrogen increases, and up to 0.15%, 1.0 ml/100 g or less of diffusible hydrogen is obtained. Accordingly, it is preferable that CaO be set to be less than 0.15% so as to suppress the load increase in the preheating process. That is, it is preferable to select a raw material of the flux so as to satisfy this range. In addition, the upper limit of the amount of CaO may be set to 0.12%, 0.10%, or 0.08% as necessary.

Hereinbefore, the reason of limiting the composition of the flux-cored wire of the invention has been described, and the other remaining composition include iron and impurities. An iron composition includes Fe in the outer steel sheath, the iron powder that is added to the flux, and Fe in an alloy composition. In addition, the remainder including iron as a main composition may contain impurities that are mixed in in a manufacturing process and the like in a range not deteriorating characteristics of the invention.

In addition to the above-described composition, an arc stabilizer may further be contained as necessary. Examples of the arc stabilizer include oxides or fluorides of Na or K (for example, $Na_2O$, NaF, $K_2O$, KF, $K_2SiF_6$, $K_2ZrF_6$), and the like, and a total amount of the arc stabilizer is appropriately 0.001% to 0.40%. The arc stabilizer may not be contained, and thus the lower limit thereof is 0%. In addition, the oxides and fluorides, which are exemplified herein, are not included in the metal oxides and the metal fluorides. When the oxides or the fluorides of Na and K are excess, an arc becomes strong, and sputter and the like increase. Accordingly, a total amount of the oxides or the fluorides may be limited to 0.30% or less, 0.20% or less, less than 0.10%, or 0.08% or less as necessary.

The flux-cored wire may be classified roughly into a seamless wire not having a slit-shaped joint in an outer steel sheath, and a wire having a seam provided with a slit-shaped gap at a joint of an outer steel sheath. However, any cross-sectional structure may be employed in the present invention. When the slit-shaped gap exists, moisture in the air penetrates from the gap during storage of the wire, and thus the flux absorbs the moisture. When welding is performed in this state, an amount of the diffusible hydrogen in the weld metal increases. To avoid this, it is preferable to employ the seamless wire not having the slit-shaped joint.

In addition, a method of applying a lubricant having sliding properties onto a surface of the wire to improve wire feedability during welding is generally performed. As the lubricant for a welding wire, a perfluoropolyether oil (PFPE oil) that is a fluorine-based lubricant may be used. The perfluoropolyether oil does not contain a hydrogen source, and thus even when the perfluoropolyether oil is applied to the wire as the lubricant, the perfluoropolyether oil does not increase the diffusible hydrogen of the weld metal.

In the invention, the tensile strength of the weld metal or a deposited metal is set to the same level of tensile strength as that of the ultrahigh tensile strength steel having a tensile strength of 950 MPa to 1500 MPa. The tensile strength of the weld metal or the deposited metal can be measured by performing a tensile test of the weld metal or the deposited metal in a weld joint that is prepared by using the flux-cored wire. In addition, it is known that hardness and the tensile strength have a high correlation. The tensile strength of the weld metal or the deposited metal may be obtained by conversion from the measured hardness of the weld metal or the deposited metal of the weld joint with the correlation. In addition, even when the weld joint is not prepared by using the ultrahigh tensile strength steel, the tensile strength of the weld metal or the deposited metal may be obtained by performing a tensile test of a deposited metal defined in Japanese Industrial Standards JIS Z 3111-2005 as long as the flux-cored wire is available. In addition, the upper limit of the tensile strength of the weld metal or the deposited metal may be limited to 1400 MPa or 1350 MPa as necessary.

The flux-cored wire of the present invention may be manufactured by the same manufacturing process as a typical method of manufacturing flux-cored wire.

First, a steel strip that becomes an outer sheath, and a flux in which a metal fluoride, an alloy composition, a metal oxide, a metal carbonate, and an arc stabilizer are mixed in predetermined amounts are prepared. The steel strip is shaped to an open tube (U-shaped tube) by a shaping roll while feeding the steel strip in a longitudinal direction, thereby obtaining an outer steel sheath. Then, the flux is supplied from an opening of the open tube in the middle of the shaping, and edge surfaces that face at the opening are subjected to butt seam welding. A jointless tube that is obtained by the welding is drawn and is subjected to an annealing treatment in the middle of the drawing or after completing the drawing process, thereby obtaining a seamless wire having intended diameter. In addition, a part is set as a tube having a joint which is not subjected to seam welding, and the tube is drawn to obtain a wire having a seam.

EXAMPLES

Next, enablement and effects of the invention will be described in detail with reference to Examples.

A steel strip was shaped to an open tube by a shaping roll while feeding the steel strip in a longitudinal direction, and a flux was supplied from an opening of the open tube in the middle of the shaping. Edge surfaces that face the opening were subjected to butt seam welding to obtain a tube not having a joint, and annealing was incorporated in the middle of a drawing process of a tabulation wire, thereby preparing a flux-cored wire having an ultimate wire diameter $\phi$ of 1.2 mm. In addition, a part was set as a tube which is not subjected to seam welding and has a joint, and the tube was drawn to obtain a flux-cored wire having an ultimate wire diameter $\phi$ of 1.2 mm. A composition of the flux-cored wire that was prepared is shown in [Table 1-1] to [Table 1-5], and [Table 2-1] to [Table 2-5].

Figure 3:
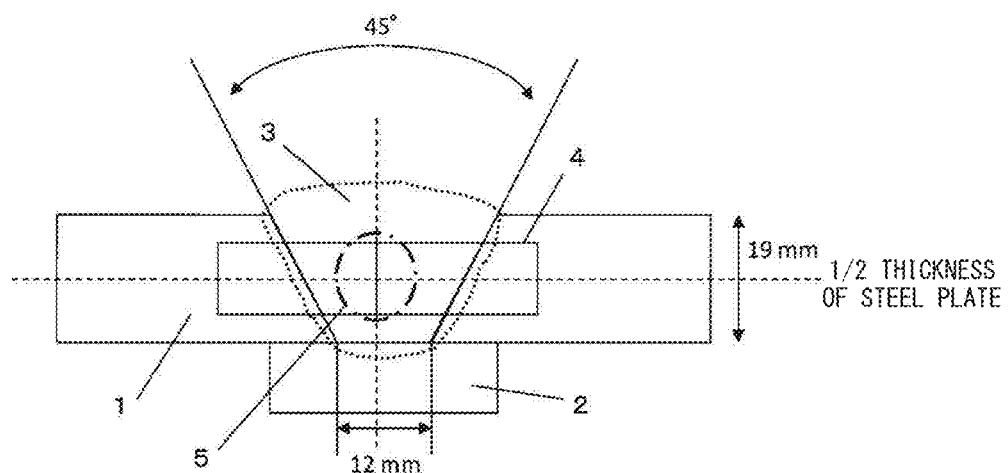
FIG. 3 is a view illustrating a test specimen collecting position in Examples (JIS Z 3111 (1986)).

As shown in FIG. 3, steel plates 1 having a plate thickness of 19 mm were butted to each other with a root gap of 12 mm and a groove angle of 45°, and then welding was performed by using the flux-cored wire and a backing metal 2. The welding was performed with one or two passes at first and second layers and with two or three passes from a third layer to a final layer. The welding was performed under welding conditions shown in [Table 3-1] to [Table 3-5]. In addition, SM490A of JIS G3106 was used as the steel plates 1 and the backing metal 2. The steel plates 1 and the backing metal 2 are used with buttering of two or more layers and of 3 mm or more being performed to a groove face of the steel plates 1 and a surface of the backing metal 2 by using the flux-cored wire that was tested. Here, as the Ti oxide, the Si oxide, the Mg oxide, and the Al oxide, $TiO_2$, $SiO_2$, MgO, $Al_2O_3$ were used, respectively. "Metal carbonate" in Tables 1-1 to Table 1-7 represents $CaCO_3$, $BaCO_3$, $SrCO_3$, and $MgCO_3$. Here, the metal carbonate of a wire No. 36 is $BaCO_3$, the metal carbonate of a wire No. 37 is $SrCO_3$, the metal carbonate of a wire No. 51 is $MgCO_3$, and the metal carbonates of the others are $CaCO_3$. "Arc stabilizer" is an oxide or a fluoride of Na and K.

[Table 1-1]
[Table 1-2]
[Table 1-3]
[Table 1-4]
[Table 1-5]
[Table 1-6]
[Table 1-7]
[Table 2-1]
[Table 2-2]
[Table 2-3]
[Table 2-4]
[Table 2-5]
[Table 2-6]
[Table 2-7]
[Table 3-1]
[Table 3-2]
[Table 3-3]
[Table 3-4]
[Table 3-5]
[Table 3-6]
[Table 3-7]

As shown in FIG. 3, a No. Al tensile test specimen (round bar) (diameter=12.5 mm) 5 in accordance with JIS Z 3111 (1986) and a Charpy test specimen (2 mm V-notch) 4 were collected from the weld metal 3 that was obtained, and then respective mechanical characteristic tests were performed to measure the yield strength, the tensile strength, the fracture elongation, the Charpy absorbed energy, and the amount of diffusible hydrogen of the weld metal.

Mechanical characteristic measurement results that were obtained and evaluation results are shown in [Table 4-1] to [Table 4-5].

In addition, in evaluation of mechanical characteristics, a case where the tensile strength was 950 MPa or more, the fracture elongation was 12% or more, and with regard to the toughness, absorbed energy was 27 J or more in the Charpy impact test at 40° C. was regarded as passing.

As shown in the test results shown in [Table 4-1] to [Table 4-5], wire Nos. 1 to 108, which were Examples of the invention, were excellent in all of the strength, the elongation, and the toughness and were regarded as passing.

On the other hand, wire Nos. 109 to 160, which were Comparative Examples, did not satisfy requirements defined in the invention with respect to the flux composition and the alloy composition, and thus the strength, the elongation, and the toughness were not satisfied, or evaluation on the characteristics could not be performed due to inferior welding workability. As a result, all of the wire Nos. 109 to 160 were regarded as failing in the overall determination.

In wire Nos. 127 and 129, the amount of metal fluorides contained in the wire was less than a range of the invention. Therefore, ductility-dip cracking could not be suppressed, the fracture elongation became a low value, and the toughness became a low value. As a result, wire Nos. 127 and 129 were regarded as failing.

In wire Nos. 128 and 130, the amount of metal fluorides contained in the wire was more than the range of the invention. Therefore, arc was unstable and an appearance of a bead was inferior. As a result, evaluation could not be performed, and the wire Nos. 128 and 130 were regarded as failing.

In wire Nos. 124 to 126, 131, and 132, the ratio of the amount of the metal fluoride to the amount of the metal oxide was less than a range of the invention. Therefore, ductility-dip cracking could not be suppressed, and thus the fracture elongation became a low value. As a result, the wire Nos. 124 to 126, 131, and 132 were regarded as failing.

In wire Nos. 133 and 134, the amount of the metal oxide and the iron powder which were contained in the wire were more than the range of the invention. Therefore, the amount of oxygen of the weld metal increased, and thus the toughness decreased. As a result, the wire Nos. 133 and 134 were regarded as failing.

In wire No. 135, the amount of the metal carbonate contained in the wire was more than the range of the invention, and thus weldability and workability were inferior. As a result, the wire No. 135 was regarded as failing.

In wire No. 147, the proportion of $CaF_2$ in the metal fluoride was low, and thus welding workability was inferior. Therefore, evaluation was not performed.

In wire Nos. 109 to 123, 136 to 146, and 148 to 160, the amount of the alloy composition and the metal deoxidizing composition which were contained in the wire deviated from the range of the invention, and any one of the strength, the elongation, and the toughness was not satisfied. As a result, the wire Nos. 109 to 123, 136 to 146, and 148 to 160 were regarded as failing. In addition, in wire No. 147, welding workability and was inferior, and thus evaluation was not performed.

In wire Nos. 109, 110, 115, 116, and 136, the amount of C was less than the range of the invention, and thus the tensile strength became a low value. As a result, the wire Nos. 109, 110, 115, 116, and 136 were regarded as failing. In addition, in wire No. 137, C was more than the range of the invention, and thus the toughness became a low value. As a result, the wire No. 137 was regarded as failing.

In wire No. 138, the amount of Si was less than the range of the invention. Therefore, the amount of oxygen of the weld metal could not be reduced, and thus the toughness decreased. As a result, the wire No. 138 was regarded as failing. In addition, in wire No. 139, the amount of Si was more than the range of the invention, and thus the toughness became a low value. As a result, the wire No. 139 was regarded as failing.

In wire Nos. 111, 112, 122, 123, and 140, the amount of Mn was less than the range of the invention, and thus the fracture elongation became a low value. As a result, the wire Nos. 111, 112, 122, 123, and 140 were regarded as failing. In addition, in wire Nos. 117 to 121, and 141, the amount of Mn was more than the range of the invention, and thus the toughness became a low value. As a result, the wire Nos. 117 to 121, and 141 were regarded as failing.

In wire No. 144, the amount of Al was less than the range of the invention. Therefore, the amount of oxygen of the weld metal could not be reduced, and thus the toughness decreased. As a result, the wire No. 144 was regarded as failing. In addition, in wire No. 145, the amount of Al was more than the range of the invention, and thus the toughness became a low value. As a result, the wire No. 145 was regarded as failing.

In wire No. 146, the amount of Ni was less than the range of the invention, and thus the toughness became a low value. As a result, the wire No. 146 was regarded as failing.

In wire Nos. 113, 114, and 148, the amount of V was less than the range of the invention. Therefore, ductility-dip cracking could not be suppressed, and thus the fracture elongation became a low value. As a result, the wire Nos. 113, 114, and 148 were regarded as failing. In addition, in wire No. 149, the amount of V was more than the range of the invention, and thus the toughness became a low value. As a result, the wire No. 149 was regarded as failing.

In wire No. 142, the amount of P was more than the range of the invention, and thus the fracture elongation and the toughness became a low value. As a result, the wire No. 142 was regarded as failing.

In wire No. 143, the amount of S was more than the range of the invention, and thus the fracture elongation and the toughness became a low value. As a result, the wire No. 143 was regarded as failing.

In wire Nos. 150 to 158, the amount of Cu, Cr, Mo, Ti, Nb, B, Mg, Ca, and REM were more than the range of the invention, and thus the toughness became a low value. As a result, the wire Nos. 150 to 158 were regarded as failing.

In wire No. 159, the value of Ceq was less than the range of the invention, and thus the tensile strength became a low value. As a result, the wire No. 159 was regarded as failing. In addition, in wire No. 160, the value of Ceq was more than the range of the invention, and thus the toughness became a low value. As a result, the wire No. 160 was regarded as failing.

Figure 7:
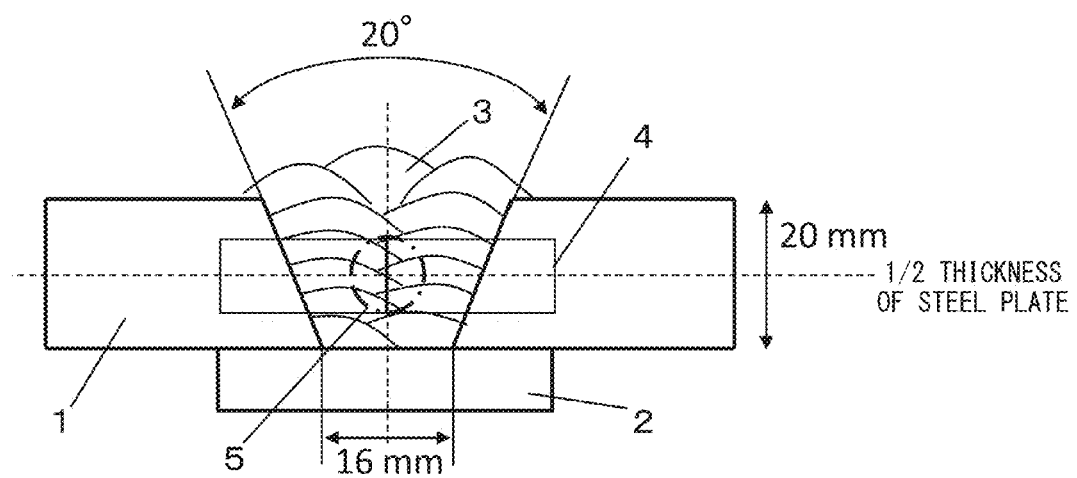
FIG. 7 is a view illustrating a test specimen collecting position in Examples (JIS Z 3111 (2005)).

Evaluation was performed in accordance with JIS Z 3111 (2005) with respect to wire Nos. 161 to 175 shown in [Table 1-6] and [Table 2-6]. That is, the evaluation was performed in a manner as shown in FIG. 7 (test plate symbol: 1.3). Steel plates 1 having a plate thickness of 20 mm were butted to each other with a root gap of 16 mm and a groove angle of 20°, and then welding was performed by using a backing metal 2. The welding was performed with one or two passes at first and second layers and with two or three passes from a third layer to a final layer. Welding conditions are shown in [Table 3-6]. In addition, SM490A was used as the steel plates 1 and the backing metal 2. The steel plates 1 and the backing metal 2 are used with buttering of two or more layers and of 3 mm or more being performed to a groove face of the steel plates 1 and a surface of the backing metal 2 by using the flux-cored wire that was tested. As mechanical test specimens, a No. AO tensile test specimen (round bar) (diameter=10 mm) 5 in accordance with JIS Z 3111 (2005) and a Charpy test specimen (2 mm V-notch) 4 were collected. Then, respective mechanical characteristic tests were performed to measure the yield strength, the tensile strength, the fracture elongation, the Charpy absorbed energy, and the amount of diffusible hydrogen of the weld metal. Mechanical characteristic measurement results that were obtained and evaluation results are shown in [Table 4-6].

Wire Nos. 161 to 170, which were Examples of the invention, were excellent in all of the strength, the elongation, and the toughness and were regarded as passing. On the other hand, in wire No. 171 that was Comparative Example, the metal oxide was less than the range of the invention, and thus the appearance of the weld bead 3 was inferior. As a result, the wire No. 171 was regarded as failing. Wire Nos. 172 and 173 were Comparative Examples in which the metal fluoride was less, or the metal fluoride was not contained, but there was less metal fluoride, and thus the diffusible hydrogen was not reduced. Wire No. 174 was Comparative Example of a solid wire, but the diffusible hydrogen was not reduced to a degree of the wire of the invention. Wire No. 175 that was an Example of the invention used a flux in which the amount of CaO as an impurity was large, and thus 0.28% of CaO was contained in terms of mass % with respect to the total mass of the wire. Test results of the wire No. 175 were excellent in all of the strength, the elongation, and the toughness. As a result, the wire No. 175 was regarded as passing.

Wire Nos. 5-2, 6-2, 30-2, 61-2, 62-2, and 90-2 of Examples, which are shown in [Table 1-7] and [Table 2-7] are the same wires as the wire Nos. 5, 6, 30, 61, 62, and 90 of Examples which are shown in [Table 1-1] to [Table 1-3]. Evaluation was performed in accordance with JIS Z 3111 (2005) by using these wires. Welding conditions are shown in [Table 3-7]. Mechanical characteristic measurement results and evaluation results are shown in [Table 4-7]. Similar to the evaluation results in JIS Z 3111 (1986), all of the strength, the elongation, and the toughness were excellent, and the wires was regarded as passing. Accordingly, there is no difference in characteristics due to a difference in an evaluation method between JIS Z 3111-2005 and JIS Z 3111-1986.

With respect to wire Nos. 161 to 175 shown in [Table 1-6] and wire Nos. 5-2, 6-2, 30-2, 61-2, 62-2, and 90-2 shown in [Table 1-7], the amount of CaO in the flux was analyzed.

Measurement of the amount of diffusible hydrogen was performed by gas chromatography in accordance with a method of measuring an amount of diffusible hydrogen of a steel welded part (JIS Z 3118 (2005)). As welding conditions, a current was set to 280 A, a voltage was set to 30 V, and a welding speed was set to 350 mm/min. Results are shown in [Table 4-1] to [Table 4-7]. In any wire, the amount of diffusible hydrogen was 1.0 ml/100 g or less, and thus there was less hydrogen. In the flux-cored wire of the invention, it is considered that the amount of diffusible hydrogen was reduced due to the metal fluoride. Accordingly, the flux-cored wire of the invention is excellent in low-temperature cracking resistance, and thus it is possible to lower a preheating temperature during welding.

In wire Nos. 161 to 164, 166, and 169 of Examples, as shown in Table 3-6, welding was performed without preheating during preparation of a weld joint. In any weld joint, low-temperature cracking was not recognized, and the flux-cored wire of the invention was excellent in the low-temperature cracking resistance.

In addition, an evaluation test on the low-temperature cracking resistance was performed with respect to wire Nos. 161 to 163, 168, 170, and 172 to 175 to evaluate the low-temperature cracking resistance of the wires that were prepared. The evaluation test on the low-temperature cracking resistance was performed in a room capable of constantly managing an atmosphere to be a temperature of 20° C. and humidity of 60% by a method in accordance with JIS Z 3157 (y-groove weld cracking test) under the same welding conditions in Table 3 as the mechanical characteristic test by using TS 1180 MPa steel having a plate thickness of 25 mm. Table 6 shows chemical composition and mechanical characteristics of the steel plate that was used in the y-groove weld cracking test. A critical preheating temperature that was obtained during the y-groove weld cracking test is shown in Table 5. In wire Nos. 172 and 173 in which the amount of metal fluoride was small, the critical preheating temperature was 150° C., and in wire No. 174 that was a solid wire, the critical preheating temperature was 100° C. In contrast, in the wire of the invention, the critical preheating temperature was 50° C. or lower, and it could be seen that the wire of the invention was also excellent in the low-temperature cracking resistance due to reduction of the diffusible hydrogen. The wire of the invention is a flux-cored wire, and thus in the flux that is embedded, a considerable amount of diffusible hydrogen source such as crystallization water is contained. Therefore, the amount of diffusible hydrogen of the weld metal in the wire of the invention further increases in comparison to the solid wire, but exactly contrary results are obtained. In the wire of the invention, the critical preheating temperature is also lower than that of the solid wire. In this manner, the reason why the amount of diffusible hydrogen decreases and thus the t critical preheating temperature is low is considered to be as follows. Fluorine in the fluoride is coupled to hydrogen during welding, and thus the fluorine is discharged to the air as hydrogen fluoride. As a result, the diffusible hydrogen in the weld metal is reduced. That is, when using the wire of the invention, it is possible to further lower the preheating temperature in comparison to a case of using the solid wire.

In addition, in wire No. 175, the amount of CaO was large. Therefore, it is considered that the amount of diffusible hydrogen increased, and thus the low-temperature cracking resistance decreased. From this consideration, it can be seen that it is also preferable to limit the upper limit of the amount of CaO so as to improve the low-temperature cracking resistance.

[Table 4-1]

[Table 4-2]

[Table 4-3]

[Table 4-4]

[Table 4-5]

[Table 4-6]

[Table 4-7]

[Table 5]

[Table 6]

INDUSTRIAL APPLICABILITY

According to the invention, it is possible to provide a flux-cored wire capable of obtaining a weld metal which has high strength and high toughness and which is excellent in elongation by suppressing ductility-dip cracking during the welding of ultrahigh tensile strength steel having a tensile strength of 950 MPa to 1500 MPa.

BRIEF DESCRIPTION OF THE REFERENCE SYMBOLS

1: STEEL PLATE
2: BACKING METAL
3: WELD BEAD
4: CHARPY TEST SPECIMEN (2 mm V-NOTCH)
5: TENSILE TEST SPECIMEN (ROUND BAR)

TABLE 1-1

| WIRE No. | CATEGORY | REMARKS | CHEMICAL COMPOSITION OF FLUX(mass % WITH RESPECT TO THE TOTAL MASS OF THE WIRE) ||||||||||
|---|---|---|---|---|---|---|---|---|---|---|---|---|
| | | | METAL FLUORIDE ||||| METAL OXIDE |||||
| | | | $CaF_2$ | $BaF_2$ | $SrF_2$ | $MgF_2$ | TOTAL AMOUNT[α] | $TiO_2$ | $SiO_2$ | MgO | $Al_2O_3$ | TOTAL AMOUNT[β] |
| 1 | EXAMPLE | | 2.1 | | | | 2.1 | 0.12 | 0.24 | | | 0.36 |
| 2 | EXAMPLE | | 2.5 | | | | 2.5 | | 0.28 | | 0.08 | 0.36 |
| 3 | EXAMPLE | | 2.9 | | | | 2.9 | | 0.22 | | | 0.22 |
| 4 | EXAMPLE | | 3.3 | | | | 3.3 | | 0.34 | | | 0.34 |
| 5 | EXAMPLE | | 3.8 | | | | 3.8 | | 0.42 | | | 0.42 |
| 6 | EXAMPLE | | 4.2 | | | | 4.2 | 0.23 | 0.56 | | | 0.79 |
| 7 | EXAMPLE | APPLIED PFPE:X | 5.0 | | 0.3 | | 5.3 | 0.12 | 0.45 | 0.22 | | 0.79 |
| 8 | EXAMPLE | | 5.3 | | | | 5.3 | | 0.41 | | | 0.41 |
| 9 | EXAMPLE | APPLIED PFPE:X | 5.7 | | | | 5.7 | 0.54 | 0.38 | | | 0.92 |
| 10 | EXAMPLE | | 5.9 | | | | 5.9 | | 0.34 | | 0.05 | 0.39 |
| 11 | EXAMPLE | | 2.4 | 0.2 | | | 2.6 | | 0.01 | | | 0.01 |
| 12 | EXAMPLE | | 2.6 | | | 0.3 | 2.9 | | 0.64 | | | 0.64 |
| 13 | EXAMPLE | | 3.0 | | 0.2 | | 3.2 | | 0.55 | 0.33 | | 0.88 |
| 14 | EXAMPLE | | 3.3 | | | 0.2 | 3.5 | 0.33 | 0.68 | | | 1.01 |
| 15 | EXAMPLE | APPLIED PFPE:X | 3.5 | | | | 3.5 | | 0.72 | | | 0.72 |
| 16 | EXAMPLE | | 3.6 | | | | 3.6 | 0.02 | | | | 0.02 |
| 17 | EXAMPLE | | 3.9 | | | | 3.9 | 0.12 | 0.35 | 0.21 | | 0.68 |
| 18 | EXAMPLE | | 6.2 | 0.1 | 0.2 | 0.1 | 6.6 | | 0.36 | 0.25 | | 0.61 |
| 19 | EXAMPLE | | 7.8 | | | | 7.8 | 0.26 | 0.43 | | | 0.69 |
| 20 | EXAMPLE | | 6.4 | 0.4 | 0.5 | 0.6 | 7.9 | | 0.47 | | | 0.47 |
| 21 | EXAMPLE | | 4.8 | | | | 4.8 | 0.25 | 0.53 | | 0.15 | 0.93 |
| 22 | EXAMPLE | | 5.4 | | | | 5.4 | | 0.31 | | | 0.31 |
| 23 | EXAMPLE | | 4.2 | | | | 4.2 | | | 0.03 | | 0.03 |
| 24 | EXAMPLE | HAVING SEAM | 3.6 | | | | 3.6 | 1.00 | 0.20 | | | 1.20 |
| 25 | EXAMPLE | HAVING SEAM | 3.4 | 0.2 | | 0.1 | 3.7 | | 0.18 | | | 0.18 |
| 26 | EXAMPLE | | 2.9 | | | | 2.9 | | 0.02 | | | 0.02 |
| 27 | EXAMPLE | | 2.5 | 0.2 | 0.1 | 0.1 | 2.9 | | 0.26 | | | 0.26 |
| 28 | EXAMPLE | | 2.4 | | | | 2.4 | 0.73 | 0.46 | | | 1.19 |
| 29 | EXAMPLE | | 3.5 | | | 0.1 | 3.6 | | 0.49 | | | 0.49 |
| 30 | EXAMPLE | | 4.3 | | | | 4.3 | | 0.50 | | | 0.50 |

| WIRE No. | CHEMICAL COMPOSITION OF FLUX(mass % WITH RESPECT TO THE TOTAL MASS OF THE WIRE) ||| TOTAL AMOUNT[α]/ TOTAL AMOUNT[β] | MASS RATIO OF $CaF_2$ TO METAL FLUORIDE(%) |
|---|---|---|---|---|---|
| | IRON POWDER | METAL CARBONATE | ARC STABILIZER | | |
| 1 | | | 0.043 | 5.8 | 100 |
| 2 | 0.4 | | 0.005 | 6.9 | 100 |
| 3 | | | 0.002 | 13.2 | 100 |
| 4 | | | 0.032 | 9.7 | 100 |
| 5 | | | 0.048 | 9.0 | 100 |
| 6 | | | 0.045 | 5.3 | 100 |
| 7 | | | 0.027 | 6.7 | 94 |
| 8 | | 0.58 | 0.030 | 12.9 | 100 |
| 9 | | | 0.390 | 6.2 | 100 |
| 10 | | | 0.088 | 15.1 | 100 |
| 11 | 4.8 | 0.23 | 0.076 | 260.0 | 92 |
| 12 | 1.2 | | 0.127 | 4.5 | 90 |
| 13 | | | 0.077 | 3.6 | 94 |
| 14 | | | 0.043 | 3.5 | 94 |
| 15 | | | 0.031 | 4.9 | 100 |
| 16 | | | 0.047 | 180.0 | 100 |
| 17 | | | 0.003 | 5.7 | 100 |
| 18 | | 0.04 | 0.084 | 10.8 | 94 |
| 19 | | | 0.113 | 11.3 | 100 |
| 20 | | | 0.146 | 16.8 | 81 |
| 21 | | | 0.053 | 5.2 | 100 |
| 22 | | 0.02 | 0.046 | 17.4 | 100 |
| 23 | | | 0.042 | 140.0 | 100 |
| 24 | | | 0.046 | 3.0 | 100 |
| 25 | | | 0.037 | 20.6 | 92 |
| 26 | 3.2 | | 0.045 | 145.0 | 100 |

TABLE 1-1-continued

| | | | | |
|---|---|---|---|---|
| 27 | | 0.12 | 0.052 | 11.2 | 86 |
| 28 | | | 0.029 | 2.0 | 100 |
| 29 | 0.8 | | 0.024 | 7.3 | 97 |
| 30 | | | 0.032 | 8.6 | 100 |

X:PFPE; PERFLUOROPOLYETHER OIL

TABLE 1-2

| WIRE No. | CATEGORY | REMARKS | CHEMICAL COMPOSITIN OF FLUX(mass % WITH RESPECT TO THE TOTAL MASS OF THE WIRE) ||||||||||
| | | | METAL FLUORIDE |||| | METAL OXIDE ||||  |
| | | | $CaF_2$ | $BaF_2$ | $SrF_2$ | $MgF_2$ | TOTAL AMOUNT[α] | $TiO_2$ | $SiO_2$ | MgO | $Al_2O_3$ | TOTAL AMOUNT[β] |
|---|---|---|---|---|---|---|---|---|---|---|---|---|
| 31 | EXAMPLE | | 2.3 | | | | 2.3 | 0.24 | 0.22 | | 0.14 | 0.60 |
| 32 | EXAMPLE | | 2.4 | | 0.1 | | 2.5 | | 0.43 | | | 0.43 |
| 33 | EXAMPLE | | 2.8 | | | | 2.8 | | 0.46 | 0.40 | | 0.86 |
| 34 | EXAMPLE | | 3.2 | | | | 3.2 | 0.13 | 0.42 | 0.18 | | 0.73 |
| 35 | EXAMPLE | | 3.5 | | | | 3.5 | | 0.47 | | | 0.47 |
| 36 | EXAMPLE | | 3.8 | | | | 3.8 | | 0.53 | | | 0.53 |
| 37 | EXAMPLE | | 4.2 | | | | 4.2 | | 0.38 | 0.52 | | 0.90 |
| 38 | EXAMPLE | | 4.5 | | 0.3 | | 4.8 | | 0.36 | 0.43 | | 0.79 |
| 39 | EXAMPLE | APPLIED PFPE:X | 2.2 | 0.3 | | | 2.5 | | 0.42 | | | 0.42 |
| 40 | EXAMPLE | | 2.4 | | | | 2.4 | | 0.46 | | | 0.46 |
| 41 | EXAMPLE | | 5.9 | | | 0.1 | 6.0 | | 0.52 | 0.23 | | 0.75 |
| 42 | EXAMPLE | | 6.1 | | | | 6.1 | | 0.84 | | | 0.84 |
| 43 | EXAMPLE | | 7.2 | | | | 7.2 | 0.22 | 0.46 | | | 0.68 |
| 44 | EXAMPLE | | 7.9 | | | | 7.9 | | 0.21 | | | 0.21 |
| 45 | EXAMPLE | | 3.2 | | | | 3.2 | | 0.03 | | | 0.03 |
| 46 | EXAMPLE | | 3.6 | | | | 3.6 | | 0.02 | | | 0.02 |
| 47 | EXAMPLE | | 3.4 | 0.8 | | | 4.2 | | 0.02 | | | 0.02 |
| 48 | EXAMPLE | | 4.2 | 0.1 | | | 4.3 | 0.15 | | | | 0.15 |
| 49 | EXAMPLE | | 4.6 | | 0.3 | 0.2 | 5.1 | | | | 0.03 | 0.03 |
| 50 | EXAMPLE | | 4.8 | | | | 4.8 | 0.23 | 0.23 | | | 0.46 |
| 51 | EXAMPLE | APPLIED PFPE:X | 2.9 | | | | 2.9 | 0.16 | 0.43 | | | 0.59 |
| 52 | EXAMPLE | | 3.3 | 0.1 | 0.1 | 0.2 | 3.7 | 0.25 | 0.42 | | | 0.67 |
| 53 | EXAMPLE | | 3.5 | | | | 3.5 | | 0.34 | 0.24 | | 0.58 |
| 54 | EXAMPLE | | 3.9 | | | | 3.9 | 0.48 | 0.28 | | | 0.76 |
| 55 | EXAMPLE | | 4.3 | | | | 4.3 | | 0.56 | | | 0.56 |
| 56 | EXAMPLE | | 4.0 | 0.2 | | | 4.2 | 0.72 | 0.42 | | | 1.14 |
| 57 | EXAMPLE | HAVING SEAM | 3.6 | | | 0.2 | 3.8 | | 0.13 | | | 0.13 |
| 58 | EXAMPLE | HAVING SEAM | 3.5 | | | 0.3 | 3.8 | | 0.25 | | 0.18 | 0.43 |
| 59 | EXAMPLE | | 3.3 | | | 0.8 | 4.1 | 0.12 | 0.40 | 0.10 | 0.05 | 0.67 |
| 60 | EXAMPLE | | 4.1 | | | | 4.1 | 0.22 | 0.37 | 0.11 | | 0.70 |

| WIRE No. | CHEMICAL COMPOSITIN OF FLUX(mass % WITH RESPECT TO THE TOTAL MASS OF THE WIRE) ||| TOTAL AMOUNT[α]/ TOTAL AMOUNT[β] | MASS RATIO OF $CaF_2$ TO METAL FLUORIDE(%) |
| | IRON POWDER | METAL CARBONATE | ARC STABILIZER | | |
|---|---|---|---|---|---|
| 31 | | | 0.023 | 3.8 | 100 |
| 32 | 0.5 | | 0.024 | 5.8 | 96 |
| 33 | 0.8 | | 0.024 | 3.3 | 100 |
| 34 | | | 0.046 | 4.4 | 100 |
| 35 | | | 0.004 | 7.4 | 100 |
| 36 | | 0.05 | 0.024 | 7.2 | 100 |
| 37 | 0.7 | 0.02 | 0.002 | 4.7 | 100 |
| 38 | | | 0.020 | 6.1 | 94 |
| 39 | | | 0.087 | 6.0 | 88 |
| 40 | | | 0.008 | 5.2 | 100 |
| 41 | | | 0.018 | 8.0 | 98 |
| 42 | | 0.18 | 0.023 | 7.3 | 100 |
| 43 | | | 0.026 | 10.6 | 100 |
| 44 | | | 0.033 | 37.6 | 100 |
| 45 | 1.4 | | 0.042 | 106.7 | 100 |
| 46 | 0.8 | | 0.048 | 180.0 | 100 |
| 47 | | 0.22 | 0.052 | 210.0 | 81 |
| 48 | | | 0.028 | 28.7 | 98 |
| 49 | | | 0.016 | 170.0 | 90 |
| 50 | | 0.16 | 0.005 | 10.4 | 100 |

TABLE 1-2-continued

| Wire No. | | | | | |
|---|---|---|---|---|---|
| 51 | 0.6 | 0.04 | 0.008 | 4.9 | 100 |
| 52 | 0.4 | | 0.035 | 5.5 | 89 |
| 53 | 1.2 | | 0.037 | 6.0 | 100 |
| 54 | | | 0.047 | 5.1 | 100 |
| 55 | | | 0.046 | 7.7 | 100 |
| 56 | | | 0.006 | 3.7 | 95 |
| 57 | 0.9 | | 0.005 | 29.2 | 95 |
| 58 | | | 0.008 | 8.8 | 92 |
| 59 | | | 0.024 | 6.1 | 80 |
| 60 | 0.5 | | 0.047 | 5.9 | 100 |

※:PFPE; PERFLUOROPOLYETHER OIL

TABLE 1-3

| | | | CHEMICAL COMPOSITION OF FLUX(mass % WITH RESPECT TO THE TOTAL MASS OF THE WIRE) | | | | | | | | | |
|---|---|---|---|---|---|---|---|---|---|---|---|---|
| | | | METAL FLUORIDE | | | | | METAL OXIDE | | | | |
| WIRE No. | CATEGORY | REMARKS | $CaF_2$ | $BaF_2$ | $SrF_2$ | $MgF_2$ | TOTAL AMOUNT[α] | $TiO_2$ | $SiO_2$ | MgO | $Al_2O_3$ | TOTAL AMOUNT[β] |
| 61 | EXAMPLE | | 3.2 | | | | 3.2 | | 0.30 | | | 0.30 |
| 62 | EXAMPLE | | 3.6 | | | | 3.6 | 0.10 | 0.25 | | | 0.35 |
| 63 | EXAMPLE | | 4.2 | | | | 4.2 | 0.15 | 0.24 | 0.12 | | 0.51 |
| 64 | EXAMPLE | | 4.5 | | | | 4.5 | 0.21 | 0.32 | 0.15 | 0.03 | 0.71 |
| 65 | EXAMPLE | APPLIED PFPE※ | 3.4 | 0.2 | | | 3.6 | 0.23 | 0.43 | | | 0.66 |
| 66 | EXAMPLE | APPLIED PFPE※ | 3.8 | | 0.3 | | 4.1 | | 0.44 | | | 0.44 |
| 67 | EXAMPLE | APPLIED PFPE※ | 4.3 | | | | 4.3 | 0.25 | 0.28 | 0.20 | | 0.73 |
| 68 | EXAMPLE | | 4.8 | | | | 4.8 | | 0.43 | | | 0.43 |
| 69 | EXAMPLE | | 5.3 | | | | 5.3 | | | | 0.08 | 0.08 |
| 70 | EXAMPLE | | 3.4 | | | | 3.4 | | 0.24 | | | 0.24 |
| 71 | EXAMPLE | | 3.6 | | 0.1 | 0.3 | 4.0 | 0.28 | 0.18 | 0.08 | | 0.54 |
| 72 | EXAMPLE | | 3.9 | | | | 3.9 | | 0.35 | | | 0.35 |
| 73 | EXAMPLE | | 4.3 | | | | 4.3 | 0.10 | 0.28 | 0.13 | | 0.51 |
| 74 | EXAMPLE | | 4.4 | | | | 4.4 | 0.20 | 0.45 | 0.19 | | 0.84 |
| 75 | EXAMPLE | | 3.8 | | | | 3.8 | | 0.46 | | | 0.46 |
| 76 | EXAMPLE | | 3.6 | | | | 3.6 | | 0.55 | | | 0.55 |
| 77 | EXAMPLE | | 4.6 | | | | 4.6 | | 0.63 | | | 0.63 |
| 78 | EXAMPLE | | 3.4 | | | | 3.4 | 0.40 | 0.35 | | | 0.75 |
| 79 | EXAMPLE | | 3.6 | | | | 3.6 | 0.18 | 0.48 | | | 0.66 |
| 80 | EXAMPLE | | 4.2 | | | 0.3 | 4.5 | | 0.34 | 0.20 | | 0.54 |
| 81 | EXAMPLE | | 4.0 | | | | 4.0 | | 0.46 | | | 0.46 |
| 82 | EXAMPLE | | 3.2 | | | | 3.2 | | 0.35 | | 0.04 | 0.39 |
| 83 | EXAMPLE | | 3.4 | | | | 3.4 | 0.20 | | | | 0.20 |
| 84 | EXAMPLE | | 3.8 | | | | 3.8 | 0.14 | 0.22 | 0.18 | | 0.54 |
| 85 | EXAMPLE | | 4.2 | 0.1 | | 0.1 | 4.4 | | 0.36 | | 0.14 | 0.50 |
| 86 | EXAMPLE | | 4.9 | 0.2 | | | 5.1 | | 0.46 | | | 0.46 |
| 87 | EXAMPLE | HAVING SEAM | 5.5 | | | | 5.5 | | 0.42 | | | 0.42 |
| 88 | EXAMPLE | HAVING SEAM | 4.6 | | | | 4.6 | | 0.45 | | | 0.45 |
| 89 | EXAMPLE | | 3.2 | | | | 3.2 | 0.18 | 0.38 | 0.15 | | 0.71 |
| 90 | EXAMPLE | | 3.6 | | | | 3.6 | 0.20 | 0.26 | | 0.23 | 0.69 |

| | CHEMICAL COMPOSITION OF FLUX(mass % WITH RESPECT TO THE TOTAL MASS OF THE WIRE) | | | | MASS RATIO OF |
|---|---|---|---|---|---|
| WIRE No. | IRON POWER | METAL CARBONATE | ARC STABILIZER | TOTAL AMOUNT[α]/ TOTAL AMOUNT[β] | $CaF_2$ TO METAL FLUORIDE(%) |
| 61 | | | 0.042 | 10.7 | 100 |
| 62 | | | 0.035 | 10.3 | 100 |
| 63 | | | 0.036 | 8.2 | 100 |
| 64 | | | 0.024 | 6.3 | 100 |
| 65 | | | 0.026 | 5.5 | 94 |
| 66 | | | 0.012 | 9.3 | 93 |
| 67 | | | 0.028 | 5.9 | 100 |
| 68 | | | 0.036 | 11.2 | 100 |
| 69 | | | 0.046 | 66.3 | 100 |
| 70 | | | 0.048 | 14.2 | 100 |
| 71 | | | 0.056 | 7.4 | 90 |
| 72 | | | 0.032 | 11.1 | 100 |
| 73 | | | 0.031 | 8.4 | 100 |

TABLE 1-3-continued

| | | | | | |
|---|---|---|---|---|---|
| 74 | | | 0.003 | 5.2 | 100 |
| 75 | | 0.22 | 0.043 | 8.3 | 100 |
| 76 | | | 0.040 | 6.5 | 100 |
| 77 | | | 0.028 | 7.3 | 100 |
| 78 | | | 0.018 | 4.5 | 100 |
| 79 | | | 0.026 | 5.5 | 100 |
| 80 | | | 0.033 | 8.3 | 93 |
| 81 | | | 0.028 | 8.7 | 100 |
| 82 | | 1.4 | 0.046 | 8.2 | 100 |
| 83 | | | 0.042 | 17.0 | 100 |
| 84 | | | 0.040 | 7.0 | 100 |
| 85 | | | 0.039 | 8.8 | 95 |
| 86 | | | 0.036 | 11.1 | 96 |
| 87 | | | 0.044 | 13.1 | 100 |
| 88 | | | 0.041 | 10.2 | 100 |
| 89 | | | 0.038 | 4.5 | 100 |
| 90 | | | 0.035 | 5.2 | 100 |

※PFPE; PERFLUOROPOLYETHER OIL

TABLE 1-4

| WIRE No. | CATEGORY | REMARKS | CHEMICAL COMPOSITION OF FLUX(mass % WITH RESPECT TO THE TOTAL MASS OF THE WIRE) | | | | | | | | | |
|---|---|---|---|---|---|---|---|---|---|---|---|---|
| | | | METAL FLUORIDE | | | | | METAL OXIDE | | | | |
| | | | $CaF_2$ | $BaF_2$ | $SrF_2$ | $MgF_2$ | TOTAL AMOUNT[α] | $TiO_2$ | $SiO_2$ | MgO | $Al_2O_3$ | TOTAL AMOUNT[β] |
| 91 | EXAMPLE | | 3.2 | | | | 3.2 | 0.20 | 0.25 | | | 0.45 |
| 92 | EXAMPLE | | 2.8 | | | | 2.8 | | 0.24 | | | 0.24 |
| 93 | EXAMPLE | APPLIED PFPE※ | 5.9 | 0.2 | | | 6.1 | 0.13 | 0.18 | | | 0.31 |
| 94 | EXAMPLE | APPLIED PFPE※ | 5.6 | | 0.3 | | 5.9 | 0.12 | | 0.28 | | 0.40 |
| 95 | EXAMPLE | | 2.9 | | | | 2.9 | 0.18 | 0.24 | 0.22 | | 0.64 |
| 96 | EXAMPLE | | 3.0 | | | 0.2 | 3.2 | | 0.34 | | | 0.34 |
| 97 | EXAMPLE | | 3.4 | | | | 3.4 | | 0.33 | | 0.16 | 0.49 |
| 98 | EXAMPLE | | 3.2 | | | | 3.2 | | 0.28 | 0.18 | 0.21 | 0.67 |
| 99 | EXAMPLE | | 4.8 | | 0.2 | | 5.0 | 0.24 | 0.38 | | | 0.62 |
| 100 | EXAMPLE | | 4.4 | | | 0.1 | 4.5 | 0.18 | 0.21 | 0.19 | | 0.58 |
| 101 | EXAMPLE | | 2.2 | | | | 2.2 | 0.35 | 0.43 | 0.26 | | 1.04 |
| 102 | EXAMPLE | | 2.4 | | | | 2.4 | 0.48 | 0.45 | 0.24 | | 1.17 |
| 103 | EXAMPLE | | 2.6 | 0.1 | | 0.1 | 2.8 | 0.35 | 0.34 | | 0.18 | 0.87 |
| 104 | EXAMPLE | | 2.7 | | 0.1 | | 2.8 | 0.23 | 0.30 | 0.24 | | 0.77 |
| 105 | EXAMPLE | | 3.2 | | | | 3.2 | | 0.36 | | | 0.36 |
| 106 | EXAMPLE | | 3.5 | 0.2 | | 0.1 | 3.8 | 0.24 | 0.26 | 0.22 | | 0.72 |
| 107 | EXAMPLE | | 3.7 | | | | 3.7 | 0.18 | 0.25 | | | 0.43 |
| 108 | EXAMPLE | | 4.0 | | 0.3 | | 4.3 | 0.23 | 0.24 | | 0.15 | 0.62 |
| 109 | COMPARATIVE EXAMPLE | | 3.6 | 0.2 | | | 3.8 | | 0.43 | | | 0.43 |
| 110 | COMPARATIVE EXAMPLE | | 2.4 | | | | 2.4 | | 0.38 | | | 0.38 |
| 111 | COMPARATIVE EXAMPLE | | 3.5 | | | | 3.5 | | 0.42 | 0.23 | | 0.65 |
| 112 | COMPARATIVE EXAMPLE | | 2.8 | | | | 2.8 | | 0.34 | | | 0.34 |
| 113 | COMPARATIVE EXAMPLE | | 3.6 | 0.3 | | | 3.9 | 0.20 | 0.28 | | | 0.48 |
| 114 | COMPARATIVE EXAMPLE | | 4.6 | | | | 4.6 | 0.12 | 0.20 | 0.15 | | 0.47 |
| 115 | COMPARATIVE EXAMPLE | | 2.7 | | 0.2 | 0.1 | 3.0 | | 0.32 | | | 0.32 |
| 116 | COMPARATIVE EXAMPLE | APPLIED PFPE※ | 3.0 | | 0.3 | 0.2 | 3.5 | 0.16 | 0.18 | | | 0.34 |
| 117 | COMPARATIVE EXAMPLE | | 2.1 | 0.1 | | 0.1 | 2.3 | | 0.22 | 0.18 | | 0.40 |
| 118 | COMPARATIVE EXAMPLE | | 3.6 | | | | 3.6 | 0.16 | 0.32 | | 0.11 | 0.59 |
| 119 | COMPARATIVE EXAMPLE | APPLIED PFPE※ | 3.2 | | | | 3.2 | 0.24 | 0.19 | | 0.13 | 0.56 |
| 120 | COMPARATIVE EXAMPLE | | 3.4 | 0.2 | | | 3.6 | 0.32 | 0.38 | | | 0.70 |
| 121 | COMPARATIVE EXAMPLE | | 3.8 | | | | 3.8 | 0.31 | 0.42 | 0.15 | | 0.88 |
| 122 | COMPARATIVE EXAMPLE | | 2.2 | 0.1 | | | 2.3 | 0.37 | 0.39 | 0.20 | | 0.96 |

TABLE 1-4-continued

| | | | | | | | | | |
|---|---|---|---|---|---|---|---|---|---|
| 123 | COMPARATIVE EXAMPLE | | 2.3 | | 2.3 | 0.36 | 0.28 | | 0.64 |
| 124 | COMPARATIVE EXAMPLE | | 2.1 | | 2.1 | 0.48 | 0.45 | 0.25 | 1.18 |
| 125 | COMPARATIVE EXAMPLE | APPLIED PFPE:※ | 2.3 | | 2.3 | 0.55 | 0.42 | | 0.23 | 1.20 |
| 126 | COMPARATIVE EXAMPLE | | 2.0 | 0.1 | 2.1 | 0.37 | 0.39 | 0.42 | 1.18 |

| | CHEMICAL COMPOSITION OF FLUX(mass % WITH RESPECT TO THE TOTAL MASS OF THE WIRE) | | | | MASS RATIO OF |
|---|---|---|---|---|---|
| WIRE No. | IRON POWDER | METAL CARBONATE | ARC STABILIZER | TOTAL AMOUNT[α]/ TOTAL AMOUNT[β] | $CaF_2$ TO METAL FLUORIDE(%) |
| 91 | | | 0.043 | 7.1 | 100 |
| 92 | | | 0.028 | 11.7 | 100 |
| 93 | | 0.25 | 0.043 | 19.7 | 97 |
| 94 | | 0.12 | 0.036 | 14.8 | 95 |
| 95 | | | 0.002 | 4.5 | 100 |
| 96 | 0.5 | | 0.024 | 9.4 | 94 |
| 97 | | | 0.046 | 6.9 | 100 |
| 98 | | | 0.002 | 4.8 | 100 |
| 99 | 0.8 | | 0.035 | 8.1 | 96 |
| 100 | | | 0.056 | 7.8 | 98 |
| 101 | 1.5 | | 0.048 | 2.1 | 100 |
| 102 | | 0.15 | 0.003 | 2.1 | 100 |
| 103 | | | 0.046 | 3.2 | 93 |
| 104 | 1.2 | 0.10 | 0.068 | 3.6 | 96 |
| 105 | | | 0.056 | 8.9 | 100 |
| 106 | | | 0.054 | 5.3 | 92 |
| 107 | | | 0.005 | 8.6 | 100 |
| 108 | | | 0.068 | 6.9 | 93 |
| 109 | | 0.21 | 0.035 | 8.8 | 95 |
| 110 | | | 0.034 | 6.3 | 100 |
| 111 | 0.6 | | 0.020 | 5.4 | 100 |
| 112 | | | 0.026 | 8.2 | 100 |
| 113 | | | 0.024 | 8.1 | 92 |
| 114 | | | 0.036 | 9.8 | 100 |
| 115 | | | 0.048 | 9.4 | 90 |
| 116 | | | 0.064 | 10.3 | 86 |
| 117 | | | 0.055 | 5.8 | 91 |
| 118 | | | 0.032 | 6.1 | 100 |
| 119 | | | 0.015 | 5.7 | 100 |
| 120 | | | 0.013 | 5.1 | 94 |
| 121 | | | 0.026 | 4.3 | 100 |
| 122 | | | 0.034 | 2.4 | 96 |
| 123 | | | 0.027 | 3.6 | 100 |
| 124 | | | 0.025 | 1.8 | 100 |
| 125 | | | 0.026 | 1.9 | 100 |
| 126 | | | 0.035 | 1.8 | 95 |

※:PFPE; PERFLUOROPOLYETHER OIL

TABLE 1-5

| | | | CHEMICAL COMPOSITION OF FLUX(mass % WITH RESPECT TO THE TOTAL MASS OF THE WIRE) | | | | | | | | |
|---|---|---|---|---|---|---|---|---|---|---|---|
| | | | METAL FLUORIDE | | | | | METAL OXIDE | | | |
| WIRE No. | CATEGORY | REMARKS | $CaF_2$ | $BaF_2$ | $SrF_2$ | $MgF_2$ | TOTAL AMOUNT[α] | $TiO_2$ | $SiO_2$ | MgO | $Al_2O_3$ |
| 127 | COMPARATIVE EXAMPLE | | 1.9 | | | | 1.9 | | 0.26 | | |
| 128 | COMPARATIVE EXAMPLE | | 8.2 | | | | 8.2 | | 0.32 | | 0.05 |
| 129 | COMPARATIVE EXAMPLE | | 1.5 | 0.2 | 0.1 | 0.1 | 1.9 | 0.21 | 0.46 | | 0.10 |
| 130 | COMPARATIVE EXAMPLE | APPLIED PFPE:※ | 6.5 | 1.0 | 0.3 | 0.3 | 8.1 | | 0.42 | | |
| 131 | COMPARATIVE EXAMPLE | APPLIED PFPE:※ | 2.1 | | | | 2.1 | 0.78 | 0.42 | | |
| 132 | COMPARATIVE EXAMPLE | | 1.6 | 0.2 | 0.1 | 0.2 | 2.1 | 0.62 | 0.56 | | |

TABLE 1-5-continued

| Wire No. | Type | Applied | c1 | c2 | c3 | c4 | Total | v1 | v2 | v3 |
|---|---|---|---|---|---|---|---|---|---|---|
| 133 | COMPARATIVE EXAMPLE | | 4.2 | | | | 4.2 | 1.05 | 0.40 | |
| 134 | COMPARATIVE EXAMPLE | | 2.4 | | | | 2.4 | 0.32 | | 0.22 |
| 135 | COMPARATIVE EXAMPLE | | 3.8 | | | | 3.8 | | 0.24 | 0.21 |
| 136 | COMPARATIVE EXAMPLE | | 2.8 | | | | 2.8 | 0.25 | | |
| 137 | COMPARATIVE EXAMPLE | | 3.2 | | | | 3.2 | | 0.23 | 0.24 |
| 138 | COMPARATIVE EXAMPLE | | 3.1 | | | | 3.1 | 0.42 | | |
| 139 | COMPARATIVE EXAMPLE | | 2.8 | 0.2 | | | 3.0 | 0.46 | 0.21 | 0.22 |
| 140 | COMPARATIVE EXAMPLE | | 3.2 | 0.2 | | | 3.4 | | 0.05 | |
| 141 | COMPARATIVE EXAMPLE | | 3.5 | | | | 3.5 | 0.43 | | |
| 142 | COMPARATIVE EXAMPLE | | 3.2 | | | | 3.2 | 0.40 | 0.21 | |
| 143 | COMPARATIVE EXAMPLE | | 3.2 | | 0.3 | | 3.5 | 0.38 | | |
| 144 | COMPARATIVE EXAMPLE | | 2.8 | | 0.1 | 0.2 | 3.1 | 0.42 | | 0.18 |
| 145 | COMPARATIVE EXAMPLE | APPLIED PFPE:X | 2.9 | | | | 2.9 | 0.15 | | |
| 146 | COMPARATIVE EXAMPLE | APPLIED PFPE:X | 3.8 | | | | 3.8 | 0.54 | | |
| 147 | COMPARATIVE EXAMPLE | | 1.0 | 0.5 | 0.3 | 0.3 | 2.1 | 0.22 | | |
| 148 | COMPARATIVE EXAMPLE | | 3.4 | 0.3 | 0.2 | | 3.9 | 0.53 | | |
| 149 | COMPARATIVE EXAMPLE | | 3.2 | | | | 3.2 | | 0.12 | |
| 150 | COMPARATIVE EXAMPLE | | 2.9 | 0.3 | | 0.2 | 3.4 | 0.32 | | |
| 151 | COMPARATIVE EXAMPLE | | 2.9 | 0.2 | | 0.2 | 3.3 | 0.27 | 0.36 | |
| 152 | COMPARATIVE EXAMPLE | | 3.1 | | | | 3.1 | 0.08 | | |
| 153 | COMPARATIVE EXAMPLE | | 3.3 | | | | 3.3 | 0.42 | | 0.32 |
| 154 | COMPARATIVE EXAMPLE | | 3.2 | | | | 3.2 | 0.22 | 0.43 | |
| 155 | COMPARATIVE EXAMPLE | | 3.5 | | 0.2 | | 3.7 | 0.34 | | 0.11 |
| 156 | COMPARATIVE EXAMPLE | | 3.5 | 0.3 | | | 3.8 | 0.36 | | |
| 157 | COMPARATIVE EXAMPLE | | 3.2 | | | | 3.2 | 0.12 | 0.46 | |
| 158 | COMPARATIVE EXAMPLE | | 3.6 | | | | 3.6 | 0.35 | | |
| 159 | COMPARATIVE EXAMPLE | | 3.5 | | | | 3.5 | 0.36 | | |
| 160 | COMPARATIVE EXAMPLE | | 3.2 | | | | 3.2 | 0.42 | 0.18 | |

| | CHEMICAL COMPOSITION OF FLUX (mass % WITH RESPECT TO THE TOTAL MASS OF THE WIRE) | | | | |
|---|---|---|---|---|---|
| WIRE No. | METAL OXIDE TOTAL AMOUNT [β] | IRON POWDER | METAL CARBONATE | ARC STABILIZER | TOTAL AMOUNT [α] / TOTAL AMOUNT [β] | MASS RATIO OF $CaF_2$ TO METAL FLUORIDE (%) |
|---|---|---|---|---|---|---|
| 127 | 0.26 | | | 0.040 | 7.3 | 100 |
| 128 | 0.37 | | | 0.036 | 22.2 | 100 |
| 129 | 0.77 | | | 0.042 | 2.5 | 79 |
| 130 | 0.42 | | | 0.026 | 19.3 | 80 |
| 131 | 1.20 | | | 0.028 | 1.8 | 100 |
| 132 | 1.18 | | | 0.033 | 1.8 | 76 |
| 133 | 1.45 | | | 0.036 | 2.9 | 100 |
| 134 | 0.54 | 5.8 | | 0.008 | 4.4 | 100 |
| 135 | 0.45 | | 0.62 | 0.016 | 8.4 | 100 |
| 136 | 0.25 | | | 0.026 | 11.2 | 100 |
| 137 | 0.47 | | | 0.025 | 6.8 | 100 |
| 138 | 0.42 | | | 0.028 | 7.4 | 100 |
| 139 | 0.89 | | 0.24 | 0.046 | 3.4 | 93 |
| 140 | 0.05 | | 0.18 | 0.048 | 68.0 | 94 |
| 141 | 0.43 | 1.5 | | 0.055 | 8.1 | 100 |

TABLE 1-5-continued

| | | | | | | |
|---|---|---|---|---|---|---|
| 142 | 0.61 | | 0.08 | 0.052 | 5.2 | 100 |
| 143 | 0.38 | 1.7 | 0.12 | 0.049 | 9.2 | 91 |
| 144 | 0.60 | | | 0.054 | 5.2 | 90 |
| 145 | 0.15 | | | 0.046 | 19.3 | 100 |
| 146 | 0.54 | | | 0.046 | 7.0 | 100 |
| 147 | 0.22 | | | 0.024 | 9.5 | 48 |
| 148 | 0.53 | | | 0.028 | 7.4 | 87 |
| 149 | 0.12 | 1.2 | | 0.026 | 26.7 | 100 |
| 150 | 0.32 | | | 0.036 | 10.6 | 85 |
| 151 | 0.63 | | | 0.037 | 5.2 | 88 |
| 152 | 0.08 | 0.8 | | 0.032 | 38.8 | 100 |
| 153 | 0.74 | 0.5 | | 0.036 | 4.5 | 100 |
| 154 | 0.65 | | | 0.035 | 4.9 | 100 |
| 155 | 0.45 | | 0.18 | 0.032 | 8.2 | 95 |
| 156 | 0.36 | | 0.15 | 0.036 | 10.6 | 92 |
| 157 | 0.58 | | | 0.035 | 5.5 | 100 |
| 158 | 0.35 | | | 0.042 | 10.3 | 100 |
| 159 | 0.36 | | | 0.046 | 9.7 | 100 |
| 160 | 0.60 | | | 0.050 | 5.3 | 100 |

※:PFPE; PERFLUOROPOLYETHER OIL

TABLE 1-6

| | | | CHEMICAL COMPOSITIN OF FLUX(mass % WITH RESPECT TO THE TOTAL MASS OF THE WIRE) | | | | | | | | | |
|---|---|---|---|---|---|---|---|---|---|---|---|---|
| | | | METAL FLUORIDE | | | | | METAL OXIDE | | | | |
| WIRE No. | CATEGORY | REMARKS | $CaF_2$ | $BaF_2$ | $SrF_2$ | $MgF_2$ | TOTAL AMOUNT[α] | $TiO_2$ | $SiO_2$ | MgO | $Al_2O_3$ | TOTAL AMOUNT[β] |
| 161 | EXAMPLE | | 4.2 | | | | 4.2 | 0.23 | 0.34 | | | 0.57 |
| 162 | EXAMPLE | APPLIED PFPE※ | 5.8 | | 0.1 | | 5.9 | | 0.15 | 0.23 | | 0.38 |
| 163 | EXAMPLE | | 2.8 | | | 0.2 | 3.0 | 0.08 | 0.12 | | 0.08 | 0.28 |
| 164 | EXAMPLE | | 3.8 | | | | 3.8 | 0.11 | 0.44 | | | 0.55 |
| 165 | EXAMPLE | | 4.0 | 0.2 | | | 4.2 | | 0.69 | | 0.20 | 0.89 |
| 166 | EXAMPLE | | 4.5 | | | | 4.5 | | 0.77 | 0.21 | | 0.98 |
| 167 | EXAMPLE | | 3.7 | | | 0.1 | 3.8 | 0.06 | 0.45 | | | 0.51 |
| 168 | EXAMPLE | | 4.2 | | | | 4.2 | | 0.40 | | 0.16 | 0.56 |
| 169 | EXAMPLE | APPLIED PFPE※ | 3.1 | | | | 3.1 | 0.12 | 0.43 | 0.23 | | 0.78 |
| 170 | EXAMPLE | HAVING SEAM | 4.8 | | | | 4.8 | 0.15 | 0.35 | | | 0.50 |
| 171 | COMPARATIVE EXAMPLE | | 4.5 | 0.2 | 0.1 | | 4.8 | | | | | 0.00 |
| 172 | COMPARATIVE EXAMPLE | | 1.1 | | | | 1.1 | 0.12 | 0.40 | | | 0.52 |
| 173 | COMPARATIVE EXAMPLE | | | | | | 0.0 | | 0.48 | | | 0.48 |
| 174 | COMPARATIVE EXAMPLE | SOLID WIRE | — | — | — | — | — | — | — | — | — | — |
| 175 | EXAMPLE | | 2.8 | | | | 2.8 | 0.22 | 0.32 | | | 0.54 |

| | CHEMICAL COMPOSITIN OF FLUX(mass % WITH RESPECT TO THE TOTAL MASS OF THE WIRE) | | | | MASS RATIO OF | |
|---|---|---|---|---|---|---|
| WIRE No. | IRON POWDER | METAL CARBONATE | ARC STABILIZER | TOTAL AMOUNT[α]/ TOTAL AMOUNT[β] | $CaF_2$ TO METAL FLUORIDE(%) | CaO [mass %] |
| 161 | | | 0.082 | 7.4 | 100 | 0.08 |
| 162 | | 0.15 | 0.045 | 15.5 | 98 | <0.03 |
| 163 | | | 0.026 | 10.7 | 93 | <0.03 |
| 164 | | | 0.058 | 6.9 | 100 | 0.05 |
| 165 | | | 0.086 | 4.7 | 95 | 0.15 |
| 166 | | | 0.124 | 4.6 | 100 | <0.03 |
| 167 | | | 0.061 | 7.5 | 97 | 0.04 |
| 168 | | | | 7.5 | 100 | 0.12 |
| 169 | | | | 4.0 | 100 | 0.03 |
| 170 | | | 0.032 | 9.6 | 100 | <0.03 |
| 171 | | | 0.026 | — | 94 | <0.03 |
| 172 | | | | 2.1 | 100 | <0.03 |
| 173 | | | | 0.0 | — | 0.04 |
| 174 | — | — | — | — | — | <0.03 |
| 175 | | | 0.025 | 5.2 | 100 | 0.28 |

※:PFPE; PERFLUOROPOLYETHER OIL

TABLE 1-7

| | | | CHEMICAL COMPOSITIN OF FLUX(mass % WITH RESPECT TO THE TOTAL MASS OF THE WIRE) | | | | | | | | | |
|---|---|---|---|---|---|---|---|---|---|---|---|---|
| | | | METAL FLUORIDE | | | | | METAL OXIDE | | | | |
| WIRE No. | CATEGORY | REMARKS | $CaF_2$ | $BaF_2$ | $SrF_2$ | $MgF_2$ | TOTAL AMOUNT[α] | $TiO_2$ | $SiO_2$ | MgO | $Al_2O_3$ | TOTAL AMOUNT[β] |
| 5-2 | EXAMPLE | | 3.8 | | | | 3.8 | | 0.42 | | | 0.42 |
| 6-2 | EXAMPLE | | 4.2 | | | | 4.2 | 0.23 | 0.56 | | | 0.79 |
| 30-2 | EXAMPLE | | 4.3 | | | | 4.3 | | 0.50 | | | 0.50 |
| 61-2 | EXAMPLE | | 3.2 | | | | 3.2 | | 0.30 | | | 0.30 |
| 62-2 | EXAMPLE | | 3.6 | | | | 3.6 | 0.10 | 0.25 | | | 0.35 |
| 90-2 | EXAMPLE | | 3.6 | | | | 3.6 | 0.20 | 0.26 | | 0.23 | 0.69 |

| | CHEMICAL COMPOSITIN OF FLUX(mass % WITH RESPECT TO THE TOTAL MASS OF THE WIRE) | | | | MASS RATIO OF | | |
|---|---|---|---|---|---|---|---|
| WIRE No. | IRON POWDER | METAL CARBONATE | ARC STABILIZER | TOTAL AMOUNT[α]/ TOTAL AMOUNT[β] | $CaF_2$ TO METAL FLUORIDE(%) | CaO [mass %] | |
| 5-2 | | | 0.048 | 9.0 | 100 | <0.03 | |
| 6-2 | | | 0.045 | 5.3 | 100 | 0.10 | |
| 30-2 | | | 0.032 | 8.6 | 100 | <0.03 | |
| 61-2 | | | 0.042 | 10.7 | 100 | 0.06 | |
| 62-2 | | | 0.035 | 10.3 | 100 | 0.08 | |
| 90-2 | | | 0.035 | 5.2 | 100 | <0.03 | |

※PFPE; PERFLUOROPOLYETHER OIL

TABLE 2-1

| WIRE No. | CATEGORY | CHEMICAL COMPOSITION OF WIRE [mass % WITH RESPECT TO TOTAL MASS OF WIRE] | | | | | | | | | | | | | | | | |
|---|---|---|---|---|---|---|---|---|---|---|---|---|---|---|---|---|---|---|
| | | C | Si | Mn | P | S | Al | Ni | V | Cu | Cr | Mo | Ti | Nb | B | Mg | Ca | REM | Ceq |
| 1 | EXAMPLE | 0.081 | 0.26 | 1.8 | 0.012 | 0.005 | 0.002 | 8.2 | 0.06 | | | | | | | | | | 0.60 |
| 2 | EXAMPLE | 0.093 | 0.42 | 1.6 | 0.012 | 0.006 | 0.004 | 1.8 | 0.18 | 0.22 | 0.8 | 0.5 | 0.018 | 0.02 | 0.0004 | 0.2 | 0.1 | 0.0020 | 0.72 |
| 3 | EXAMPLE | 0.094 | 0.64 | 1.7 | 0.010 | 0.005 | 0.003 | 2.6 | 0.06 | 0.20 | 0.5 | 0.4 | | | | | 0.1 | | 0.67 |
| 4 | EXAMPLE | 0.144 | 0.48 | 2.2 | 0.008 | 0.004 | 0.003 | 2.8 | 0.08 | | | | | | | | | | 0.61 |
| 5 | EXAMPLE | 0.102 | 0.46 | 1.8 | 0.008 | 0.003 | 0.005 | 2.4 | 0.08 | 0.23 | 0.8 | 0.8 | | | | | | | 0.85 |
| 6 | EXAMPLE | 0.103 | 0.38 | 1.2 | 0.009 | 0.005 | 0.002 | 2.6 | 0.09 | 0.18 | 1.2 | 0.6 | 0.017 | | 0.0042 | | | 0.0012 | 0.78 |
| 7 | EXAMPLE | 0.107 | 0.43 | 1.6 | 0.014 | 0.002 | 0.004 | 2.8 | 0.12 | 0.15 | 0.5 | 0.5 | | 0.02 | 0.0043 | 0.3 | | | 0.70 |
| 8 | EXAMPLE | 0.105 | 0.40 | 1.4 | 0.012 | 0.006 | 0.003 | 2.5 | 0.24 | 0.18 | 1.2 | 0.4 | | 0.01 | | 0.2 | | | 0.77 |
| 9 | EXAMPLE | 0.113 | 0.05 | 1.8 | 0.008 | 0.008 | 0.004 | 2.4 | 0.22 | 0.22 | 2.0 | | | | | | 0.2 | | 0.89 |
| 10 | EXAMPLE | 0.111 | 0.08 | 1.6 | 0.009 | 0.005 | 0.002 | 3.2 | 0.16 | | 0.8 | | 0.05 | | 0.0056 | 0.2 | 0.3 | | 0.67 |
| 11 | EXAMPLE | 0.127 | 0.35 | 1.0 | 0.011 | 0.006 | 0.003 | 3.3 | 0.29 | 0.16 | 0.8 | 0.2 | | | 0.0054 | | | | 0.62 |
| 12 | EXAMPLE | 0.116 | 0.42 | 1.5 | 0.007 | 0.005 | 0.004 | 2.8 | 0.25 | 0.33 | 0.5 | 0.3 | 0.024 | | | 0.4 | | | 0.65 |
| 13 | EXAMPLE | 0.115 | 0.52 | 1.8 | 0.009 | 0.012 | 0.012 | 2.6 | 0.18 | 0.24 | 1.2 | 0.6 | 0.022 | 0.03 | | 0.4 | | 0.0084 | 0.90 |
| 14 | EXAMPLE | 0.122 | 0.58 | 1.7 | 0.015 | 0.011 | 0.014 | 2.7 | 0.16 | 0.23 | | 0.6 | | | | | | | 0.66 |
| 15 | EXAMPLE | 0.126 | 0.56 | 1.7 | 0.016 | 0.008 | 0.016 | 5.8 | 0.19 | 0.20 | | 0.4 | | | 0.0098 | 0.2 | | | 0.69 |
| 16 | EXAMPLE | 0.114 | 0.52 | 1.8 | 0.019 | 0.004 | 0.006 | 5.4 | 0.22 | 0.44 | | 0.8 | 0.297 | | | | | | 0.79 |
| 17 | EXAMPLE | 0.118 | 0.84 | 2.1 | 0.014 | 0.006 | 0.008 | 5.3 | 0.14 | 0.79 | | 0.6 | 0.105 | 0.02 | | | | | 0.80 |
| 18 | EXAMPLE | 0.128 | 1.48 | 1.6 | 0.012 | 0.005 | 0.002 | 2.8 | 0.12 | 0.23 | | 1.2 | | | 0.0051 | 0.5 | | | 0.83 |
| 19 | EXAMPLE | 0.136 | 0.84 | 2.2 | 0.009 | 0.005 | 0.003 | 2.2 | 0.13 | 0.21 | | | | | | | | | 0.60 |
| 20 | EXAMPLE | 0.134 | 0.56 | 2.2 | 0.008 | 0.008 | 0.002 | 2.6 | 0.20 | | | | | | | | | | 0.60 |
| 21 | EXAMPLE | 0.133 | 0.48 | 1.8 | 0.008 | 0.006 | 0.396 | 5.6 | 0.20 | 0.18 | 0.5 | 0.3 | | | | | | | 0.78 |
| 22 | EXAMPLE | 0.125 | 0.55 | 1.5 | 0.007 | 0.005 | 0.323 | 5.2 | 0.12 | 0.42 | 0.3 | 0.5 | 0.016 | | | 0.8 | | 0.0021 | 0.72 |
| 23 | EXAMPLE | 0.116 | 0.50 | 1.8 | 0.009 | 0.004 | 0.286 | 2.7 | 0.14 | 0.30 | 0.5 | | 0.032 | 0.02 | | 0.6 | 0.2 | | 0.61 |
| 24 | EXAMPLE | 0.119 | 0.46 | 1.6 | 0.011 | 0.006 | 0.184 | 2.6 | 0.08 | | 1.5 | | | | 0.0023 | | 0.4 | | 0.78 |
| 25 | EXAMPLE | 0.116 | 0.22 | 1.6 | 0.012 | 0.002 | 0.143 | 2.2 | 0.07 | | 2.0 | | | | 0.0015 | 0.6 | | | 0.95 |
| 26 | EXAMPLE | 0.126 | 0.20 | 1.8 | 0.011 | 0.008 | 0.086 | 1.8 | 0.052 | 0.24 | 1.2 | | | 0.01 | | | 0.5 | | 0.72 |
| 27 | EXAMPLE | 0.120 | 0.32 | 2.1 | 0.013 | 0.005 | 0.043 | 1.5 | 0.08 | 0.20 | 1.6 | 0.1 | 0.035 | | | | | | 0.87 |
| 28 | EXAMPLE | 0.122 | 0.47 | 2.2 | 0.008 | 0.006 | 0.056 | 1.8 | 0.07 | 0.35 | 0.5 | 0.3 | 0.028 | | 0.0012 | 0.4 | | | 0.73 |
| 29 | EXAMPLE | 0.117 | 0.37 | 1.6 | 0.009 | 0.004 | 0.062 | 3.2 | 0.12 | 0.22 | 0.6 | | | | | 0.3 | 0.2 | | 0.61 |
| 30 | EXAMPLE | 0.126 | 0.33 | 1.5 | 0.010 | 0.005 | 0.047 | 2.9 | 0.18 | 0.28 | 2.5 | | | | | | | | 0.98 |

TABLE 2-2

| WIRE No. | CATEGORY | CHEMICAL COMPOSITION OF WIRE [mass % WITH RESPECT TO TOTAL MASS OF WIRE] | | | | | | | | | | | | | | | | |
|---|---|---|---|---|---|---|---|---|---|---|---|---|---|---|---|---|---|---|
| | | C | Si | Mn | P | S | Al | Ni | V | Cu | Cr | Mo | Ti | Nb | B | Mg | Ca | REM | Ceq |
| 31 | EXAMPLE | 0.082 | 0.87 | 2.2 | 0.008 | 0.006 | 0.008 | 1.8 | 0.06 | 0.21 | 0.5 | 0.3 | 0.015 | 0.02 | 0.0004 | 0.4 | 0.2 | 0.0023 | 0.71 |
| 32 | EXAMPLE | 0.088 | 0.63 | 2.1 | 0.011 | 0.004 | 0.002 | 5.3 | 0.13 | 0.26 | | | | | | | | | 0.61 |
| 33 | EXAMPLE | 0.093 | 0.43 | 1.8 | 0.010 | 0.005 | 0.003 | 3.8 | 0.08 | 0.17 | 0.6 | 0.5 | 0.016 | | | 0.2 | | | 0.76 |
| 34 | EXAMPLE | 0.097 | 0.52 | 2.1 | 0.009 | 0.005 | 0.005 | 2.7 | 0.09 | | | 0.6 | | 0.02 | | | | | 0.69 |
| 35 | EXAMPLE | 0.101 | 0.24 | 1.9 | 0.012 | 0.006 | 0.367 | 2.2 | 0.06 | 0.23 | 0.8 | 0.3 | | | | | | | 0.72 |
| 36 | EXAMPLE | 0.105 | 0.53 | 1.8 | 0.013 | 0.008 | 0.004 | 2.9 | 0.051 | 0.21 | 1.0 | 0.8 | 0.026 | | 0.0005 | | | | 0.90 |
| 37 | EXAMPLE | 0.114 | 0.42 | 1.6 | 0.007 | 0.005 | 0.013 | 3.2 | 0.056 | 0.28 | 1.2 | 0.7 | 0.028 | 0.01 | | 0.3 | | 0.0014 | 0.90 |
| 38 | EXAMPLE | 0.118 | 0.32 | 1.6 | 0.006 | 0.006 | 0.184 | 2.6 | 0.09 | 0.19 | 0.8 | 0.9 | | | | 0.2 | | | 0.85 |
| 39 | EXAMPLE | 0.126 | 0.33 | 2.1 | 0.009 | 0.003 | 0.043 | 8.9 | 0.07 | 0.22 | | | | | | | | | 0.72 |
| 40 | EXAMPLE | 0.198 | 0.36 | 1.1 | 0.012 | 0.002 | 0.052 | 7.8 | 0.11 | 0.34 | 1.0 | | | | | | 0.3 | | 0.80 |
| 41 | EXAMPLE | 0.178 | 0.42 | 1.2 | 0.011 | 0.005 | 0.061 | 2.5 | 0.06 | 0.23 | 2.4 | | 0.036 | | | | | | 0.94 |
| 42 | EXAMPLE | 0.157 | 0.44 | 1.6 | 0.014 | 0.003 | 0.064 | 6.2 | 0.08 | 0.21 | 0.8 | 0.4 | 0.034 | 0.03 | | 0.4 | | | 0.86 |
| 43 | EXAMPLE | 0.139 | 0.41 | 1.8 | 0.010 | 0.002 | 0.046 | 3.2 | 0.14 | 0.36 | | 1.5 | | | | 0.3 | | 0.0087 | 0.92 |
| 44 | EXAMPLE | 0.134 | 0.56 | 1.3 | 0.009 | 0.006 | 0.052 | 1.5 | 0.15 | 0.18 | 0.8 | 0.5 | | | | | | | 0.71 |
| 45 | EXAMPLE | 0.131 | 0.55 | 1.6 | 0.008 | 0.004 | 0.053 | 2.6 | 0.15 | | 0.8 | 0.6 | | | 0.0023 | | | | 0.81 |
| 46 | EXAMPLE | 0.124 | 0.39 | 1.8 | 0.011 | 0.002 | 0.028 | 3.6 | 0.18 | 0.20 | | 1.2 | | 0.05 | | | 0.3 | | 0.84 |
| 47 | EXAMPLE | 0.126 | 0.21 | 2.0 | 0.008 | 0.006 | 0.015 | 4.2 | 0.22 | 0.27 | | 0.5 | 0.286 | | | | | | 0.71 |
| 48 | EXAMPLE | 0.136 | 0.06 | 1.2 | 0.013 | 0.008 | 0.013 | 1.8 | 0.23 | 0.63 | 1.8 | | | | | | | | 0.76 |
| 49 | EXAMPLE | 0.133 | 0.08 | 1.8 | 0.012 | 0.002 | 0.016 | 1.6 | 0.16 | 0.24 | 0.5 | 0.8 | | | | | | 0.0018 | 0.79 |
| 50 | EXAMPLE | 0.132 | 0.11 | 1.7 | 0.010 | 0.003 | 0.018 | 3.1 | 0.18 | 0.17 | | 0.6 | 0.199 | | 0.0048 | | | | 0.66 |
| 51 | EXAMPLE | 0.127 | 0.16 | 2.0 | 0.008 | 0.006 | 0.012 | 3.5 | 0.21 | 0.25 | | 0.6 | | 0.02 | 0.0042 | 0.5 | | | 0.72 |
| 52 | EXAMPLE | 0.123 | 0.21 | 2.0 | 0.009 | 0.010 | 0.011 | 3.7 | 0.23 | 0.22 | 0.8 | 0.2 | | 0.03 | | 0.4 | | | 0.78 |
| 53 | EXAMPLE | 0.120 | 0.26 | 1.8 | 0.012 | 0.011 | 0.007 | 2.8 | 0.20 | 0.47 | 0.5 | 1.0 | 0.024 | | | | | | 0.87 |
| 54 | EXAMPLE | 0.134 | 0.50 | 1.3 | 0.008 | 0.005 | 0.006 | 2.7 | 0.17 | 0.21 | 0.8 | 1.8 | | | | | | | 1.06 |
| 55 | EXAMPLE | 0.139 | 1.45 | 1.0 | 0.009 | 0.006 | 0.005 | 3.3 | 0.15 | 0.29 | | 1.0 | 0.013 | | 0.0006 | | | | 0.71 |
| 56 | EXAMPLE | 0.135 | 0.12 | 1.4 | 0.011 | 0.004 | 0.006 | 3.4 | 0.16 | 0.18 | 1.2 | | 0.016 | 0.04 | 0.0021 | | 0.5 | | 0.71 |
| 57 | EXAMPLE | 0.127 | 0.22 | 1.8 | 0.009 | 0.005 | 0.004 | 4.3 | 0.15 | | 0.8 | 1.9 | | 0.02 | | 0.8 | | | 1.19 |
| 58 | EXAMPLE | 0.129 | 0.37 | 1.9 | 0.009 | 0.006 | 0.003 | 2.9 | 0.18 | | 1.0 | 0.3 | | | | | | 0.0020 | 0.82 |
| 59 | EXAMPLE | 0.122 | 0.92 | 2.1 | 0.010 | 0.003 | 0.004 | 2.8 | 0.16 | 0.22 | | 1.5 | 0.029 | | | | | | 0.97 |
| 60 | EXAMPLE | 0.126 | 0.52 | 1.6 | 0.012 | 0.008 | 0.006 | 3.3 | 0.19 | 0.38 | 0.4 | 1.2 | | | | | | | 0.89 |

TABLE 2-3

| WIRE No. | CATEGORY | CHEMICAL COMPOSTION OF WIRE [mass % WITH RESPECT TO TOTAL MASS OF WIRE] | | | | | | | | | | | | | | | | |
|---|---|---|---|---|---|---|---|---|---|---|---|---|---|---|---|---|---|---|
| | | C | Si | Mn | P | S | Al | Ni | V | Cu | Cr | Mo | Ti | Nb | B | Mg | Ca | REM | Ceq |
| 61 | EXAMPLE | 0.111 | 0.80 | 1.4 | 0.010 | 0.008 | 0.003 | 3.5 | 0.16 | 0.25 | 0.8 | 0.5 | | | | 0.4 | | | 0.76 |
| 62 | EXAMPLE | 0.139 | 0.45 | 1.8 | 0.008 | 0.007 | 0.025 | 5.6 | 0.23 | 0.90 | | | | | | | | | 0.61 |
| 63 | EXAMPLE | 0.126 | 0.41 | 1.5 | 0.008 | 0.006 | 0.012 | 2.2 | 0.14 | 0.24 | 0.6 | 0.5 | 0.021 | | | | | | 0.70 |
| 64 | EXAMPLE | 0.116 | 0.43 | 1.5 | 0.006 | 0.004 | 0.023 | 2.4 | 0.16 | 0.22 | 1.0 | 0.4 | | | | 0.4 | | | 0.76 |
| 65 | EXAMPLE | 0.115 | 0.52 | 1.8 | 0.008 | 0.003 | 0.013 | 2.1 | 0.21 | 0.18 | 0.8 | 0.4 | | | | | | | 0.76 |
| 66 | EXAMPLE | 0.123 | 0.53 | 1.5 | 0.010 | 0.005 | 0.015 | 2.6 | 0.15 | 0.24 | 0.6 | 0.8 | | | | 0.3 | | | 0.79 |
| 67 | EXAMPLE | 0.114 | 0.41 | 1.8 | 0.008 | 0.005 | 0.005 | 2.5 | 0.16 | 0.28 | 0.5 | 0.4 | 0.015 | | | 0.5 | 0.2 | | 0.71 |
| 68 | EXAMPLE | 0.112 | 0.43 | 1.7 | 0.008 | 0.003 | 0.006 | 2.4 | 0.18 | 0.20 | 0.8 | 0.5 | 0.048 | | | 0.5 | | | 0.77 |
| 69 | EXAMPLE | 0.118 | 0.53 | 1.6 | 0.008 | 0.006 | 0.005 | 2.8 | 0.23 | 0.34 | 0.8 | | | 0.02 | | | | | 0.65 |
| 70 | EXAMPLE | 0.116 | 0.32 | 1.2 | 0.009 | 0.005 | 0.003 | 3.3 | 0.22 | 0.31 | | 1.2 | | | | | 0.4 | | 0.73 |
| 71 | EXAMPLE | 0.124 | 0.43 | 1.6 | 0.010 | 0.006 | 0.006 | 3.2 | 0.17 | 0.37 | 0.4 | 0.5 | | | 0.0026 | 0.4 | | | 0.71 |
| 72 | EXAMPLE | 0.120 | 0.46 | 2.0 | 0.007 | 0.004 | 0.008 | 3.8 | 0.18 | 0.31 | 1.2 | 0.4 | | | | 0.4 | | 0.0034 | 0.92 |
| 73 | EXAMPLE | 0.126 | 0.48 | 1.5 | 0.006 | 0.005 | 0.005 | 3.9 | 0.15 | 0.35 | 1.0 | | | 0.04 | | 0.3 | | | 0.70 |
| 74 | EXAMPLE | 0.136 | 0.46 | 1.2 | 0.005 | 0.006 | 0.006 | 4.6 | 0.12 | 0.18 | | 1.4 | | | | | | | 0.83 |
| 75 | EXAMPLE | 0.134 | 0.56 | 1.6 | 0.008 | 0.004 | 0.045 | 4.8 | 0.13 | 0.20 | | 1.2 | 0.016 | | | | | 0.0019 | 0.85 |
| 76 | EXAMPLE | 0.135 | 0.68 | 1.5 | 0.008 | 0.005 | 0.078 | 5.4 | 0.15 | 0.17 | 1.4 | | | | | 0.5 | | | 0.84 |
| 77 | EXAMPLE | 0.115 | 0.78 | 1.8 | 0.005 | 0.006 | 0.056 | 5.2 | 0.12 | 0.24 | | 0.8 | | | | 0.5 | | | 0.79 |
| 78 | EXAMPLE | 0.116 | 0.65 | 1.8 | 0.007 | 0.006 | 0.026 | 5.8 | 0.16 | 0.24 | | 0.5 | | | 0.0029 | | | | 0.72 |
| 79 | EXAMPLE | 0.119 | 0.63 | 1.5 | 0.006 | 0.004 | 0.012 | 2.8 | 0.18 | | 1.0 | 0.5 | | | | 0.4 | | | 0.80 |
| 80 | EXAMPLE | 0.125 | 0.56 | 1.6 | 0.006 | 0.006 | 0.015 | 3.6 | 0.22 | 0.24 | 0.8 | 0.6 | | | | 0.4 | | | 0.83 |
| 81 | EXAMPLE | 0.126 | 0.45 | 1.5 | 0.008 | 0.006 | 0.012 | 3.4 | 0.20 | 0.31 | 0.7 | 0.3 | | | | 0.6 | | | 0.71 |
| 82 | EXAMPLE | 0.124 | 0.48 | 1.6 | 0.008 | 0.005 | 0.032 | 2.0 | 0.14 | 0.24 | 0.6 | 0.5 | 0.025 | | | | | | 0.72 |
| 83 | EXAMPLE | 0.123 | 0.40 | 1.8 | 0.006 | 0.008 | 0.008 | 1.9 | 0.12 | 0.23 | | 0.8 | | | | 0.4 | | | 0.70 |
| 84 | EXAMPLE | 0.126 | 0.56 | 1.8 | 0.008 | 0.004 | 0.015 | 1.6 | 0.16 | 0.27 | 0.5 | 0.5 | | | | 0.3 | | | 0.73 |
| 85 | EXAMPLE | 0.127 | 0.52 | 1.6 | 0.008 | 0.005 | 0.018 | 2.2 | 0.15 | 0.34 | | 1.0 | | | 0.0011 | | | | 0.73 |
| 86 | EXAMPLE | 0.118 | 0.49 | 1.8 | 0.007 | 0.006 | 0.024 | 2.4 | 0.21 | 0.30 | 1.2 | | | | 0.0012 | | | | 0.75 |
| 87 | EXAMPLE | 0.136 | 0.57 | 1.9 | 0.007 | 0.005 | 0.025 | 2.6 | 0.12 | 0.36 | | 0.8 | | | | 0.3 | | | 0.75 |
| 88 | EXAMPLE | 0.134 | 0.63 | 1.6 | 0.009 | 0.005 | 0.015 | 2.8 | 0.12 | 0.37 | 1.0 | 0.5 | | | | 0.4 | | | 0.83 |
| 89 | EXAMPLE | 0.136 | 0.65 | 1.8 | 0.008 | 0.004 | 0.014 | 2.5 | 0.14 | 0.34 | 0.8 | 0.2 | | | | | | | 0.75 |
| 90 | EXAMPLE | 0.125 | 0.54 | 1.5 | 0.008 | 0.002 | 0.012 | 2.8 | 0.16 | 0.39 | 1.0 | 0.4 | | | | | | | 0.78 |

TABLE 2-4

| WIRE No. | CATEGORY | CHEMICAL COMPOSITION OF WIRE [mass % WITH RESPECT TO TOTAL MASS OF WIRE] | | | | | | | | | | | | | | | | | |
|---|---|---|---|---|---|---|---|---|---|---|---|---|---|---|---|---|---|---|---|
| | | C | Si | Mn | P | S | Al | Ni | V | Cu | Cr | Mo | Ti | Nb | B | Mg | Ca | REM | Ceq |
| 91 | EXAMPLE | 0.081 | 0.23 | 1.0 | 0.008 | 0.004 | 0.012 | 2.2 | 0.06 | | 1.0 | 0.6 | | | | | | | 0.67 |
| 92 | EXAMPLE | 0.083 | 0.26 | 1.2 | 0.009 | 0.005 | 0.012 | 2.4 | 0.06 | 0.108 | 1.0 | 0.5 | 0.015 | | 0.0015 | | | | 0.68 |
| 93 | EXAMPLE | 0.083 | 0.25 | 1.2 | 0.012 | 0.005 | 0.013 | 2.2 | 0.07 | 0.23 | 1.0 | 0.6 | | | | | | | 0.70 |
| 94 | EXAMPLE | 0.093 | 0.23 | 1.1 | 0.009 | 0.005 | 0.016 | 1.8 | 0.06 | | 0.8 | 0.6 | | 0.03 | | | 0.2 | | 0.65 |
| 95 | EXAMPLE | 0.092 | 0.24 | 1.1 | 0.013 | 0.004 | 0.015 | 1.7 | 0.07 | 0.12 | 0.8 | 0.6 | | | | | | | 0.64 |
| 96 | EXAMPLE | 0.098 | 0.26 | 1.1 | 0.013 | 0.006 | 0.020 | 1.8 | 0.06 | 0.18 | 0.7 | 0.6 | | | | | | | 0.63 |
| 97 | EXAMPLE | 0.102 | 0.46 | 1.2 | 0.012 | 0.006 | 0.023 | 2.3 | 0.07 | | 0.8 | 0.5 | | | | | 0.3 | 0.0018 | 0.67 |
| 98 | EXAMPLE | 0.105 | 0.45 | 1.1 | 0.008 | 0.005 | 0.021 | 2.1 | 0.08 | 0.11 | 0.8 | 0.5 | 0.012 | | | | | | 0.65 |
| 99 | EXAMPLE | 0.106 | 0.48 | 1.2 | 0.008 | 0.005 | 0.022 | 2.3 | 0.07 | 0.17 | 0.7 | 0.5 | | | | | | | 0.65 |
| 100 | EXAMPLE | 0.095 | 0.38 | 1.0 | 0.009 | 0.005 | 0.018 | 1.6 | 0.06 | | 0.3 | 1.2 | | 0.04 | | | 0.2 | | 0.68 |
| 101 | EXAMPLE | 0.086 | 0.39 | 1.3 | 0.009 | 0.004 | 0.019 | 1.5 | 0.07 | | 0.2 | 1.3 | | | | | | | 0.73 |
| 102 | EXAMPLE | 0.089 | 0.38 | 1.2 | 0.015 | 0.006 | 0.018 | 1.8 | 0.07 | | 0.3 | 1.2 | | | | | | | 0.71 |
| 103 | EXAMPLE | 0.093 | 0.43 | 1.2 | 0.016 | 0.006 | 0.015 | 3.2 | 0.06 | | 1.4 | 0.3 | 0.022 | | 0.0016 | | | | 0.75 |
| 104 | EXAMPLE | 0.082 | 0.46 | 2.2 | 0.015 | 0.005 | 0.013 | 4.8 | 0.06 | | 0.5 | | | | | | | | 0.69 |
| 105 | EXAMPLE | 0.081 | 0.45 | 2.1 | 0.012 | 0.004 | 0.012 | 4.7 | 0.06 | | | 0.4 | | | | | | | 0.67 |
| 106 | EXAMPLE | 0.197 | 0.42 | 2.1 | 0.011 | 0.004 | 0.013 | 2.7 | 0.06 | | | | | | | | | | 0.64 |
| 107 | EXAMPLE | 0.195 | 0.40 | 2.2 | 0.012 | 0.004 | 0.015 | 2.6 | 0.28 | 0.23 | | | | | | | 0.2 | | 0.66 |
| 108 | EXAMPLE | 0.082 | 0.40 | 2.2 | 0.013 | 0.004 | 0.015 | 3.5 | 0.27 | | | 0.3 | | | | | | | 0.65 |
| 109 | COMPARATIVE EXAMPLE | 0.078 | 0.32 | 1.0 | 0.011 | 0.004 | 0.016 | 2.8 | 0.06 | 0.18 | 0.8 | 0.6 | | | | | | | 0.64 |
| 110 | COMPARATIVE EXAMPLE | 0.075 | 0.33 | 1.3 | 0.012 | 0.005 | 0.016 | 2.7 | 0.06 | 0.21 | 0.8 | 0.6 | | | | | 0.3 | | 0.69 |
| 111 | COMPARATIVE EXAMPLE | 0.088 | 0.38 | 0.9 | 0.011 | 0.005 | 0.012 | 2.6 | 0.06 | 0.21 | 0.9 | 0.8 | 0.013 | | 0.0020 | | | | 0.70 |
| 112 | COMPARATIVE EXAMPLE | 0.082 | 0.37 | 0.9 | 0.012 | 0.004 | 0.012 | 2.4 | 0.06 | 0.20 | 0.9 | 0.8 | 0.018 | | | | | | 0.69 |
| 113 | COMPARATIVE EXAMPLE | 0.086 | 0.42 | 1.0 | 0.013 | 0.004 | 0.015 | 2.5 | 0.04 | 0.18 | 1.0 | 0.4 | | | | | | | 0.64 |
| 114 | COMPARATIVE EXAMPLE | 0.094 | 0.46 | 1.5 | 0.013 | 0.005 | 0.014 | 2.6 | 0.04 | 0.17 | 1.0 | | | | | | | | 0.63 |
| 115 | COMPARATIVE EXAMPLE | 0.064 | 0.41 | 2.3 | 0.012 | 0.004 | 0.015 | 2.8 | 0.07 | 0.22 | | 0.3 | | | 0.0018 | | | | 0.61 |
| 116 | COMPARATIVE EXAMPLE | 0.060 | 0.45 | 2.3 | 0.012 | 0.005 | 0.015 | 2.7 | 0.07 | 0.23 | 0.5 | | | 0.02 | | | | | 0.63 |
| 117 | COMPARATIVE EXAMPLE | 0.086 | 0.38 | 2.4 | 0.011 | 0.006 | 0.012 | 1.8 | 0.06 | 0.18 | 0.5 | | | | | | 0.2 | | 0.65 |
| 118 | COMPARATIVE EXAMPLE | 0.094 | 0.38 | 2.6 | 0.011 | 0.006 | 0.013 | 1.9 | 0.07 | | | 0.3 | | | | | | | 0.67 |
| 119 | COMPARATIVE EXAMPLE | 0.088 | 0.37 | 2.3 | 0.013 | 0.005 | 0.012 | 2.5 | 0.06 | 0.23 | | 0.3 | 0.024 | | | | | | 0.63 |
| 120 | COMPARATIVE EXAMPLE | 0.118 | 0.28 | 2.3 | 0.008 | 0.005 | 0.011 | 2.4 | 0.06 | 0.23 | 0.5 | | | | | | | | 0.68 |
| 121 | COMPARATIVE EXAMPLE | 0.121 | 0.29 | 2.3 | 0.009 | 0.005 | 0.012 | 2.6 | 0.06 | 0.18 | | 0.4 | | | | | 0.2 | | 0.69 |
| 122 | COMPARATIVE EXAMPLE | 0.125 | 0.28 | 0.8 | 0.009 | 0.004 | 0.011 | 2.5 | 0.06 | 0.18 | 0.3 | 1.0 | | | | | 0.4 | | 0.65 |
| 123 | COMPARATIVE EXAMPLE | 0.124 | 0.31 | 0.8 | 0.010 | 0.004 | 0.011 | 2.4 | 0.06 | 0.15 | 1.2 | 0.3 | | | 0.0015 | | | | 0.65 |
| 124 | COMPARATIVE EXAMPLE | 0.093 | 0.42 | 1.1 | 0.012 | 0.005 | 0.018 | 2.6 | 0.06 | | 0.8 | 0.5 | | | | | | 0.0024 | 0.65 |
| 125 | COMPARATIVE EXAMPLE | 0.106 | 0.43 | 1.7 | 0.012 | 0.005 | 0.018 | 2.4 | 0.07 | 0.24 | | 0.6 | 0.024 | | | | | | 0.62 |
| 126 | COMPARATIVE EXAMPLE | 0.102 | 0.43 | 1.8 | 0.011 | 0.005 | 0.017 | 7.8 | 0.06 | 0.26 | | | | | | | | | 0.62 |

TABLE 2-5

| WIRE No. | CATEGORY | CHEMICAL COMPOSITION OF WIRE [mass % WITH RESPECT TO TOTAL MASS OF WIRE] | | | | | | | | | | | | | | | | | |
|---|---|---|---|---|---|---|---|---|---|---|---|---|---|---|---|---|---|---|---|
| | | C | Si | Mn | P | S | Al | Ni | V | Cu | Cr | Mo | Ti | Nb | B | Mg | Ca | REM | Ceq |
| 127 | COMPARATIVE EXAMPLE | 0.115 | 0.42 | 1.6 | 0.009 | 0.004 | 0.012 | 2.5 | 0.12 | 0.22 | 1.2 | | 0.022 | | | | | | 0.71 |
| 128 | COMPARATIVE EXAMPLE | 0.118 | 0.43 | 1.5 | 0.010 | 0.005 | 0.011 | 1.5 | 0.11 | 0.18 | 0.8 | 0.5 | | | | | 0.2 | | 0.72 |
| 129 | COMPARATIVE EXAMPLE | 0.116 | 0.46 | 1.6 | 0.009 | 0.008 | 0.012 | 2.4 | 0.11 | 0.24 | 0.5 | 0.5 | | | | | 0.4 | | 0.69 |
| 130 | COMPARATIVE EXAMPLE | 0.115 | 0.42 | 1.8 | 0.011 | 0.004 | 0.008 | 2.0 | 0.08 | 0.15 | 0.7 | | | | | | | | 0.63 |
| 131 | COMPARATIVE EXAMPLE | 0.124 | 0.51 | 1.8 | 0.008 | 0.006 | 0.012 | 3.2 | 0.13 | 0.18 | | 0.8 | | | | | 0.2 | | 0.73 |
| 132 | COMPARATIVE EXAMPLE | 0.123 | 0.48 | 1.6 | 0.009 | 0.006 | 0.015 | 3.3 | 0.12 | 0.16 | | 1.2 | 0.015 | | | | 0.2 | | 0.80 |

TABLE 2-5-continued

| WIRE No. | CATEGORY | C | Si | Mn | P | S | Al | Ni | V | Cu | Cr | Mo | Ti | Nb | B | Mg | Ca | REM | Ceq |
|---|---|---|---|---|---|---|---|---|---|---|---|---|---|---|---|---|---|---|---|
| 133 | COMPARATIVE EXAMPLE | 0.118 | 0.46 | 1.5 | 0.008 | 0.005 | 0.016 | 2.8 | 0.12 | 0.22 | 1.0 | 0.8 | | 0.02 | | | | | 0.87 |
| 134 | COMPARATIVE EXAMPLE | 0.119 | 0.45 | 1.2 | 0.011 | 0.007 | 0.015 | 1.2 | 0.11 | 0.20 | 1.2 | 0.5 | | | | | | | 0.74 |
| 135 | COMPARATIVE EXAMPLE | 0.123 | 0.42 | 1.5 | 0.010 | 0.005 | 0.015 | 2.5 | 0.10 | 0.18 | 0.8 | 0.6 | | | | | 0.4 | | 0.77 |
| 136 | COMPARATIVE EXAMPLE | 0.078 | 0.34 | 1.5 | 0.008 | 0.006 | 0.008 | 2.9 | 0.14 | 0.16 | 0.5 | 0.5 | | | | | | | 0.65 |
| 137 | COMPARATIVE EXAMPLE | 0.216 | 0.28 | 1.8 | 0.009 | 0.006 | 0.012 | 3.2 | 0.12 | 0.36 | 0.5 | | | | | | | | 0.72 |
| 138 | COMPARATIVE EXAMPLE | 0.121 | 0.04 | 1.4 | 0.008 | 0.004 | 0.011 | 2.8 | 0.12 | 0.38 | 0.5 | 0.4 | 0.025 | | 0.0022 | | | 0.0018 | 0.63 |
| 139 | COMPARATIVE EXAMPLE | 0.118 | 1.58 | 1.4 | 0.012 | 0.008 | 0.008 | 2.8 | 0.15 | 0.34 | | 0.5 | 0.020 | | 0.0034 | | | | 0.62 |
| 140 | COMPARATIVE EXAMPLE | 0.116 | 0.46 | 0.8 | 0.008 | 0.005 | 0.005 | 3.5 | 0.12 | 0.26 | | 1.2 | 0.02 | | | | 0.2 | | 0.66 |
| 141 | COMPARATIVE EXAMPLE | 0.112 | 0.52 | 2.3 | 0.008 | 0.005 | 0.005 | 3.5 | 0.12 | 0.24 | | | | | | | 0.4 | | 0.61 |
| 142 | COMPARATIVE EXAMPLE | 0.126 | 0.42 | 1.6 | 0.025 | 0.008 | 0.003 | 3.4 | 0.14 | 0.18 | 1.0 | 0.3 | | | | | 0.2 | | 0.78 |
| 143 | COMPARATIVE EXAMPLE | 0.123 | 0.40 | 1.6 | 0.011 | 0.024 | 0.006 | 3.6 | 0.13 | 0.23 | 1.5 | | | | | | 0.2 | | 0.81 |
| 144 | COMPARATIVE EXAMPLE | 0.117 | 0.45 | 1.8 | 0.008 | 0.005 | 0.0008 | 2.8 | 0.14 | 0.27 | | 0.5 | | | | | | | 0.64 |
| 145 | COMPARATIVE EXAMPLE | 0.118 | 0.46 | 1.6 | 0.012 | 0.006 | 0.422 | 2.9 | 0.11 | 0.32 | 0.5 | 0.3 | | | | | | | 0.66 |
| 146 | COMPARATIVE EXAMPLE | 0.120 | 0.46 | 1.8 | 0.008 | 0.005 | 0.003 | 0.9 | 0.13 | 0.18 | 0.5 | 0.2 | | | | | 0.3 | | 0.62 |
| 147 | COMPARATIVE EXAMPLE | 0.117 | 0.53 | 1.9 | 0.009 | 0.005 | 0.004 | 8.6 | 0.12 | 0.43 | | | | | | | 0.4 | | 0.68 |
| 148 | COMPARATIVE EXAMPLE | 0.146 | 0.50 | 1.5 | 0.008 | 0.008 | 0.003 | 2.8 | 0.050 | 0.18 | | 0.8 | | | | | 0.2 | | 0.69 |
| 149 | COMPARATIVE EXAMPLE | 0.122 | 0.54 | 1.6 | 0.008 | 0.004 | 0.005 | 3.1 | 0.31 | 0.53 | 1.0 | | | | | | 0.3 | | 0.71 |
| 150 | COMPARATIVE EXAMPLE | 0.118 | 0.42 | 1.5 | 0.011 | 0.004 | 0.008 | 3.3 | 0.14 | 0.90 | | 0.6 | | | 0.0042 | | | | 0.63 |
| 151 | COMPARATIVE EXAMPLE | 0.122 | 0.38 | 1.8 | 0.008 | 0.005 | 0.013 | 2.8 | 0.13 | 0.42 | 2.6 | | 0.022 | | 0.0038 | | | | 1.04 |
| 152 | COMPARATIVE EXAMPLE | 0.125 | 0.36 | 1.6 | 0.010 | 0.004 | 0.014 | 2.7 | 0.14 | 0.34 | | 2.1 | 0.024 | | | | | | 1.01 |
| 153 | COMPARATIVE EXAMPLE | 0.123 | 0.35 | 1.7 | 0.008 | 0.006 | 0.005 | 3.0 | 0.12 | 0.36 | 0.3 | 0.5 | 0.304 | | | | | | 0.69 |
| 154 | COMPARATIVE EXAMPLE | 0.119 | 0.38 | 1.6 | 0.011 | 0.005 | 0.005 | 3.2 | 0.13 | 0.19 | 0.7 | | | 0.06 | | | 0.2 | | 0.63 |
| 155 | COMPARATIVE EXAMPLE | 0.124 | 0.46 | 1.5 | 0.009 | 0.005 | 0.008 | 3.3 | 0.12 | 0.26 | | 0.6 | | | 0.0115 | 0.3 | | | 0.63 |
| 156 | COMPARATIVE EXAMPLE | 0.126 | 0.42 | 1.5 | 0.008 | 0.008 | 0.013 | 2.8 | 0.14 | 0.27 | | 0.8 | | | | 0.9 | | | 0.67 |
| 157 | COMPARATIVE EXAMPLE | 0.120 | 0.52 | 1.7 | 0.008 | 0.004 | 0.018 | 2.8 | 0.12 | 0.33 | 0.8 | | | | | | 0.6 | | 0.66 |
| 158 | COMPARATIVE EXAMPLE | 0.117 | 0.45 | 1.8 | 0.009 | 0.004 | 0.016 | 3.4 | 0.12 | 0.34 | | 0.5 | | | | | | 0.0124 | 0.65 |
| 159 | COMPARATIVE EXAMPLE | 0.112 | 0.52 | 1.5 | 0.008 | 0.004 | 0.018 | 1.8 | 0.12 | 0.29 | 0.5 | 0.2 | | | | | 0.3 | | 0.59 |
| 160 | COMPARATIVE EXAMPLE | 0.115 | 0.45 | 1.8 | 0.009 | 0.004 | 0.016 | 3.4 | 0.12 | 0.18 | 1.2 | 1.8 | | | | | 0.2 | | 1.22 |

TABLE 2-6

| WIRE No. | CATEGORY | C | Si | Mn | P | S | Al | Ni | V | Cu | Cr | Mo | Ti | Nb | B | Mg | Ca | REM | Ceq |
|---|---|---|---|---|---|---|---|---|---|---|---|---|---|---|---|---|---|---|---|
| 161 | EXAMPLE | 0.101 | 0.42 | 1.6 | 0.010 | 0.008 | 0.008 | 2.1 | 0.12 | 0.21 | 0.6 | 0.6 | | | 0.0012 | | 0.2 | | 0.72 |
| 162 | EXAMPLE | 0.113 | 0.53 | 1.5 | 0.007 | 0.005 | 0.006 | 2.6 | 0.08 | 0.18 | | 1.0 | 0.018 | | | | 0.2 | | 0.71 |
| 163 | EXAMPLE | 0.120 | 0.49 | 1.8 | 0.008 | 0.004 | 0.014 | 2.4 | 0.15 | | 1.2 | | | 0.02 | | | | | 0.75 |
| 164 | EXAMPLE | 0.116 | 0.47 | 1.8 | 0.008 | 0.006 | 0.018 | 2.5 | 0.16 | 0.22 | 0.6 | 0.4 | | | | | | 0.0012 | 0.73 |
| 165 | EXAMPLE | 0.132 | 0.59 | 1.7 | 0.009 | 0.006 | 0.009 | 4.8 | 0.20 | 0.22 | 0.9 | 0.6 | 0.023 | | | | 0.4 | | 0.90 |
| 166 | EXAMPLE | 0.158 | 0.48 | 2.0 | 0.007 | 0.008 | 0.026 | 3.2 | 0.22 | | | | | | | | | | 0.61 |
| 167 | EXAMPLE | 0.135 | 0.68 | 1.8 | 0.009 | 0.006 | 0.014 | 2.3 | 0.18 | | 1.0 | 0.5 | | | | | 0.2 | | 0.86 |
| 168 | EXAMPLE | 0.123 | 0.52 | 1.7 | 0.010 | 0.004 | 0.012 | 2.5 | 0.15 | 0.21 | | 1.2 | 0.015 | 0.03 | | | | | 0.80 |
| 169 | EXAMPLE | 0.127 | 0.56 | 1.6 | 0.010 | 0.005 | 0.016 | 2.1 | 0.16 | 0.23 | | 0.9 | | | 0.0015 | | | | 0.71 |
| 170 | EXAMPLE | 0.103 | 0.46 | 1.9 | 0.010 | 0.007 | 0.011 | 2.6 | 0.18 | 0.20 | 0.4 | 0.8 | | | | | | | 0.80 |

TABLE 2-6-continued

| WIRE No. | CATEGORY | CHEMICAL COMPOSITION OF WIRE [mass % WITH RESPECT TO TOTAL MASS OF WIRE] | | | | | | | | | | | | | | | | |
|---|---|---|---|---|---|---|---|---|---|---|---|---|---|---|---|---|---|---|
| | | C | Si | Mn | P | S | Al | Ni | V | Cu | Cr | Mo | Ti | Nb | B | Mg | Ca | REM | Ceq |
| 171 | COMPARATIVE EXAMPLE | 0.115 | 0.48 | 1.8 | 0.013 | 0.011 | 0.018 | 3.1 | 0.17 | 0.18 | 1.0 | 0.7 | | | | | | | 0.90 |
| 172 | COMPARATIVE EXAMPLE | 0.111 | 0.35 | 1.8 | 0.008 | 0.006 | 0.012 | 2.4 | 0.12 | 0.21 | 0.6 | 1.0 | 0.013 | | | | | | 0.86 |
| 173 | COMPARATIVE EXAMPLE | 0.109 | 0.32 | 1.9 | 0.007 | 0.006 | 0.015 | 2.6 | 0.10 | 0.19 | 0.9 | 0.3 | | | | | | | 0.77 |
| 174 | COMPARATIVE EXAMPLE | 0.093 | 0.28 | 1.8 | 0.006 | 0.002 | 0.016 | 2.8 | 0.09 | 0.32 | 0.8 | 0.5 | | | | | | | 0.77 |
| 175 | EXAMPLE | 0.105 | 0.40 | 1.7 | 0.006 | 0.002 | 0.010 | 2.4 | 0.08 | 0.22 | 1.0 | 0.4 | | | | | | | 0.77 |

TABLE 2-7

| WIRE No. | CATEGORY | CHEMICAL COMPOSITION OF WIRE [mass % WITH RESPECT TO TOTAL MASS OF WIRE] | | | | | | | | | | | | | | | | |
|---|---|---|---|---|---|---|---|---|---|---|---|---|---|---|---|---|---|---|
| | | C | Si | Mn | P | S | Al | Ni | V | Cu | Cr | Mo | Ti | Nb | B | Mg | Ca | REM | Ceq |
| 5-2 | EXAMPLE | 0.102 | 0.46 | 1.8 | 0.008 | 0.003 | 0.005 | 2.4 | 0.08 | 0.23 | 0.8 | 0.8 | | | | | | | 0.85 |
| 6-2 | EXAMPLE | 0.103 | 0.38 | 1.2 | 0.009 | 0.005 | 0.002 | 2.6 | 0.09 | 0.18 | 1.2 | 0.6 | 0.017 | | 0.0042 | | | 0.0012 | 0.78 |
| 30-2 | EXAMPLE | 0.126 | 0.33 | 1.5 | 0.010 | 0.005 | 0.047 | 2.9 | 0.18 | 0.28 | 2.5 | | | | | | | | 0.98 |
| 61-2 | EXAMPLE | 0.111 | 0.80 | 1.4 | 0.010 | 0.008 | 0.003 | 3.5 | 0.16 | 0.25 | 0.8 | 0.5 | | 0.4 | | | | | 0.76 |
| 62-2 | EXAMPLE | 0.139 | 0.45 | 1.8 | 0.008 | 0.007 | 0.025 | 5.6 | 0.23 | 0.90 | | | | | | | | | 0.61 |
| 90-2 | EXAMPLE | 0.125 | 0.54 | 1.5 | 0.008 | 0.002 | 0.012 | 2.8 | 0.16 | 0.39 | 1.0 | 0.4 | | | | | | | 0.78 |

TABLE 3-1

| WIRE No. | CATEGORY | WELDING CONDITIONS | | | | | | | |
|---|---|---|---|---|---|---|---|---|---|
| | | CURRENT [A] | VOLTAGE [V] | WELDING SPEED [cm/min] | HEAT INPUT [kJ/cm] | PREHEATING TEMPERATURE [° C.] | INTERPASS TEMPERATURE [° C.] | SHIELD GAS | FLOW RATE OF GAS [L/min] |
| 1 | EXAMPLE | 280 | 30 | 30 | 16.8 | 50 | 150 OR LESS | Ar—20%CO2 | 25 |
| 2 | EXAMPLE | 280 | 30 | 30 | 16.8 | 50 | 150 OR LESS | Ar—20%CO2 | 25 |
| 3 | EXAMPLE | 280 | 30 | 30 | 16.8 | 50 | 150 OR LESS | Ar—20%CO2 | 25 |
| 4 | EXAMPLE | 280 | 30 | 30 | 16.8 | 50 | 150 OR LESS | Ar—20%CO2 | 25 |
| 5 | EXAMPLE | 280 | 30 | 30 | 16.8 | 50 | 150 OR LESS | Ar—20%CO2 | 25 |
| 6 | EXAMPLE | 280 | 30 | 30 | 16.8 | 50 | 150 OR LESS | Ar—20%CO2 | 25 |
| 7 | EXAMPLE | 280 | 30 | 30 | 16.8 | 50 | 150 OR LESS | Ar—20%CO2 | 25 |
| 8 | EXAMPLE | 280 | 30 | 30 | 16.8 | 50 | 150 OR LESS | Ar—20%CO2 | 25 |
| 9 | EXAMPLE | 280 | 30 | 30 | 16.8 | 50 | 150 OR LESS | Ar—20%CO2 | 25 |
| 10 | EXAMPLE | 280 | 30 | 30 | 16.8 | 50 | 150 OR LESS | Ar—20%CO2 | 25 |
| 11 | EXAMPLE | 280 | 30 | 30 | 16.8 | 50 | 150 OR LESS | Ar—20%CO2 | 25 |
| 12 | EXAMPLE | 280 | 30 | 30 | 16.8 | 50 | 150 OR LESS | Ar—20%CO2 | 25 |
| 13 | EXAMPLE | 280 | 30 | 30 | 16.8 | 50 | 150 OR LESS | Ar—20%CO2 | 25 |
| 14 | EXAMPLE | 280 | 30 | 30 | 16.8 | 50 | 150 OR LESS | Ar—20%CO2 | 25 |
| 15 | EXAMPLE | 280 | 30 | 30 | 16.8 | 50 | 150 OR LESS | Ar—20%CO2 | 25 |
| 16 | EXAMPLE | 280 | 30 | 30 | 16.8 | 50 | 150 OR LESS | Ar—20%CO2 | 25 |
| 17 | EXAMPLE | 280 | 30 | 30 | 16.8 | 50 | 150 OR LESS | Ar—20%CO2 | 25 |
| 18 | EXAMPLE | 280 | 30 | 30 | 16.8 | 50 | 150 OR LESS | Ar—20%CO2 | 25 |
| 19 | EXAMPLE | 280 | 30 | 30 | 16.8 | 50 | 150 OR LESS | Ar—20%CO2 | 25 |
| 20 | EXAMPLE | 280 | 30 | 30 | 16.8 | 50 | 150 OR LESS | Ar—20%CO2 | 25 |
| 21 | EXAMPLE | 280 | 30 | 30 | 16.8 | 50 | 150 OR LESS | Ar—20%CO2 | 25 |
| 22 | EXAMPLE | 280 | 30 | 30 | 16.8 | 50 | 150 OR LESS | Ar—20%CO2 | 25 |
| 23 | EXAMPLE | 280 | 30 | 30 | 16.8 | 50 | 150 OR LESS | Ar—20%CO2 | 25 |
| 24 | EXAMPLE | 280 | 30 | 30 | 16.8 | 50 | 150 OR LESS | Ar—20%CO2 | 25 |
| 25 | EXAMPLE | 280 | 30 | 30 | 16.8 | 50 | 150 OR LESS | 100%CO2 | 25 |
| 26 | EXAMPLE | 280 | 30 | 30 | 16.8 | 50 | 150 OR LESS | 100%CO2 | 25 |
| 27 | EXAMPLE | 280 | 30 | 30 | 16.8 | 50 | 150 OR LESS | 100%CO2 | 25 |
| 28 | EXAMPLE | 280 | 30 | 30 | 16.8 | 50 | 150 OR LESS | 100%CO2 | 25 |
| 29 | EXAMPLE | 280 | 30 | 30 | 16.8 | 50 | 150 OR LESS | 100%CO2 | 25 |
| 30 | EXAMPLE | 280 | 30 | 30 | 16.8 | 50 | 150 OR LESS | 100%CO2 | 25 |

TABLE 3-2

| WIRE No. | CATEGORY | WELDING CONDITIONS ||||||||
| | | CURRENT [A] | VOLT-AGE [V] | WELDING SPEED [cm/min] | HEAT INPUT [kJ/cm] | PREHEATING TEMPERATURE [° C.] | INTERPASS TEMPERATURE [° C.] | SHIELD GAS | FLOW RATE OF GAS [L/min] |
|---|---|---|---|---|---|---|---|---|---|
| 31 | EXAMPLE | 280 | 30 | 30 | 16.8 | 50 | 150 OR LESS | Ar—20%CO2 | 25 |
| 32 | EXAMPLE | 280 | 30 | 30 | 16.8 | 50 | 150 OR LESS | Ar—20%CO2 | 25 |
| 33 | EXAMPLE | 280 | 30 | 30 | 16.8 | 50 | 150 OR LESS | Ar—20%CO2 | 25 |
| 34 | EXAMPLE | 280 | 30 | 30 | 16.8 | 50 | 150 OR LESS | Ar—20%CO2 | 25 |
| 35 | EXAMPLE | 280 | 30 | 30 | 16.8 | 50 | 150 OR LESS | Ar—20%CO2 | 25 |
| 36 | EXAMPLE | 280 | 30 | 30 | 16.8 | 50 | 150 OR LESS | Ar—20%CO2 | 25 |
| 37 | EXAMPLE | 280 | 30 | 30 | 16.8 | 50 | 150 OR LESS | Ar—20%CO2 | 25 |
| 38 | EXAMPLE | 280 | 30 | 30 | 16.8 | 50 | 150 OR LESS | Ar—20%CO2 | 25 |
| 39 | EXAMPLE | 280 | 30 | 30 | 16.8 | 50 | 150 OR LESS | Ar—20%CO2 | 25 |
| 40 | EXAMPLE | 280 | 30 | 30 | 16.8 | 50 | 150 OR LESS | Ar—20%CO2 | 25 |
| 41 | EXAMPLE | 280 | 30 | 30 | 16.8 | 50 | 150 OR LESS | Ar—20%CO2 | 25 |
| 42 | EXAMPLE | 280 | 30 | 30 | 16.8 | 50 | 150 OR LESS | Ar—20%CO2 | 25 |
| 43 | EXAMPLE | 280 | 30 | 30 | 16.8 | 50 | 150 OR LESS | Ar—20%CO2 | 25 |
| 44 | EXAMPLE | 280 | 30 | 30 | 16.8 | 50 | 150 OR LESS | Ar—20%CO2 | 25 |
| 45 | EXAMPLE | 280 | 30 | 30 | 16.8 | 50 | 150 OR LESS | Ar—20%CO2 | 25 |
| 46 | EXAMPLE | 280 | 30 | 30 | 16.8 | 50 | 150 OR LESS | Ar—20%CO2 | 25 |
| 47 | EXAMPLE | 280 | 30 | 30 | 16.8 | 50 | 150 OR LESS | Ar—20%CO2 | 25 |
| 48 | EXAMPLE | 280 | 30 | 30 | 16.8 | 50 | 150 OR LESS | Ar—20%CO2 | 25 |
| 49 | EXAMPLE | 280 | 30 | 30 | 16.8 | 50 | 150 OR LESS | Ar—20%CO2 | 25 |
| 50 | EXAMPLE | 280 | 30 | 30 | 16.8 | 50 | 150 OR LESS | Ar—20%CO2 | 25 |
| 51 | EXAMPLE | 280 | 30 | 30 | 16.8 | 50 | 150 OR LESS | Ar—20%CO2 | 25 |
| 52 | EXAMPLE | 280 | 30 | 30 | 16.8 | 50 | 150 OR LESS | Ar—20%CO2 | 25 |
| 53 | EXAMPLE | 280 | 30 | 30 | 16.8 | 50 | 150 OR LESS | Ar—20%CO2 | 25 |
| 54 | EXAMPLE | 280 | 30 | 30 | 16.8 | 50 | 150 OR LESS | Ar—20%CO2 | 25 |
| 55 | EXAMPLE | 280 | 30 | 30 | 16.8 | 50 | 150 OR LESS | Ar—20%CO2 | 25 |
| 56 | EXAMPLE | 280 | 30 | 30 | 16.8 | 50 | 150 OR LESS | Ar—20%CO2 | 25 |
| 57 | EXAMPLE | 280 | 30 | 30 | 16.8 | 50 | 150 OR LESS | Ar—20%CO2 | 25 |
| 58 | EXAMPLE | 280 | 30 | 30 | 16.8 | 50 | 150 OR LESS | 100%CO2 | 25 |
| 59 | EXAMPLE | 280 | 30 | 30 | 16.8 | 50 | 150 OR LESS | 100%CO2 | 25 |
| 60 | EXAMPLE | 280 | 30 | 30 | 16.8 | 50 | 150 OR LESS | 100%CO2 | 25 |

TABLE 3-3

| WIRE No. | CATEGORY | WELDING CONDITIONS ||||||||
| | | CURRENT [A] | VOLT-AGE [V] | WELDING SPEED [cm/min] | HEAT INPUT [kJ/cm] | PREHEATING TEMPERATURE [° C.] | INTERPASS TEMPERATURE [° C.] | SHIELD GAS | FLOW RATE OF GAS [L/min] |
|---|---|---|---|---|---|---|---|---|---|
| 61 | EXAMPLE | 280 | 30 | 30 | 16.8 | 50 | 150 OR LESS | Ar—20%CO2 | 25 |
| 62 | EXAMPLE | 280 | 30 | 30 | 16.8 | 50 | 150 OR LESS | Ar—20%CO2 | 25 |
| 63 | EXAMPLE | 280 | 30 | 30 | 16.8 | 50 | 150 OR LESS | Ar—20%CO2 | 25 |
| 64 | EXAMPLE | 280 | 30 | 30 | 16.8 | 50 | 150 OR LESS | Ar—20%CO2 | 25 |
| 65 | EXAMPLE | 280 | 30 | 30 | 16.8 | 50 | 150 OR LESS | Ar—20%CO2 | 25 |
| 66 | EXAMPLE | 280 | 30 | 30 | 16.8 | 50 | 150 OR LESS | Ar—20%CO2 | 25 |
| 67 | EXAMPLE | 280 | 30 | 30 | 16.8 | 50 | 150 OR LESS | Ar—20%CO2 | 25 |
| 68 | EXAMPLE | 280 | 30 | 30 | 16.8 | 50 | 150 OR LESS | Ar—20%CO2 | 25 |
| 69 | EXAMPLE | 280 | 30 | 30 | 16.8 | 50 | 150 OR LESS | Ar—20%CO2 | 25 |
| 70 | EXAMPLE | 280 | 30 | 30 | 16.8 | 50 | 150 OR LESS | Ar—20%CO2 | 25 |
| 71 | EXAMPLE | 280 | 30 | 30 | 16.8 | 50 | 150 OR LESS | Ar—20%CO2 | 25 |
| 72 | EXAMPLE | 280 | 30 | 30 | 16.8 | 50 | 150 OR LESS | Ar—20%CO2 | 25 |
| 73 | EXAMPLE | 280 | 30 | 30 | 16.8 | 50 | 150 OR LESS | Ar—20%CO2 | 25 |
| 74 | EXAMPLE | 280 | 30 | 30 | 16.8 | 50 | 150 OR LESS | Ar—20%CO2 | 25 |
| 75 | EXAMPLE | 280 | 30 | 30 | 16.8 | 50 | 150 OR LESS | Ar—20%CO2 | 25 |
| 76 | EXAMPLE | 280 | 30 | 30 | 16.8 | 50 | 150 OR LESS | Ar—20%CO2 | 25 |
| 77 | EXAMPLE | 280 | 30 | 30 | 16.8 | 50 | 150 OR LESS | Ar—20%CO2 | 25 |
| 78 | EXAMPLE | 280 | 30 | 30 | 16.8 | 50 | 150 OR LESS | Ar—20%CO2 | 25 |
| 79 | EXAMPLE | 280 | 30 | 30 | 16.8 | 50 | 150 OR LESS | Ar—20%CO2 | 25 |
| 80 | EXAMPLE | 280 | 30 | 30 | 16.8 | 50 | 150 OR LESS | Ar—20%CO2 | 25 |
| 81 | EXAMPLE | 280 | 30 | 30 | 16.8 | 50 | 150 OR LESS | Ar—20%CO2 | 25 |
| 82 | EXAMPLE | 280 | 30 | 30 | 16.8 | 50 | 150 OR LESS | Ar—20%CO2 | 25 |
| 83 | EXAMPLE | 280 | 30 | 30 | 16.8 | 50 | 150 OR LESS | Ar—20%CO2 | 25 |
| 84 | EXAMPLE | 280 | 30 | 30 | 16.8 | 50 | 150 OR LESS | Ar—20%CO2 | 25 |
| 85 | EXAMPLE | 280 | 30 | 30 | 16.8 | 50 | 150 OR LESS | Ar—20%CO2 | 25 |
| 86 | EXAMPLE | 280 | 30 | 30 | 16.8 | 50 | 150 OR LESS | Ar—20%CO2 | 25 |
| 87 | EXAMPLE | 280 | 30 | 30 | 16.8 | 50 | 150 OR LESS | Ar—20%CO2 | 25 |
| 88 | EXAMPLE | 280 | 30 | 30 | 16.8 | 50 | 150 OR LESS | 100%CO2 | 25 |
| 89 | EXAMPLE | 280 | 30 | 30 | 16.8 | 50 | 150 OR LESS | 100%CO2 | 25 |
| 90 | EXAMPLE | 280 | 30 | 30 | 16.8 | 50 | 150 OR LESS | 100%CO2 | 25 |

TABLE 3-4

| WIRE No. | CATEGORY | WELDING CONDITIONS ||||||||
| | | CURRENT [A] | VOLT-AGE [V] | WELDING SPEED [cm/min] | HEAT INPUT [kJ/cm] | PREHEATING TEMPERATURE [° C.] | INTERPASS TEMPERATURE [° C.] | SHIELD GAS | FLOW RATE OF GAS [L/min] |
| --- | --- | --- | --- | --- | --- | --- | --- | --- | --- |
| 91 | EXAMPLE | 280 | 30 | 30 | 16.8 | 50 | 150 OR LESS | Ar—20%CO2 | 25 |
| 92 | EXAMPLE | 280 | 30 | 30 | 16.8 | 50 | 150 OR LESS | Ar—20%CO2 | 25 |
| 93 | EXAMPLE | 280 | 30 | 30 | 16.8 | 50 | 150 OR LESS | Ar—20%CO2 | 25 |
| 94 | EXAMPLE | 280 | 30 | 30 | 16.8 | 50 | 150 OR LESS | Ar—20%CO2 | 25 |
| 95 | EXAMPLE | 280 | 30 | 30 | 16.8 | 50 | 150 OR LESS | Ar—20%CO2 | 25 |
| 96 | EXAMPLE | 280 | 30 | 30 | 16.8 | 50 | 150 OR LESS | Ar—20%CO2 | 25 |
| 97 | EXAMPLE | 280 | 30 | 30 | 16.8 | 50 | 150 OR LESS | Ar—20%CO2 | 25 |
| 98 | EXAMPLE | 280 | 30 | 30 | 16.8 | 50 | 150 OR LESS | Ar—20%CO2 | 25 |
| 99 | EXAMPLE | 280 | 30 | 30 | 16.8 | 50 | 150 OR LESS | Ar—20%CO2 | 25 |
| 100 | EXAMPLE | 280 | 30 | 30 | 16.8 | 50 | 150 OR LESS | Ar—20%CO2 | 25 |
| 101 | EXAMPLE | 280 | 30 | 30 | 16.8 | 50 | 150 OR LESS | Ar—20%CO2 | 25 |
| 102 | EXAMPLE | 280 | 30 | 30 | 16.8 | 50 | 150 OR LESS | Ar—20%CO2 | 25 |
| 103 | EXAMPLE | 280 | 30 | 30 | 16.8 | 50 | 150 OR LESS | Ar—20%CO2 | 25 |
| 104 | EXAMPLE | 280 | 30 | 30 | 16.8 | 50 | 150 OR LESS | Ar—20%CO2 | 25 |
| 105 | EXAMPLE | 280 | 30 | 30 | 16.8 | 50 | 150 OR LESS | Ar—20%CO2 | 25 |
| 106 | EXAMPLE | 280 | 30 | 30 | 16.8 | 50 | 150 OR LESS | Ar—20%CO2 | 25 |
| 107 | EXAMPLE | 280 | 30 | 30 | 16.8 | 50 | 150 OR LESS | Ar—20%CO2 | 25 |
| 108 | EXAMPLE | 280 | 30 | 30 | 16.8 | 50 | 150 OR LESS | Ar—20%CO2 | 25 |
| 109 | COMPARATIVE EXAMPLE | 280 | 30 | 30 | 16.8 | 50 | 150 OR LESS | Ar—20%CO2 | 25 |
| 110 | COMPARATIVE EXAMPLE | 280 | 30 | 30 | 16.8 | 50 | 150 OR LESS | Ar—20%CO2 | 25 |
| 111 | COMPARATIVE EXAMPLE | 280 | 30 | 30 | 16.8 | 50 | 150 OR LESS | Ar—20%CO2 | 25 |
| 112 | COMPARATIVE EXAMPLE | 280 | 30 | 30 | 16.8 | 50 | 150 OR LESS | Ar—20%CO2 | 25 |
| 113 | COMPARATIVE EXAMPLE | 280 | 30 | 30 | 16.8 | 50 | 150 OR LESS | Ar—20%CO2 | 25 |
| 114 | COMPARATIVE EXAMPLE | 280 | 30 | 30 | 16.8 | 50 | 150 OR LESS | Ar—20%CO2 | 25 |
| 115 | COMPARATIVE EXAMPLE | 280 | 30 | 30 | 16.8 | 50 | 150 OR LESS | Ar—20%CO2 | 25 |
| 116 | COMPARATIVE EXAMPLE | 280 | 30 | 30 | 16.8 | 50 | 150 OR LESS | Ar—20%CO2 | 25 |
| 117 | COMPARATIVE EXAMPLE | 280 | 30 | 30 | 16.8 | 50 | 150 OR LESS | Ar—20%CO2 | 25 |
| 118 | COMPARATIVE EXAMPLE | 280 | 30 | 30 | 16.8 | 50 | 150 OR LESS | Ar—20%CO2 | 25 |
| 119 | COMPARATIVE EXAMPLE | 280 | 30 | 30 | 16.8 | 50 | 150 OR LESS | Ar—20%CO2 | 25 |
| 120 | COMPARATIVE EXAMPLE | 280 | 30 | 30 | 16.8 | 50 | 150 OR LESS | Ar—20%CO2 | 25 |
| 121 | COMPARATIVE EXAMPLE | 280 | 30 | 30 | 16.8 | 50 | 150 OR LESS | Ar—20%CO2 | 25 |
| 122 | COMPARATIVE EXAMPLE | 280 | 30 | 30 | 16.8 | 50 | 150 OR LESS | Ar—20%CO2 | 25 |
| 123 | COMPARATIVE EXAMPLE | 280 | 30 | 30 | 16.8 | 50 | 150 OR LESS | Ar—20%CO2 | 25 |
| 124 | COMPARATIVE EXAMPLE | 280 | 30 | 30 | 16.8 | 50 | 150 OR LESS | Ar—20%CO2 | 25 |
| 125 | COMPARATIVE EXAMPLE | 280 | 30 | 30 | 16.8 | 50 | 150 OR LESS | Ar—20%CO2 | 25 |
| 126 | COMPARATIVE EXAMPLE | 280 | 30 | 30 | 16.8 | 50 | 150 OR LESS | Ar—20%CO2 | 25 |

TABLE 3-5

| WIRE No. | CATEGORY | WELDING CONDITIONS ||||||||
| | | CURRENT [A] | VOLT-AGE [V] | WELDING SPEED [cm/min] | HEAT INPUT [kJ/cm] | PREHEATING TEMPERATURE [° C.] | INTERPASS TEMPERATURE [° C.] | SHIELD GAS | FLOW RATE OF GAS [L/min] |
| --- | --- | --- | --- | --- | --- | --- | --- | --- | --- |
| 127 | COMPARATIVE EXAMPLE | 280 | 30 | 30 | 16.8 | 50 | 150 OR LESS | Ar—20%CO2 | 25 |
| 128 | COMPARATIVE EXAMPLE | 280 | 30 | 30 | 16.8 | 50 | 150 OR LESS | Ar—20%CO2 | 25 |
| 129 | COMPARATIVE EXAMPLE | 280 | 30 | 30 | 16.8 | 50 | 150 OR LESS | Ar—20%CO2 | 25 |
| 130 | COMPARATIVE EXAMPLE | 280 | 30 | 30 | 16.8 | 50 | 150 OR LESS | Ar—20%CO2 | 25 |

TABLE 3-5-continued

| | | WELDING CONDITIONS | | | | | | | |
|---|---|---|---|---|---|---|---|---|---|
| WIRE No. | CATEGORY | CURRENT [A] | VOLT-AGE [V] | WELDING SPEED [cm/min] | HEAT INPUT [kJ/cm] | PREHEATING TEMPERATURE [° C.] | INTERPASS TEMPERATURE [° C.] | SHIELD GAS | FLOW RATE OF GAS [L/min] |
| 131 | COMPARATIVE EXAMPLE | 280 | 30 | 30 | 16.8 | 50 | 150 OR LESS | Ar—20%CO2 | 25 |
| 132 | COMPARATIVE EXAMPLE | 280 | 30 | 30 | 16.8 | 50 | 150 OR LESS | Ar—20%CO2 | 25 |
| 133 | COMPARATIVE EXAMPLE | 280 | 30 | 30 | 16.8 | 50 | 150 OR LESS | Ar—20%CO2 | 25 |
| 134 | COMPARATIVE EXAMPLE | 280 | 30 | 30 | 16.8 | 50 | 150 OR LESS | Ar—20%CO2 | 25 |
| 135 | COMPARATIVE EXAMPLE | 280 | 30 | 30 | 16.8 | 50 | 150 OR LESS | Ar—20%CO2 | 25 |
| 136 | COMPARATIVE EXAMPLE | 280 | 30 | 30 | 16.8 | 50 | 150 OR LESS | Ar—20%CO2 | 25 |
| 137 | COMPARATIVE EXAMPLE | 280 | 30 | 30 | 16.8 | 50 | 150 OR LESS | Ar—20%CO2 | 25 |
| 138 | COMPARATIVE EXAMPLE | 280 | 30 | 30 | 16.8 | 50 | 150 OR LESS | Ar—20%CO2 | 25 |
| 139 | COMPARATIVE EXAMPLE | 280 | 30 | 30 | 16.8 | 50 | 150 OR LESS | Ar—20%CO2 | 25 |
| 140 | COMPARATIVE EXAMPLE | 280 | 30 | 30 | 16.8 | 50 | 150 OR LESS | Ar—20%CO2 | 25 |
| 141 | COMPARATIVE EXAMPLE | 280 | 30 | 30 | 16.8 | 50 | 150 OR LESS | Ar—20%CO2 | 25 |
| 142 | COMPARATIVE EXAMPLE | 280 | 30 | 30 | 16.8 | 50 | 150 OR LESS | Ar—20%CO2 | 25 |
| 143 | COMPARATIVE EXAMPLE | 280 | 30 | 30 | 16.8 | 50 | 150 OR LESS | Ar—20%CO2 | 25 |
| 144 | COMPARATIVE EXAMPLE | 280 | 30 | 30 | 16.8 | 50 | 150 OR LESS | Ar—20%CO2 | 25 |
| 145 | COMPARATIVE EXAMPLE | 280 | 30 | 30 | 16.8 | 50 | 150 OR LESS | Ar—20%CO2 | 25 |
| 146 | COMPARATIVE EXAMPLE | 280 | 30 | 30 | 16.8 | 50 | 150 OR LESS | Ar—20%CO2 | 25 |
| 147 | COMPARATIVE EXAMPLE | 280 | 30 | 30 | 16.8 | 50 | 150 OR LESS | Ar—20%CO2 | 25 |
| 148 | COMPARATIVE EXAMPLE | 280 | 30 | 30 | 16.8 | 50 | 150 OR LESS | Ar—20%CO2 | 25 |
| 149 | COMPARATIVE EXAMPLE | 280 | 30 | 30 | 16.8 | 50 | 150 OR LESS | Ar—20%CO2 | 25 |
| 150 | COMPARATIVE EXAMPLE | 280 | 30 | 30 | 16.8 | 50 | 150 OR LESS | Ar—20%CO2 | 25 |
| 151 | COMPARATIVE EXAMPLE | 280 | 30 | 30 | 16.8 | 50 | 150 OR LESS | Ar—20%CO2 | 25 |
| 152 | COMPARATIVE EXAMPLE | 280 | 30 | 30 | 16.8 | 50 | 150 OR LESS | Ar—20%CO2 | 25 |
| 153 | COMPARATIVE EXAMPLE | 280 | 30 | 30 | 16.8 | 50 | 150 OR LESS | Ar—20%CO2 | 25 |
| 154 | COMPARATIVE EXAMPLE | 280 | 30 | 30 | 16.8 | 50 | 150 OR LESS | Ar—20%CO2 | 25 |
| 155 | COMPARATIVE EXAMPLE | 280 | 30 | 30 | 16.8 | 50 | 150 OR LESS | Ar—20%CO2 | 25 |
| 156 | COMPARATIVE EXAMPLE | 280 | 30 | 30 | 16.8 | 50 | 150 OR LESS | Ar—20%CO2 | 25 |
| 157 | COMPARATIVE EXAMPLE | 280 | 30 | 30 | 16.8 | 50 | 150 OR LESS | Ar—20%CO2 | 25 |
| 158 | COMPARATIVE EXAMPLE | 280 | 30 | 30 | 16.8 | 50 | 150 OR LESS | Ar—20%CO2 | 25 |
| 159 | COMPARATIVE EXAMPLE | 280 | 30 | 30 | 16.8 | 50 | 150 OR LESS | Ar—20%CO2 | 25 |
| 160 | COMPARATIVE EXAMPLE | 280 | 30 | 30 | 16.8 | 50 | 150 OR LESS | Ar—20%CO2 | 25 |

TABLE 3-6

| WIRE No. | CATEGORY | WELDING CONDITIONS ||||||||
| | | CURRENT [A] | VOLT-AGE [V] | WELDING SPEED [cm/min] | HEAT INPUT [kJ/cm] | PREHEATING TEMPERATURE [° C.] | INTERPASS TEMPERATURE [° C.] | SHIELD GAS | FLOW RATE OF GAS [L/min] |
|---|---|---|---|---|---|---|---|---|---|
| 161 | EXAMPLE | 280 | 30 | 30 | 16.8 | NO PREHEATING | 150 OR LESS | Ar—20%CO2 | 25 |
| 162 | EXAMPLE | 280 | 30 | 30 | 16.8 | NO PREHEATING | 150 OR LESS | Ar—20%CO2 | 25 |
| 163 | EXAMPLE | 280 | 30 | 30 | 16.8 | NO PREHEATING | 150 OR LESS | Ar—20%CO2 | 25 |
| 164 | EXAMPLE | 280 | 30 | 30 | 16.8 | NO PREHEATING | 150 OR LESS | 100%CO2 | 25 |
| 165 | EXAMPLE | 280 | 30 | 30 | 16.8 | 50 | 150 OR LESS | Ar—20%CO2 | 25 |
| 166 | EXAMPLE | 280 | 30 | 30 | 16.8 | NO PREHEATING | 150 OR LESS | Ar—20%CO2 | 25 |
| 167 | EXAMPLE | 280 | 30 | 30 | 16.8 | 50 | 150 OR LESS | 100%CO2 | 25 |
| 168 | EXAMPLE | 280 | 30 | 30 | 16.8 | 50 | 150 OR LESS | Ar—20%CO2 | 25 |
| 169 | EXAMPLE | 280 | 30 | 30 | 16.8 | NO PREHEATING | 150 OR LESS | 100%CO2 | 25 |
| 170 | EXAMPLE | 280 | 30 | 30 | 16.8 | 50 | 150 OR LESS | 100%CO2 | 25 |
| 171 | COMPARATIVE EXAMPLE | 280 | 30 | 30 | 16.8 | 50 | 150 OR LESS | Ar—20%CO2 | 25 |
| 172 | COMPARATIVE EXAMPLE | 280 | 30 | 30 | 16.8 | 150 | 150 OR LESS | Ar—20%CO2 | 25 |
| 173 | COMPARATIVE EXAMPLE | 280 | 30 | 30 | 16.8 | 150 | 150 OR LESS | Ar—20%CO2 | 25 |
| 174 | COMPARATIVE EXAMPLE | 280 | 30 | 30 | 16.8 | 150 | 150 OR LESS | Ar—20%CO2 | 25 |
| 175 | EXAMPLE | 280 | 30 | 30 | 16.8 | 100 | 150 OR LESS | Ar—20%CO2 | 25 |

TABLE 3-7

| WIRE NO. | CATEGORY | WELDING CONDITIONS ||||||||
| | | CURRENT [A] | VOLT-AGE [V] | WELDING SPEED [cm/min] | HEAT INPUT [kJ/cm] | PREHEATING TEMPERATURE [° C.] | INTERPASS TEMPERATURE [° C.] | SHIELD GAS | FLOW RATE OF GAS [L/min] |
|---|---|---|---|---|---|---|---|---|---|
| 5-2 | EXAMPLE | 280 | 30 | 30 | 16.8 | 50 | 150 OR LESS | Ar—20%CO2 | 25 |
| 6-2 | EXAMPLE | 280 | 30 | 30 | 16.8 | 50 | 150 OR LESS | Ar—20%CO2 | 25 |
| 30-2 | EXAMPLE | 280 | 30 | 30 | 16.8 | 50 | 150 OR LESS | 100%CO2 | 25 |
| 61-2 | EXAMPLE | 280 | 30 | 30 | 16.8 | 50 | 150 OR LESS | Ar—20%CO2 | 25 |
| 62-2 | EXAMPLE | 280 | 30 | 30 | 16.8 | 50 | 150 OR LESS | Ar—20%CO2 | 25 |
| 90-2 | EXAMPLE | 280 | 30 | 30 | 16.8 | 50 | 150 OR LESS | 100%CO2 | 25 |

TABLE 4-1

| WIRE NO. | CATEGORY | YIELD STRENGTH [MPa] | TENSILE STRENGTH [MPa] | FRACTURE ELON-GATION [%] | CHARPY ABSORBED ENERGY AT −40° C. [J] | DIFFUSIBLE HYDROGEN [ml/100 g] | STRENGTH | ELON-GA-TION | TOUGH-NESS | OVER-ALL DETER-MINA-TION |
|---|---|---|---|---|---|---|---|---|---|---|
| 1 | EXAMPLE | 896 | 962 | 15.2 | 62 | 0.8 | PASS | PASS | PASS | PASS |
| 2 | EXAMPLE | 997 | 1084 | 18.6 | 59 | 0.9 | PASS | PASS | PASS | PASS |
| 3 | EXAMPLE | 904 | 978 | 16.8 | 60 | 0.7 | PASS | PASS | PASS | PASS |
| 4 | EXAMPLE | 1036 | 1141 | 17.6 | 51 | 0.9 | PASS | PASS | PASS | PASS |
| 5 | EXAMPLE | 1084 | 1226 | 19.4 | 38 | 0.8 | PASS | PASS | PASS | PASS |
| 6 | EXAMPLE | 1046 | 1197 | 18.2 | 41 | 0.7 | PASS | PASS | PASS | PASS |
| 7 | EXAMPLE | 1033 | 1131 | 17.2 | 46 | 0.6 | PASS | PASS | PASS | PASS |
| 8 | EXAMPLE | 1048 | 1184 | 16.1 | 45 | 0.7 | PASS | PASS | PASS | PASS |
| 9 | EXAMPLE | 1106 | 1264 | 15.4 | 36 | 0.6 | PASS | PASS | PASS | PASS |
| 10 | EXAMPLE | 925 | 1013 | 18.5 | 53 | 0.7 | PASS | PASS | PASS | PASS |
| 11 | EXAMPLE | 910 | 997 | 19.6 | 59 | 0.9 | PASS | PASS | PASS | PASS |
| 12 | EXAMPLE | 921 | 979 | 18.2 | 57 | 0.8 | PASS | PASS | PASS | PASS |
| 13 | EXAMPLE | 1094 | 1275 | 15.3 | 36 | 0.8 | PASS | PASS | PASS | PASS |
| 14 | EXAMPLE | 914 | 1004 | 19.1 | 49 | 0.7 | PASS | PASS | PASS | PASS |
| 15 | EXAMPLE | 980 | 1067 | 17.9 | 47 | 0.5 | PASS | PASS | PASS | PASS |
| 16 | EXAMPLE | 1078 | 1216 | 16.8 | 40 | 0.9 | PASS | PASS | PASS | PASS |
| 17 | EXAMPLE | 1094 | 1203 | 16.5 | 37 | 0.7 | PASS | PASS | PASS | PASS |
| 18 | EXAMPLE | 1116 | 1297 | 14.6 | 34 | 0.9 | PASS | PASS | PASS | PASS |
| 19 | EXAMPLE | 946 | 1062 | 18.5 | 49 | 0.9 | PASS | PASS | PASS | PASS |
| 20 | EXAMPLE | 953 | 1049 | 17.9 | 52 | 0.9 | PASS | PASS | PASS | PASS |
| 21 | EXAMPLE | 1081 | 1226 | 15.7 | 39 | 0.7 | PASS | PASS | PASS | PASS |
| 22 | EXAMPLE | 1073 | 1216 | 15.4 | 40 | 0.8 | PASS | PASS | PASS | PASS |
| 23 | EXAMPLE | 892 | 973 | 18.9 | 56 | 0.8 | PASS | PASS | PASS | PASS |
| 24 | EXAMPLE | 1110 | 1254 | 17.0 | 37 | 0.9 | PASS | PASS | PASS | PASS |
| 25 | EXAMPLE | 1134 | 1315 | 15.2 | 33 | 1.0 | PASS | PASS | PASS | PASS |
| 26 | EXAMPLE | 1097 | 1234 | 17.3 | 38 | 0.6 | PASS | PASS | PASS | PASS |

TABLE 4-1-continued

| WIRE NO. | CATEGORY | YIELD STRENGTH [MPa] | TENSILE STRENGTH [MPa] | FRACTURE ELONGATION [%] | CHARPY ABSORBED ENERGY AT −40° C. [J] | DIFFUSIBLE HYDROGEN [ml/100 g] | STRENGTH | ELONGATION | TOUGHNESS | OVERALL DETERMINATION |
|---|---|---|---|---|---|---|---|---|---|---|
| 27 | EXAMPLE | 1112 | 1273 | 16.9 | 36 | 0.7 | PASS | PASS | PASS | PASS |
| 28 | EXAMPLE | 1071 | 1208 | 17.8 | 39 | 0.6 | PASS | PASS | PASS | PASS |
| 29 | EXAMPLE | 902 | 989 | 19.5 | 58 | 0.7 | PASS | PASS | PASS | PASS |
| 30 | EXAMPLE | 1125 | 1301 | 15.8 | 35 | 0.7 | PASS | PASS | PASS | PASS |

TABLE 4-2

| WIRE NO. | CATEGORY | YIELD STRENGTH [MPa] | TENSILE STRENGTH [MPa] | FRACTURE ELONGATION [%] | CHARPY ABSORBED ENERGY AT −40° C. [J] | DIFFUSIBLE HYDROGEN [ml/100 g] | STRENGTH | ELONGATION | TOUGHNESS | OVERALL DETERMINATION |
|---|---|---|---|---|---|---|---|---|---|---|
| 31 | EXAMPLE | 999 | 1079 | 13.6 | 49 | 0.7 | PASS | PASS | PASS | PASS |
| 32 | EXAMPLE | 871 | 957 | 14.0 | 56 | 0.8 | PASS | PASS | PASS | PASS |
| 33 | EXAMPLE | 925 | 1056 | 17.6 | 48 | 0.9 | PASS | PASS | PASS | PASS |
| 34 | EXAMPLE | 930 | 1043 | 17.0 | 49 | 0.9 | PASS | PASS | PASS | PASS |
| 35 | EXAMPLE | 922 | 1069 | 17.6 | 46 | 0.8 | PASS | PASS | PASS | PASS |
| 36 | EXAMPLE | 1038 | 1227 | 16.8 | 39 | 0.9 | PASS | PASS | PASS | PASS |
| 37 | EXAMPLE | 1067 | 1211 | 16.2 | 37 | 0.9 | PASS | PASS | PASS | PASS |
| 38 | EXAMPLE | 1055 | 1219 | 16.6 | 39 | 0.8 | PASS | PASS | PASS | PASS |
| 39 | EXAMPLE | 1107 | 1289 | 15.9 | 35 | 0.5 | PASS | PASS | PASS | PASS |
| 40 | EXAMPLE | 1169 | 1435 | 13.0 | 27 | 0.7 | PASS | PASS | PASS | PASS |
| 41 | EXAMPLE | 1157 | 1384 | 15.4 | 30 | 0.9 | PASS | PASS | PASS | PASS |
| 42 | EXAMPLE | 1160 | 1341 | 15.9 | 32 | 0.9 | PASS | PASS | PASS | PASS |
| 43 | EXAMPLE | 1142 | 1330 | 16.2 | 33 | 0.7 | PASS | PASS | PASS | PASS |
| 44 | EXAMPLE | 1106 | 1287 | 17.6 | 34 | 0.7 | PASS | PASS | PASS | PASS |
| 45 | EXAMPLE | 1118 | 1280 | 17.1 | 36 | 0.9 | PASS | PASS | PASS | PASS |
| 46 | EXAMPLE | 1093 | 1297 | 17.5 | 35 | 0.8 | PASS | PASS | PASS | PASS |
| 47 | EXAMPLE | 1080 | 1246 | 18.0 | 39 | 0.9 | PASS | PASS | PASS | PASS |
| 48 | EXAMPLE | 1082 | 1221 | 17.5 | 40 | 0.9 | PASS | PASS | PASS | PASS |
| 49 | EXAMPLE | 1089 | 1249 | 17.2 | 37 | 0.7 | PASS | PASS | PASS | PASS |
| 50 | EXAMPLE | 1134 | 1254 | 16.1 | 39 | 0.7 | PASS | PASS | PASS | PASS |
| 51 | EXAMPLE | 1117 | 1265 | 17.8 | 38 | 0.6 | PASS | PASS | PASS | PASS |
| 52 | EXAMPLE | 1122 | 1275 | 17.6 | 37 | 0.8 | PASS | PASS | PASS | PASS |
| 53 | EXAMPLE | 1146 | 1308 | 16.1 | 33 | 0.8 | PASS | PASS | PASS | PASS |
| 54 | EXAMPLE | 1137 | 1379 | 15.2 | 29 | 0.7 | PASS | PASS | PASS | PASS |
| 55 | EXAMPLE | 1129 | 1288 | 15.7 | 32 | 0.9 | PASS | PASS | PASS | PASS |
| 56 | EXAMPLE | 1116 | 1276 | 15.3 | 34 | 0.8 | PASS | PASS | PASS | PASS |
| 57 | EXAMPLE | 1191 | 1429 | 12.2 | 28 | 0.9 | PASS | PASS | PASS | PASS |
| 58 | EXAMPLE | 1154 | 1307 | 14.5 | 36 | 1.0 | PASS | PASS | PASS | PASS |
| 59 | EXAMPLE | 1209 | 1400 | 12.1 | 30 | 0.8 | PASS | PASS | PASS | PASS |
| 60 | EXAMPLE | 1184 | 1384 | 12.6 | 29 | 0.7 | PASS | PASS | PASS | PASS |

TABLE 4-3

| WIRE NO. | CATEGORY | YIELD STRENGTH [MPa] | TENSILE STRENGTH [MPa] | FRACTURE ELONGATION [%] | CHARPY ABSORBED ENERGY AT −40° C. [J] | DIFFUSIBLE HYDROGEN [ml/100 g] | STRENGTH | ELONGATION | TOUGHNESS | OVERALL DETERMINATION |
|---|---|---|---|---|---|---|---|---|---|---|
| 61 | EXAMPLE | 1113 | 1268 | 16.4 | 36 | 0.7 | PASS | PASS | PASS | PASS |
| 62 | EXAMPLE | 1026 | 1120 | 18.6 | 44 | 0.9 | PASS | PASS | PASS | PASS |
| 63 | EXAMPLE | 1072 | 1236 | 16.2 | 39 | 0.8 | PASS | PASS | PASS | PASS |
| 64 | EXAMPLE | 1108 | 1289 | 15.5 | 34 | 0.7 | PASS | PASS | PASS | PASS |
| 65 | EXAMPLE | 1120 | 1278 | 16.3 | 35 | 0.6 | PASS | PASS | PASS | PASS |
| 66 | EXAMPLE | 1125 | 1294 | 15.9 | 35 | 0.5 | PASS | PASS | PASS | PASS |
| 67 | EXAMPLE | 1064 | 1205 | 18.2 | 43 | 0.6 | PASS | PASS | PASS | PASS |
| 68 | EXAMPLE | 1055 | 1216 | 18.1 | 42 | 0.9 | PASS | PASS | PASS | PASS |
| 69 | EXAMPLE | 1029 | 1164 | 19.3 | 46 | 0.7 | PASS | PASS | PASS | PASS |
| 70 | EXAMPLE | 1118 | 1263 | 17.8 | 39 | 0.9 | PASS | PASS | PASS | PASS |
| 71 | EXAMPLE | 1076 | 1217 | 16.5 | 41 | 0.8 | PASS | PASS | PASS | PASS |
| 72 | EXAMPLE | 1146 | 1327 | 13.8 | 32 | 0.9 | PASS | PASS | PASS | PASS |
| 73 | EXAMPLE | 1052 | 1201 | 17.6 | 45 | 0.7 | PASS | PASS | PASS | PASS |
| 74 | EXAMPLE | 1127 | 1293 | 15.4 | 37 | 0.7 | PASS | PASS | PASS | PASS |
| 75 | EXAMPLE | 1115 | 1280 | 15.7 | 35 | 0.7 | PASS | PASS | PASS | PASS |
| 76 | EXAMPLE | 1101 | 1261 | 16.3 | 36 | 0.7 | PASS | PASS | PASS | PASS |
| 77 | EXAMPLE | 1129 | 1288 | 16.1 | 34 | 0.9 | PASS | PASS | PASS | PASS |

TABLE 4-3-continued

| WIRE NO. | CATEGORY | YIELD STRENGTH [MPa] | TENSILE STRENGTH [MPa] | FRACTURE ELONGATION [%] | CHARPY ABSORBED ENERGY AT −40° C. [J] | DIFFUSIBLE HYDROGEN [ml/100 g] | STRENGTH | ELONGATION | TOUGHNESS | OVERALL DETERMINATION |
|---|---|---|---|---|---|---|---|---|---|---|
| 78 | EXAMPLE | 1108 | 1243 | 16.4 | 36 | 0.8 | PASS | PASS | PASS | PASS |
| 79 | EXAMPLE | 1124 | 1275 | 15.8 | 36 | 0.7 | PASS | PASS | PASS | PASS |
| 80 | EXAMPLE | 1118 | 1279 | 15.0 | 33 | 0.8 | PASS | PASS | PASS | PASS |
| 81 | EXAMPLE | 1079 | 1202 | 19.2 | 42 | 0.8 | PASS | PASS | PASS | PASS |
| 82 | EXAMPLE | 1087 | 1230 | 18.8 | 38 | 0.8 | PASS | PASS | PASS | PASS |
| 83 | EXAMPLE | 1066 | 1214 | 18.0 | 38 | 0.7 | PASS | PASS | PASS | PASS |
| 84 | EXAMPLE | 1105 | 1238 | 17.4 | 36 | 0.9 | PASS | PASS | PASS | PASS |
| 85 | EXAMPLE | 1099 | 1232 | 17.5 | 37 | 0.7 | PASS | PASS | PASS | PASS |
| 86 | EXAMPLE | 1125 | 1245 | 18.2 | 37 | 0.8 | PASS | PASS | PASS | PASS |
| 87 | EXAMPLE | 1120 | 1290 | 15.2 | 34 | 0.9 | PASS | PASS | PASS | PASS |
| 88 | EXAMPLE | 1131 | 1315 | 14.0 | 29 | 0.9 | PASS | PASS | PASS | PASS |
| 89 | EXAMPLE | 1174 | 1301 | 13.3 | 30 | 0.7 | PASS | PASS | PASS | PASS |
| 90 | EXAMPLE | 1155 | 1333 | 12.4 | 28 | 0.6 | PASS | PASS | PASS | PASS |

TABLE 4-4

| WIRE NO. | CATEGORY | YIELD STRENGTH [MPa] | TENSILE STRENGTH [MPa] | FRACTURE ELONGATION [%] | CHARPY ABSORBED ENERGY AT −40° C. [J] | DIFFUSIBLE HYDROGEN [ml/100 g] | STRENGTH | ELONGATION | TOUGHNESS | OVERALL DETERMINATION |
|---|---|---|---|---|---|---|---|---|---|---|
| 91 | EXAMPLE | 903 | 989 | 13.8 | 59 | 0.7 | PASS | PASS | PASS | PASS |
| 92 | EXAMPLE | 884 | 975 | 15.3 | 55 | 0.9 | PASS | PASS | PASS | PASS |
| 93 | EXAMPLE | 913 | 984 | 15.5 | 56 | 0.5 | PASS | PASS | PASS | PASS |
| 94 | EXAMPLE | 897 | 968 | 14.3 | 53 | 0.7 | PASS | PASS | PASS | PASS |
| 95 | EXAMPLE | 901 | 976 | 15.2 | 58 | 0.9 | PASS | PASS | PASS | PASS |
| 96 | EXAMPLE | 908 | 987 | 18.9 | 60 | 0.8 | PASS | PASS | PASS | PASS |
| 97 | EXAMPLE | 943 | 1067 | 15.0 | 51 | 0.9 | PASS | PASS | PASS | PASS |
| 98 | EXAMPLE | 987 | 1097 | 16.4 | 50 | 0.9 | PASS | PASS | PASS | PASS |
| 99 | EXAMPLE | 975 | 1082 | 17.7 | 53 | 0.9 | PASS | PASS | PASS | PASS |
| 100 | EXAMPLE | 912 | 994 | 14.7 | 55 | 0.9 | PASS | PASS | PASS | PASS |
| 101 | EXAMPLE | 918 | 1005 | 14.9 | 52 | 0.8 | PASS | PASS | PASS | PASS |
| 102 | EXAMPLE | 904 | 987 | 15.9 | 57 | 0.9 | PASS | PASS | PASS | PASS |
| 103 | EXAMPLE | 926 | 1021 | 14.5 | 49 | 0.7 | PASS | PASS | PASS | PASS |
| 104 | EXAMPLE | 905 | 1013 | 13.0 | 52 | 0.7 | PASS | PASS | PASS | PASS |
| 105 | EXAMPLE | 915 | 1035 | 13.5 | 50 | 0.7 | PASS | PASS | PASS | PASS |
| 106 | EXAMPLE | 1134 | 1342 | 12.1 | 28 | 0.9 | PASS | PASS | PASS | PASS |
| 107 | EXAMPLE | 1152 | 1371 | 12.2 | 27 | 0.8 | PASS | PASS | PASS | PASS |
| 108 | EXAMPLE | 910 | 990 | 13.8 | 54 | 0.7 | PASS | PASS | PASS | PASS |
| 109 | COMPARATIVE EXAMPLE | 856 | 946 | 14.5 | 61 | 0.9 | FAIL | PASS | PASS | FAIL |
| 110 | COMPARATIVE EXAMPLE | 843 | 935 | 15.2 | 59 | 0.7 | FAIL | PASS | PASS | FAIL |
| 111 | COMPARATIVE EXAMPLE | 897 | 994 | 10.6 | 57 | 0.9 | PASS | FAIL | PASS | FAIL |
| 112 | COMPARATIVE EXAMPLE | 934 | 1014 | 9.9 | 53 | 0.9 | PASS | FAIL | PASS | FAIL |
| 113 | COMPARATIVE EXAMPLE | 901 | 987 | 5.4 | 51 | 0.8 | PASS | FAIL | PASS | FAIL |
| 114 | COMPARATIVE EXAMPLE | 936 | 1022 | 4.9 | 54 | 0.7 | PASS | FAIL | PASS | FAIL |
| 115 | COMPARATIVE EXAMPLE | 732 | 824 | 18.9 | 69 | 0.7 | FAIL | PASS | PASS | FAIL |
| 116 | COMPARATIVE EXAMPLE | 729 | 836 | 19.0 | 64 | 0.6 | FAIL | PASS | PASS | FAIL |
| 117 | COMPARATIVE EXAMPLE | 902 | 987 | 16.6 | 25 | 0.8 | PASS | PASS | FAIL | FAIL |
| 118 | COMPARATIVE EXAMPLE | 892 | 965 | 16.0 | 26 | 0.7 | PASS | PASS | FAIL | FAIL |
| 119 | COMPARATIVE EXAMPLE | 899 | 996 | 16.1 | 24 | 0.7 | PASS | PASS | FAIL | FAIL |
| 120 | COMPARATIVE EXAMPLE | 1121 | 1240 | 14.2 | 19 | 0.7 | PASS | PASS | FAIL | FAIL |
| 121 | COMPARATIVE EXAMPLE | 1130 | 1255 | 13.5 | 17 | 0.9 | PASS | PASS | FAIL | FAIL |
| 122 | COMPARATIVE EXAMPLE | 1104 | 1231 | 9.0 | 35 | 0.7 | PASS | FAIL | PASS | FAIL |
| 123 | COMPARATIVE EXAMPLE | 1087 | 1209 | 9.3 | 32 | 0.8 | PASS | FAIL | PASS | FAIL |

TABLE 4-4-continued

| WIRE NO. | CATEGORY | YIELD STRENGTH [MPa] | TENSILE STRENGTH [MPa] | FRACTURE ELON- GATION [%] | CHARPY ABSORBED ENERGY AT −40° C. [J] | DIFFUSIBLE HYDROGEN [ml/100 g] | STRENGTH | ELON- GA- TION | TOUGH- NESS | OVER- ALL DETER- MINA- TION |
|---|---|---|---|---|---|---|---|---|---|---|
| 124 | COMPARATIVE EXAMPLE | 963 | 1036 | 3.5 | 45 | 0.8 | PASS | FAIL | PASS | FAIL |
| 125 | COMPARATIVE EXAMPLE | 955 | 1058 | 4.1 | 42 | 0.6 | PASS | FAIL | PASS | FAIL |
| 126 | COMPARATIVE EXAMPLE | 974 | 1063 | 3.6 | 42 | 0.9 | PASS | FAIL | PASS | FAIL |

TABLE 4-5

| WIRE NO. | CATEGORY | YIELD STRENGTH [MPa] | TENSILE STRENGTH [MPa] | FRACTURE ELON- GATION [%] | CHARPY ABSORBED ENERGY AT −40° C. [J] | DIFFUSIBLE HYDROGEN [ml/100 g] | STRENGTH | ELON- GA- TION | TOUGH- NESS | OVER- ALL DETER- MINA- TION |
|---|---|---|---|---|---|---|---|---|---|---|
| 127 | COMPARATIVE EXAMPLE | 1082 | 1224 | 10.8 | 23 | 0.7 | PASS | FAIL | FAIL | FAIL |
| 128 | COMPARATIVE EXAMPLE | NOT EVALUATED DUE TO INFERIOR WELDING WORKABILITY | | | | | — | — | — | FAIL |
| 129 | COMPARATIVE EXAMPLE | 1067 | 1215 | 11.0 | 24 | 0.8 | PASS | FAIL | FAIL | FAIL |
| 130 | COMPARATIVE EXAMPLE | NOT EVALUATED DUE TO INFERIOR WELDING WORKABILITY | | | | | — | — | — | FAIL |
| 131 | COMPARATIVE EXAMPLE | 1008 | 1123 | 4.6 | 31 | 0.6 | PASS | FAIL | PASS | FAIL |
| 132 | COMPARATIVE EXAMPLE | 1072 | 1236 | 3.1 | 29 | 0.7 | PASS | FAIL | PASS | FAIL |
| 133 | COMPARATIVE EXAMPLE | 1106 | 1274 | 14.2 | 20 | 0.9 | PASS | PASS | FAIL | FAIL |
| 134 | COMPARATIVE EXAMPLE | 1061 | 1219 | 17.6 | 18 | 0.7 | PASS | PASS | FAIL | FAIL |
| 135 | COMPARATIVE EXAMPLE | NOT EVALUATED DUE TO INFERIOR WELDING WORKABILITY | | | | | — | — | — | FAIL |
| 136 | COMPARATIVE EXAMPLE | 843 | 941 | 18.5 | 62 | 0.7 | FAIL | PASS | PASS | FAIL |
| 137 | COMPARATIVE EXAMPLE | 1142 | 1362 | 12.0 | 23 | 0.8 | PASS | PASS | FAIL | FAIL |
| 138 | COMPARATIVE EXAMPLE | 981 | 1097 | 17.2 | 25 | 0.8 | PASS | PASS | FAIL | FAIL |
| 139 | COMPARATIVE EXAMPLE | 1005 | 1120 | 17.0 | 23 | 0.8 | PASS | PASS | FAIL | FAIL |
| 140 | COMPARATIVE EXAMPLE | 1094 | 1223 | 10.8 | 34 | 0.9 | PASS | FAIL | PASS | FAIL |
| 141 | COMPARATIVE EXAMPLE | 1132 | 1245 | 16.9 | 23 | 0.9 | PASS | PASS | FAIL | FAIL |
| 142 | COMPARATIVE EXAMPLE | 1111 | 1285 | 6.8 | 13 | 0.7 | PASS | FAIL | FAIL | FAIL |
| 143 | COMPARATIVE EXAMPLE | 1129 | 1273 | 3.4 | 17 | 0.7 | PASS | FAIL | FAIL | FAIL |
| 144 | COMPARATIVE EXAMPLE | 997 | 1102 | 16.3 | 15 | 0.8 | PASS | PASS | FAIL | FAIL |
| 145 | COMPARATIVE EXAMPLE | 994 | 1085 | 15.9 | 18 | 0.6 | PASS | PASS | FAIL | FAIL |
| 146 | COMPARATIVE EXAMPLE | 986 | 1068 | 17.6 | 24 | 0.6 | PASS | PASS | FAIL | FAIL |
| 147 | COMPARATIVE EXAMPLE | NOT EVALUATED DUE TO INFERIOR WELDING WORKABILITY | | | | | — | — | — | FAIL |
| 148 | COMPARATIVE EXAMPLE | 1124 | 1320 | 3.6 | 40 | 0.8 | PASS | FAIL | PASS | FAIL |
| 149 | COMPARATIVE EXAMPLE | 1104 | 1259 | 17.5 | 22 | 0.9 | PASS | PASS | FAIL | FAIL |
| 150 | COMPARATIVE EXAMPLE | 975 | 1076 | 18.4 | 19 | 0.7 | PASS | PASS | FAIL | FAIL |
| 151 | COMPARATIVE EXAMPLE | 1167 | 1327 | 15.1 | 16 | 0.8 | PASS | PASS | FAIL | FAIL |
| 152 | COMPARATIVE EXAMPLE | 1125 | 1299 | 14.6 | 13 | 0.7 | PASS | PASS | FAIL | FAIL |
| 153 | COMPARATIVE EXAMPLE | 1062 | 1172 | 13.8 | 14 | 0.8 | PASS | PASS | FAIL | FAIL |
| 154 | COMPARATIVE EXAMPLE | 972 | 1083 | 18.9 | 20 | 0.7 | PASS | PASS | FAIL | FAIL |

TABLE 4-5-continued

| WIRE NO. | CATEGORY | YIELD STRENGTH [MPa] | TENSILE STRENGTH [MPa] | FRACTURE ELONGATION [%] | CHARPY ABSORBED ENERGY AT −40° C. [J] | DIFFUSIBLE HYDROGEN [ml/100 g] | STRENGTH | ELONGATION | TOUGHNESS | OVERALL DETERMINATION |
|---|---|---|---|---|---|---|---|---|---|---|
| 155 | COMPARATIVE EXAMPLE | 969 | 1058 | 18.6 | 18 | 0.7 | PASS | PASS | FAIL | FAIL |
| 156 | COMPARATIVE EXAMPLE | 1046 | 1175 | 16.9 | 22 | 0.8 | PASS | PASS | FAIL | FAIL |
| 157 | COMPARATIVE EXAMPLE | 1080 | 1201 | 12.6 | 24 | 0.9 | PASS | PASS | FAIL | FAIL |
| 158 | COMPARATIVE EXAMPLE | 1033 | 1122 | 13.0 | 21 | 0.9 | PASS | PASS | FAIL | FAIL |
| 159 | COMPARATIVE EXAMPLE | 873 | 947 | 18.2 | 58 | 0.7 | FAIL | PASS | PASS | FAIL |
| 160 | COMPARATIVE EXAMPLE | 1123 | 1297 | 14.2 | 23 | 0.8 | PASS | PASS | FAIL | FAIL |

TABLE 4-6

| WIRE NO. | CATEGORY | YIELD STRENGTH [MPa] | TENSILE STRENGTH [MPa] | FRACTURE ELONGATION [%] | CHARPY ABSORBED ENERGY AT −40° C. [J] | DIFFUSIBLE HYDROGEN [ml/100 g] | STRENGTH | ELONGATION | TOUGHNESS | OVERALL DETERMINATION |
|---|---|---|---|---|---|---|---|---|---|---|
| 161 | EXAMPLE | 1022 | 1185 | 17.5 | 42 | 0.8 | PASS | PASS | PASS | PASS |
| 162 | EXAMPLE | 1054 | 1209 | 18.3 | 37 | 0.6 | PASS | PASS | PASS | PASS |
| 163 | EXAMPLE | 1042 | 1236 | 18.0 | 35 | 0.9 | PASS | PASS | PASS | PASS |
| 164 | EXAMPLE | 1033 | 1140 | 17.8 | 41 | 0.7 | PASS | PASS | PASS | PASS |
| 165 | EXAMPLE | 1115 | 1327 | 14.2 | 29 | 0.9 | PASS | PASS | PASS | PASS |
| 166 | EXAMPLE | 962 | 1075 | 16.9 | 45 | 0.7 | PASS | PASS | PASS | PASS |
| 167 | EXAMPLE | 1120 | 1302 | 14.7 | 31 | 0.8 | PASS | PASS | PASS | PASS |
| 168 | EXAMPLE | 1062 | 1204 | 17.6 | 36 | 0.9 | PASS | PASS | PASS | PASS |
| 169 | EXAMPLE | 1041 | 1182 | 16.7 | 37 | 0.6 | PASS | PASS | PASS | PASS |
| 170 | EXAMPLE | 1013 | 1154 | 17.0 | 37 | 1.0 | PASS | PASS | PASS | PASS |
| 171 | COMPARATIVE EXAMPLE | NOT EVALUATED DUE TO INFERIOR WELDING BEAD APPEARANCE | | | | — | — | — | — | FAIL |
| 172 | COMPARATIVE EXAMPLE | 1016 | 1242 | 2.8 | 22 | 4.8 | PASS | FAIL | FAIL | FAIL |
| 173 | COMPARATIVE EXAMPLE | 1008 | 1218 | 2.2 | 23 | 4.5 | PASS | FAIL | FAIL | FAIL |
| 174 | COMPARATIVE EXAMPLE | 994 | 1107 | 8.9 | 43 | 2.6 | PASS | FAIL | PASS | FAIL |
| 175 | EXAMPLE | 1082 | 1267 | 15.5 | 32 | 1.6 | PASS | PASS | PASS | PASS |

TABLE 4-7

| WIRE NO. | CATEGORY | YIELD STRENGTH [MPa] | TENSILE STRENGTH [MPa] | FRACTURE ELONGATION [%] | CHARPY ABSORBED ENERGY AT −40° C. [J] | DIFFUSIBLE HYDROGEN [ml/100 g] | STRENGTH | ELONGATION | TOUGHNESS | OVERALL DETERMINATION |
|---|---|---|---|---|---|---|---|---|---|---|
| 5-2 | EXAMPLE | 1062 | 1212 | 19.6 | 39 | 0.8 | PASS | PASS | PASS | PASS |
| 6-2 | EXAMPLE | 1049 | 1204 | 18.0 | 39 | 0.7 | PASS | PASS | PASS | PASS |
| 30-2 | EXAMPLE | 1112 | 1285 | 16.3 | 37 | 0.7 | PASS | PASS | PASS | PASS |
| 61-2 | EXAMPLE | 1120 | 1265 | 16.3 | 35 | 0.7 | PASS | PASS | PASS | PASS |
| 62-2 | EXAMPLE | 1041 | 1127 | 18.4 | 42 | 0.9 | PASS | PASS | PASS | PASS |
| 90-2 | EXAMPLE | 1141 | 1319 | 12.2 | 28 | 0.6 | PASS | PASS | PASS | PASS |

TABLE 5

| WIRE NO. | CATEGORY | YIELD STRENGTH [MPa] | TENSILE STRENGTH [MPa] | FRACTURE ELONGATION [%] | CHARPY ABSORBED ENERGY AT −40° C. [J] | DIFFUSIBLE HYDROGEN [ml/100 g] | CRACK ARREST TEMPERATURE [° C.] |
|---|---|---|---|---|---|---|---|
| 161 | EXAMPLE | 1022 | 1185 | 17.5 | 42 | 0.8 | 20 |
| 162 | EXAMPLE | 1054 | 1209 | 18.3 | 37 | 0.6 | 20 |
| 163 | EXAMPLE | 1042 | 1236 | 18.0 | 35 | 0.9 | 20 |
| 168 | EXAMPLE | 1062 | 1204 | 17.6 | 36 | 0.9 | 20 |
| 170 | EXAMPLE | 1013 | 1154 | 17.0 | 37 | 1.0 | 50 |
| 172 | COMPARATIVE EXAMPLE | 1016 | 1242 | 2.8 | 22 | 4.8 | 150 |
| 173 | COMPARATIVE EXAMPLE | 1008 | 1218 | 2.2 | 23 | 4.5 | 150 |
| 174 | COMPARATIVE EXAMPLE | 994 | 1107 | 8.9 | 43 | 2.6 | 100 |
| 175 | EXAMPLE | 1082 | 1267 | 15.5 | 32 | 1.6 | 100 |

| WIRE NO. | STRENGTH | ELONGATION | TOUGHNESS | CRITICAL PREHEATING TEMPERATURE | OVERALL DETERMINATION |
|---|---|---|---|---|---|
| 161 | PASS | PASS | PASS | PASS | PASS |
| 162 | PASS | PASS | PASS | PASS | PASS |
| 163 | PASS | PASS | PASS | PASS | PASS |
| 168 | PASS | PASS | PASS | PASS | PASS |
| 170 | PASS | PASS | PASS | PASS | PASS |
| 172 | PASS | FAIL | FAIL | FAIL | FAIL |
| 173 | PASS | FAIL | FAIL | FAIL | FAIL |
| 174 | PASS | FAIL | PASS | FAIL | FAIL |
| 175 | PASS | PASS | PASS | FAIL | FAIL |

TABLE 6

| STEEL PLATE NO. | PLATE THICKNESS | CHEMICAL COMPOSITION OF STEEL PLATE [MASS %] | | | | | | | | | | | MECHANICAL CHARACTERISTICS | | |
|---|---|---|---|---|---|---|---|---|---|---|---|---|---|---|---|
| | | C | Si | Mn | P | S | Al | Ni | Mo | Ti | N | O | Ceq | YIELD STRENGTH [MPa] | TENSILE STRENGTH [MPa] | CHARPY ABSORBED ENERGY AT −40° C. [J] |
| PL12 | 25 | 0.168 | 0.28 | 1.4 | 0.010 | 0.002 | 0.035 | 0.2 | 0.5 | 0.015 | 0.0040 | 0.0017 | 0.54 | 1105 | 1191 | 48 |

The invention claimed is:

1. A flux-cored wire for welding an ultrahigh tensile strength steel, which is a flux-cored wire for gas-shielded arc welding, the flux-cored wire comprising:
an outer steel sheath; and
a flux filled into the outer steel sheath,
wherein the flux comprises:
CaF$_2$, alone or in combination with one or more selected from the group consisting of BaF$_2$, SrF$_2$, and MgF$_2$, wherein a total amount thereof is defined as α, and α is more than 2.0% and equal to or less than 8.0% in terms of mass % with respect to a total mass of the wire,
one or more selected from the group consisting of Ti oxide, Si oxide, Mg oxide, and Al oxide, wherein a total amount thereof is defined as β, and β is 0.01% to 1.20% in terms of mass % with respect to the total mass of the wire,
one or more selected from the group consisting of CaCO$_3$, BaCO$_3$, SrCO$_3$, and MgCO$_3$, wherein a total amount thereof is 0% or more and less than 0.60% in terms of mass % with respect to the total mass of the wire, and
iron powder in an amount of 0% or more and less than 5.0% in terms of mass % with respect to the total mass of the wire,
wherein a ratio of an amount of the CaF$_2$ with respect to the α is 0.50 or more,
wherein a ratio of the α with respect to the β is 2.0 to 800.0,
wherein the flux-cored wire comprises C, Si, Mn, Al, Ni, V, P, S, Cu, Cr, Mo, Ti, Nb, B, Mg, Ca, REM, and a remainder iron and impurities, and wherein a total amount of each of these components in an outer skin and the flux, in terms of mass % with respect to the total mass of the wire, is:
C: more than 0.080% and equal to or less than 0.200%,
Si: 0.05% to 1.50%,
Mn: 1.0% to 2.2%,
Al: 0.001% to 0.400%,
Ni: 1.0% to 9.0%,
V: more than 0.050% and equal to or less than 0.300%,
P: 0.020% or less,
S: 0.020% or less,
Cu: 0% to 0.800%,
Cr: 0% to 2.5%,
Mo: 0% to 2.0%,
Ti: 0% to 0.300%,
Nb: 0% to 0.05%,
B: 0% to 0.0100%, Mg: 0% to 0.8%,
Ca: 0% to 0.5%, and
REM: 0% to 0.0100%, and
Ceq defined in following Expression (a) is 0.60% to 1.20%, $$Ceq=[C]+[Si]/24+[Mn]/6+[Ni]/40+[Cr]/5+[Mo]/4+[V]/14 \quad (a)$$

in which elements noted in brackets represent amounts of the respective elements in terms of mass %.

2. The flux-cored wire for welding the ultrahigh tensile strength steel according to claim 1,
wherein an amount of CaO in the wire is less than 0.15% in terms of mass % with respect to the total mass of the wire.

3. The flux-cored wire for welding the ultrahigh tensile strength steel according to claim 1 or 2,
wherein the ratio of the amount of $CaF_2$ with respect to the α is 0.90 or more.

4. The flux-cored wire for welding the ultrahigh tensile strength steel according to claim 1,
wherein in a tensile test of a deposited metal which is defined in Japanese Industrial Standards JIS Z 3111-2005 with respect to gas-shielded arc welding using the wire, tensile strength of the deposited metal is 950 MPa to 1500 MPa.

5. The flux-cored wire for welding the ultrahigh tensile strength steel according to claim 1,
wherein a slit-shaped gap does not exist in the outer steel sheath.

6. The flux-cored wire for welding the ultrahigh tensile strength steel according to claim 1,
wherein a perfluoropolyether oil is applied onto a surface of the wire.

7. A welding method using a flux-cored wire for gas-shielded arc welding, the method comprising gas-shielded arc welding a steel plate with a wire, wherein the wire includes:
an outer steel sheath; and
a flux filled into the outer steel sheath, and wherein the flux comprises:
$CaF_2$, alone or in combination with one or more selected from the group consisting of $BaF_2$, $SrF_2$, and $MgF_2$, wherein a total amount thereof is defined as α, and α is more than 2.0% and equal to or less than 8.0% in terms of mass % with respect to a total mass of the wire,
one or more selected from the group consisting of Ti oxide, Si oxide, Mg oxide, and Al oxide, wherein a total amount thereof is defined as β, and β is 0.01% to 1.20% in terms of mass % with respect to the total mass of the wire,
one or more selected from the group consisting of $CaCO_3$, $BaCO_3$, $SrCO_3$, and $MgCO_3$, wherein a total amount thereof is 0% or more and less than 0.60% in terms of mass % with respect to the total mass of the wire, and
iron powder in an amount of 0% or more and less than 5.0% in terms of mass % with respect to the total mass of the wire,
wherein a ratio of an amount of the $CaF_2$ with respect to the α is 0.50 or more, wherein a ratio of the α with respect to the β is 2.0 to 800.0,
a total amount of an oxides of Na or K or fluorides of Na or K is 0.001% to 0.40% in terms of mass % with respect to the total mass of the wire,
wherein the flux-cored wire comprises C, Si, Mn, Al, Ni, V, P, S, Cu, Cr, Mo, Ti, Nb, B, Mg, Ca, REM, and a remainder iron and impurities, and wherein a total amount of each of these components in an outer skin and the flux, in terms of mass % with respect to the total mass of the wire, is:
C: more than 0.080% and equal to or less than 0.200%,
Si: 0.05% to 1.50%,
Mn: 1.0% to 2.2%,
Al: 0.001% to 0.400%,
Ni: 1.0% to 9.0%,
V: more than 0.050% and equal to or less than 0.300%,
P: 0.020% or less,
S: 0.020% or less,
Cu: 0% to 0.800%,
Cr: 0% to 2.5%,
Mo: 0% to 2.0%,
Ti: 0% to 0.300%,
Nb: 0% to 0.05%,
B: 0% to 0.0100%,
Mg: 0% to 0.8%,
Ca: 0% to 0.5%, and
REM: 0% to 0.0100%, and
Ceq defined in following Expression a is 0.60% to 1.20%, $$Ceq=[C]+[Si]/24+[Mn]/6+[Ni]/40+[Cr]/5+[Mo]/4+[V]/14 \quad (a),$$

in which elements noted in brackets represent amounts of the respective elements in terms of mass %.

8. The welding method according to claim 7,
wherein an amount of CaO in the wire is less than 0.15% in terms of mass % with respect to the total mass of the wire.

9. The welding method according to claim 7 or 8,
wherein the ratio of the amount of $CaF_2$ with respect to the α is 0.90 or more.

10. The welding method according to claim 7,
wherein in a tensile test of a deposited metal which is defined in Japanese Industrial Standards JIS Z 3111-2005 with respect to gas-shielded arc welding using the wire, tensile strength of the deposited metal is 950 MPa to 1500 MPa.

11. The welding method according to claim 7,
wherein a slit-shaped gap does not exist in the outer steel sheath.

12. The welding method according to claim 7,
wherein a perfluoropolyether oil is applied onto a surface of the wire.

13. A manufacturing method for a weld joint,
wherein a tensile strength of the steel sheet is 950 MPa or more in the welding method according to claim 7.

14. A weld joint manufactured by the manufacturing method for the weld joint according to claim 13, the weld joint comprising:
the steel plate having the tensile strength of 950 MPa or more; and
a weld metal.

15. The weld joint according to claim 14,
wherein a tensile strength of the weld metal is 950 MPa or more.

16. The flux-cored wire for welding an ultrahigh tensile strength steel according to claim 1, wherein an amount of CaO in the wire is 0.10% or less in terms of mass % with respect to the total mass of the wire.

* * * * *